US008832301B2

(12) United States Patent
Graff et al.

(10) Patent No.: US 8,832,301 B2
(45) Date of Patent: Sep. 9, 2014

(54) SYSTEM AND METHOD FOR ENHANCED EVENT PARTICIPATION

(71) Applicant: Parlant Technology, Inc., Provo, UT (US)

(72) Inventors: James William Graff, Provo, UT (US); Adam Bushman, Springville, UT (US); Dane Dellenbach, Pleasant Grove, UT (US); John Graff, Provo, UT (US); Bruce Hassler, Mapleton, UT (US); Daniel B. Stovall, Provo, UT (US); Tyson Holmes, American Fork, UT (US); Carson Anderson, Provo, UT (US)

(73) Assignee: Parlant Technology, Provo, UT (US)

( * ) Notice: Subject to any disclaimer, the term of this patent is extended or adjusted under 35 U.S.C. 154(b) by 0 days.

(21) Appl. No.: 13/835,633

(22) Filed: Mar. 15, 2013

(65) Prior Publication Data

US 2013/0282421 A1  Oct. 24, 2013

Related U.S. Application Data

(63) Continuation-in-part of application No. 13/767,722, filed on Feb. 14, 2013, which is a continuation-in-part of application No. 13/348,221, filed on Jan. 11, 2012, which is a continuation-in-part of application No. 13/188,393, filed on Jul. 21, 2011, said application No. 13/767,722 is a continuation-in-part of application No. 13/709,293, filed on Dec. 10, 2012.

(51) Int. Cl.
*G06F 15/16* (2006.01)
*G06Q 10/10* (2012.01)
*H04L 29/08* (2006.01)
*H04L 29/06* (2006.01)
*H04L 12/58* (2006.01)
*G06F 17/30* (2006.01)

(52) U.S. Cl.
CPC ............ *G06Q 10/1093* (2013.01); *H04L 67/26* (2013.01); *H04L 63/08* (2013.01); *H04L 51/32* (2013.01); *G06F 17/30867* (2013.01); *G06F 17/3087* (2013.01)
USPC ............ 709/231; 709/203; 709/217; 709/227

(58) Field of Classification Search
USPC ......... 709/217, 219, 227, 236, 223, 231, 218, 709/228
See application file for complete search history.

(56) References Cited

U.S. PATENT DOCUMENTS 8,145,704 B2 * 3/2012 Marcus .......................... 709/231
8,412,794 B2   4/2013 Beykpour et al.

(Continued)

OTHER PUBLICATIONS

Homeworknow.com, Communicate Better, http://homeworknow.com, http://homeworknow.com/about/saleskit/hwnowbrochure.pdf, last accessed Jan. 3, 2013.

(Continued)

*Primary Examiner* — Ramy M Osman
(74) *Attorney, Agent, or Firm* — Wright Law Group, PLLC; Mark F. Wright; Jacob C. Ong

(57) ABSTRACT

The various implementations of the present invention are provided as a computer-based system for enhanced communications and event management that focuses on customization of the event attendee experience. Each event attendee is provided with the tools necessary to effectively and efficiently create an event experience that most closely matches their goals and objectives. For example, a variety of dynamic event activity maps provide event attendees with the ability to quickly and easily identify and locate the most interesting and pertinent seminars, classes, speakers, vendors, exhibitors, etc. Additionally, event attendees can update and control their event schedule, customize communications that are sent and received, set up meetings with other event attendees, and receive updates about event activities and schedules. Vendors, exhibitors, and event organizers are provided with a series of tools, including "gamification" tools, that will allow them engage event attendees in event activities to increase attendee participation.

6 Claims, 27 Drawing Sheets

(56) References Cited

U.S. PATENT DOCUMENTS

| | | | |
|---|---|---|---|
| 8,463,795 B2* | 6/2013 | van Hoff | 707/748 |
| 8,578,274 B2* | 11/2013 | Druzgalski et al. | 715/738 |
| 2004/0219494 A1* | 11/2004 | Boon | 434/156 |
| 2005/0165615 A1* | 7/2005 | Minar | 705/1 |
| 2007/0100959 A1* | 5/2007 | Eichstaedt et al. | 709/217 |
| 2008/0273699 A1 | 11/2008 | Roth | |
| 2008/0312946 A1 | 12/2008 | Valentine | |
| 2009/0125582 A1* | 5/2009 | Marcus | 709/203 |
| 2010/0063856 A1* | 3/2010 | Williams et al. | 705/7 |
| 2010/0162364 A1 | 6/2010 | Roth et al. | |
| 2010/0179915 A1* | 7/2010 | Nastacio | 705/319 |
| 2010/0205169 A1* | 8/2010 | Narayan et al. | 709/217 |
| 2010/0274796 A1* | 10/2010 | Beauregard et al. | 707/769 |
| 2011/0119239 A1* | 5/2011 | Jabaud et al. | 707/692 |
| 2011/0173076 A1* | 7/2011 | Eggleston et al. | 705/14.66 |
| 2011/0179020 A1* | 7/2011 | Ozzie et al. | 707/723 |
| 2011/0212430 A1* | 9/2011 | Smithmier et al. | 434/322 |
| 2011/0219094 A1* | 9/2011 | Turakhia | 709/217 |
| 2012/0059795 A1* | 3/2012 | Hersh et al. | 707/628 |
| 2012/0113264 A1* | 5/2012 | Moshrefi et al. | 348/157 |
| 2012/0278428 A1* | 11/2012 | Harrison et al. | 709/217 |
| 2013/0046851 A1* | 2/2013 | Marcus | 709/217 |
| 2013/0060791 A1* | 3/2013 | Szalwinski et al. | 707/754 |
| 2013/0110978 A1* | 5/2013 | Gordon et al. | 709/218 |

OTHER PUBLICATIONS

Blackboard Mobile; Generally Available Modules, Features, and Functionality (click on "View detailed feature availability by platform" link at http://www.blackboard.com/Platforms/Mobile/Products/Mobile-Central/Features.aspx), last accessed on Jan. 3, 2013.
insideflipboard; Flipboard User Guide; Flipboard Tips; available at http://tips.flipboard.com/2012/06/22/flipboard-userguide/; last accessed on Jan. 3, 2013.
PRNewswire; Edison Public Schools Will Be First U.S. K-12 District to Launch Blackboard Mobile Central App; PR Newswire.com; Aug. 18, 2011; available at http://www.prnewswire.com/news-releases/edison-public-schools-will-befirst-us-k-12-district-to-launch-blackboard-mobile-central-app-128001148.html; last accessed on Jan. 3, 2013.
EBD Group; "Partnering—Biotechnology Partnering Conference—BIO—Europe 2013—Vienna, Austria"; http://www.ebdgroup.com/; available at http://www.ebdgroup.com/bioeurope/partnering/index.php; last accessed Sep. 2013.
ABA Techshow; "ABA Techshow 2013"; http://www.techshow.com; available at http://www.techshow.com/conference/app; last accessed Sep. 2013.
Websplashpeter, Apptivate—Working with News, Youtube.com, Uploaded on Mar. 7, 2011, http://www.youtube.com/watch?v=IF4JyDNKDdY (last accessed Apr. 30, 2014), http://www.google.com/support/youtube (contact address).

* cited by examiner

SYSTEM AND METHOD FOR ENHANCED EVENT PARTICIPATION

RELATED APPLICATIONS

This patent application is a continuation-in-part of U.S. patent application Ser. No. 13/709,293 which application was filed on Dec. 10, 2012, which application is now pending and which application is incorporated herein by reference. This patent application is also a continuation-in-part of U.S. patent application Ser. No. 13/767,722 which application was filed on Feb. 14, 2013, which application is now pending and which application is also incorporated herein by reference.

BACKGROUND OF THE INVENTION

1. Technical Field

The present invention relates generally to the field of interactive communication and more specifically relates to systems and methods for enhancing community communication and event attendee participation and interaction for various events.

2. Background Art

Many industries host or sponsor various types of events, including seminars, conferences, trade shows, etc. These events are often held quarterly or annually, depending on the specific goals and objectives of the event. For example, the Consumer Electronics Show ("CES") is held annually in Las Vegas, Nev. and offers manufacturers, dealers, and distributors to get together and experience the newest consumer electronic devices being introduced for the coming year.

Similarly, many professional organizations will sponsor and promote conventions. For example, most state bar associations in the United States will sponsor and host an annual convention where all of the attorneys that are licensed to practice law in the state, along with support staff and legal industry vendors and other exhibitors, can gather and interact. Activities at the bar convention will typically include continuing legal education classes, keynote speakers, and vendor displays featuring legal industry related products and service. Another well-known event is the American Association of School Administrators ("AASA") sponsored by the National Conference on Education. This annual event provides school administrators and superintendents an opportunity to connect with their peers from around the country and engage in activities designed to foster an enhanced learning environment for their students.

While these various events may be somewhat varied in size, scope, participants, and purpose, there are many common elements. For example, at most of these events, there are vendors and exhibitors that pay fees to exhibit their products and services to the event attendees, in the hope of educating the event attendees and creating new opportunities for sales of their product and services to their target market. An "exhibition hall" is usually set up in a location at the event venue and the vendors and exhibitors will try and attract event participants to their booth. However, it is often difficult for the vendors and exhibitors to be noticed in the cacophony and confusion of the exhibition hall. Similarly, it can be difficult for event attendees to locate specific vendors or exhibitors, even with a map.

The orientation of the exhibition hall map may be confusing, the vendor or exhibitor may have been assigned to a different booth or venue, etc. Since the materials for the event are often printed up and mailed out months in advance, changes to the exhibition hall may not timely reach the intended audience. Even if an event attendee has an initial understanding and opinion of which vendors may be most valuable to visit, that may change over the course of a multi-day event and input from other event attendees may alter the planned schedule for visiting vendors. This can lead to endless backtracking and the associated waste of time associated with a rescheduled booth visitation schedule.

Further, for many event attendees, they only hear about a new and promising product and service from a vendor in the exhibition hall after the event has concluded because their was no way for them to learn about the vendor in real time, while attending the event. This missed opportunity can be frustrating as well.

Additionally, most of these events will present a wide variety of speakers, seminars, demonstrations, etc. with a full calendar or slate of activities for the event attendees to choose from. However, it is not uncommon for the event attendees to find it difficult to schedule and keep track of the many scheduled activities that they would like to attend and be involved with. While many venues provide maps and directions, the sheer size of the venue and volume of choices can make information management quite challenging. Additionally, depending on the flow of the events, some seminars may be cancelled, new seminars may be added, technical difficulties may delay the start of finish of activity, etc., causing a "ripple effect" that will impact other activities. An event attendee may show up at a scheduled activity only to find the activity has been cancelled, postponed, or moved to another location at the venue. This can be frustrating for the event attendees and leave them with a negative view of the event and the event organizers.

Finally, at very large events, the number of event attendees may make it difficult to foster effective communication in general. Whether it is communication between event organizers and event attendees, communication between event attendees and vendors/exhibitors, or even communication between individual event attendees and/or groups of event attendees, there are many barriers to effective communication. For example, if two friends attend the same conference or trade show, they may wish to coordinate their schedules so as to attend certain seminars or other activities together. If there is a change in the schedule of events, one of the event attendees may no longer be able to attend. Without some means of effective communication, they may not be able to recalibrate their schedules. While cell phones and text messaging are common communication techniques, the parties still may not be able to connect.

Additionally, given the amount of information provided to event attendees at a typical trade show or conference, one of the main problems that hamper efforts to create an environment of effective communication and that may lead to ineffective and/or inefficient communication is information overload and technology. There are simply so many sources of information present in society today that it is quite challenging to pro-actively master all of the available communication mediums. People have such a wide array of choices available to them that many people are simply overwhelmed and give up. Additionally, with all of the communication options being presented to a person, sorting it all out can be quite intimidating and exhausting.

A great deal of the information overload is the direct result of the increased emphasis on and use of communication technology that didn't even exist 10 years ago. For example, Twitter®, Facebook®, Tumblr®, Instagram®, Google Chat®, Google+®, etc. are all relatively new communication methods that have been developed in recent years. Each of these communication platforms has a unique specific interface and protocol, making it difficult for many people to efficiently master all of them. In addition, as new methods of communication are developed, it can be quite difficult for an average use to identify and access all of the appropriate content that may be available. These issues are often exacerbated at conferences and events as event attendees are often required to maintain their every day communications (e.g., work and family related emails, texts, etc.) while simultaneously processing additional communications related to the trade show or conference that they are attending. This can be overwhelming at times.

While events are a significant and valuable way for attendees to enhance their professional education and re-connect with their peers and colleagues from around the country, the limitations of organizing, managing, and attending events can be frustrating. Whether it is information overload or information scarcity, changing schedules, or general communication challenges, many obstacles can diminish the event experience for the sponsors and participants. Accordingly, without improvements in the current systems, procedures, and methods for managing events of various sizes and constituencies, event attendees and event sponsors will continue to find the event experience to be sub-optimal.

BRIEF SUMMARY OF THE INVENTION

The various implementations of the present invention are provided as a computer-based system for enhanced communication and event management and communications that focuses on customization of the event attendee experience. Each event attendee is provided with the tools necessary to effectively and efficiently create an event experience that most closely matches their goals and objectives. For example, a variety of dynamic event activity maps provide event attendees with the ability to quickly and easily identify and locate the most interesting and pertinent seminars, classes, speakers, vendors, exhibitors, etc. Additionally, event attendees can update and control their event schedule, set up meetings with other event attendees, and receive updates about event activities and schedules. Vendors, exhibitors, and event organizers are provided with a series of tools, including "gamification" tools, that will allow them engage event attendees in event activities to increase attendee participation.

BRIEF DESCRIPTION OF THE FIGURES

The preferred embodiments of the present invention will hereinafter be described in conjunction with the appended drawings, wherein like designations denote like elements, and.

DETAILED DESCRIPTION OF THE INVENTION

Figure 1:
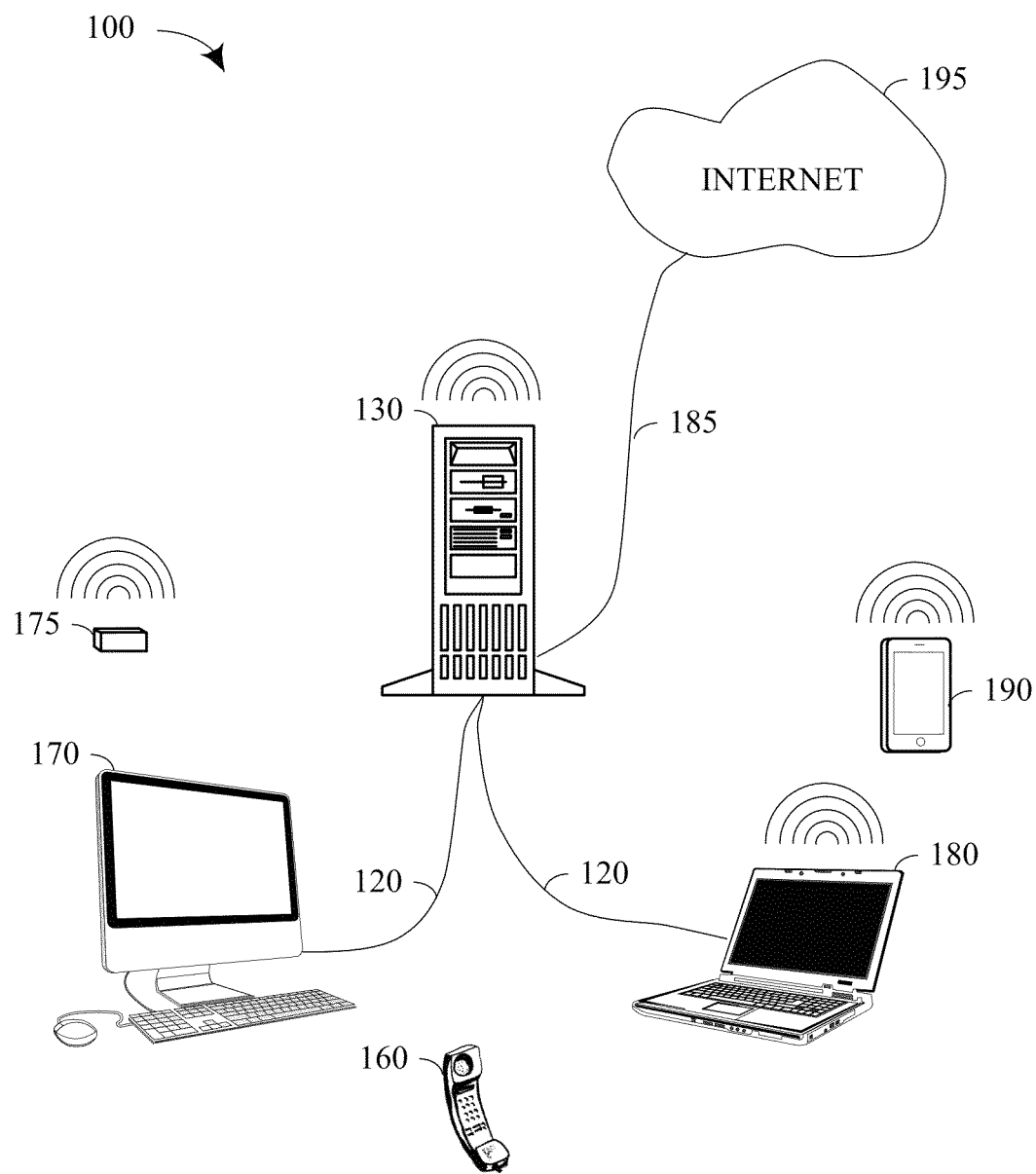
FIG. 1 is a schematic diagram of a computer-based system for enhanced communication and event management in accordance with a preferred exemplary embodiment of the present invention.

The various implementations of the present invention are provided as a computer-based system for enhanced communication and event management that focuses on customization of the event attendee experience. Each event attendee is provided with the tools necessary to effectively and efficiently create an event experience that most closely matches their goals and objectives. For example, a variety of dynamic event activity maps provide event attendees with the ability to quickly and easily identify and locate the most interesting and pertinent seminars, classes, speakers, vendors, exhibitors, etc. Additionally, event attendees can update and control their event schedule, set up meetings with other event attendees, and receive updates about event activities and schedules. Vendors, exhibitors, and event organizers are provided with a series of tools, including "gamification" tools, that will allow them engage event attendees in event activities to increase attendee participation.

The computer-based system for enhanced communication and event management also focuses on providing significant customization of the communications methodology, delivery, and relevance by focusing on security, user preferences, and flexibility. A user interface allows a feed consumer (e.g., a person or entity that receives one or more communication feeds) to specify which communications are most relevant to the feed consumer according to the feed consumer's needs and desires. Additional embodiments provide for automated or enhanced communication selection by using variables such as place, time, feed consumer affiliation, etc. to prioritize and adapt communication feeds for a specific person or organization. While useful for many environments, the most preferred embodiments of the present invention are adapted for use in an educational environment to provide school administrators, teachers, parents, and students with enhanced communication capabilities.

Aspects of the computer-based system for enhanced communication and event management are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Additionally, various preferred embodiments of the program product to provide enhanced communication and event management may be configured to: create and modify multiple databases; track, update and store data relative to communications and messages; configure and implement various search and retrieve functions for a multitude of search requests and determinations made by users for providing information; track and store information about various events, activities, services and features; update and transmit results to one or more message recipients; and provide one or more user interfaces for accomplishing all of these functions.

In this fashion, the appropriate entities (i.e., employers, employees, co-workers, event organizers, sponsors, vendors, exhibitors, event attendees, etc.) can utilize the program product to initiate and complete a wide variety of database-related applications for the provision of enhanced communication and event management and participation. Similarly, a program product in accordance with one or more preferred embodiments of the present invention can also be configured to perform substantially all of the steps depicted and described in conjunction with the figures below for implementing an enhanced communication and event management system as described herein.

Referring now to FIG. 1, a computer-based system 100 for enhanced communication and event management in accordance with a preferred exemplary embodiment of the present invention comprises: a data server 130; at least one of a desktop computer 170 or a laptop computer 180; an optional telephone 160; a wireless communication device 175; and an optional mobile communication device 190 (e.g., cellphone, smartphone or personal digital assistant "PDA") all connected or coupled via a local area network 120 to the Internet 195 via an Internet connection 185. Computer-based system 100 for enhanced communication and event management provides multiple communication methods for event organizers, sponsors, vendors, exhibitors, and event attendees.

Taken together, the components of computer-based system 100 provide a platform for enhanced communication and event management as well as providing a facility for providing additional communication options for information dissemination. This includes the use of social media messaging platforms (e.g., Twitter® Facebook®, Tumblr®, Instagram®, Google Chat®, MySpace®, Google+®, etc.) as an intermediary conduit to deliver messages. Computer-based system 100 provides a mechanism for event organizers, sponsors, vendors, exhibitors, and event attendees to more efficiently and effectively communicate with other event participants to enhance the event experience for all participants.

In the most preferred embodiments of the present invention, computer-based system 100 is configured as a system that will be customized and used to enhance the event management and participation for a wide variety of organizations and events. In this preferred embodiment, the group of users of computer-based system 100 will typically include the constituency for a specific group and will be tailored to achieve the goals and objectives for that group and it's constituents.

Network 120 represents any suitable computer communication link or similar communication mechanism, including some combination of a hardwired connection, an internal or external bus, a connection for telephone access via a modem, standard co-axial cable lines, high-speed T1 line, radio, infrared or other wireless communication methodologies (e.g., "Bluetooth," infrared (IR), etc.), private or proprietary local area networks (LANs) and wide area networks (WANs), as well as standard computer network communications over Internet 195 or an internal network (e.g. "intranet") via a wired or wireless connection, or any other suitable connection between computers and computer components known to those skilled in the art, whether currently known or developed in the future. It should be noted that portions of network 120 might suitably include a dial-up phone connection, a broadcast cable transmission line, a Digital Subscriber Line (DSL), an ISDN line, or similar public utility-like access link.

In the most preferred embodiments of the present invention, at least a portion of network 120 comprises a standard Internet connection 185 between at least some of the components of computer-based system 100 for providing access to additional network resources and other remote locations. Network 120 provides for communication between the various components of computer-based system 100 and allows for relevant information to be transmitted from device to device. In this fashion, a user of computer-based system 100 can quickly and easily gain access to the relevant data and information utilized to search, retrieve, and display information from one or more databases as described in conjunction with the preferred embodiments of the present invention.

In the most preferred embodiments of the present invention, network 120 is configured to provide relatively high-speed transmission of textual information, audio and video data and signals, and also comprises at least an Internet connection 185 for transmission of data captured by one or more computers 170 or 180 and a phone 160 for transmission of an audio signal to and from a standard phone connection. The phone connection may be interfaced to a standard phone system typically found in most homes and commercial facilities, including for example, the existing "land line" phone system infrastructure and/or digital cellular phone communication systems.

In addition to the other components shown in FIG. 1, a wireless communication access device 175 may be communicatively coupled to network 120 and may be any type of wireless communication mechanism that is known to those skilled in the art to provide for wireless communication between network 120 and the various devices associated with network 120, including desktop computer 170, laptop computer 180 and phone 160 as well as mobile communication device 190. The most preferred embodiments of an acceptable wireless communication access device may comprise any type of wireless bridge, wireless router, or wi-fi "hotspot."

Regardless of the specific components, physical nature, and topology, network 120 serves to logically and communicatively link the physical components of computer-based system 100, thereby enabling stable and consistent communication between the components. This is especially important because in many preferred embodiments of the present invention, data server 130, desktop computer 170, and laptop computer 180 may be geographically remote and/or physically separated from each other.

Data server 130 represents a relatively powerful computer system that is made available to desktop computer 170, laptop computer 180, and/or mobile communication device 190 via network 120. Various hardware components (not shown this FIG.) such as external monitors, keyboards, mice, tablets, hard disk drives, recordable CD-ROM/DVD drives, jukeboxes, fax servers, magnetic tapes, and other devices known to those skilled in the art may be used in conjunction with data server 130. Data server 130 may also provide various additional software components (not shown this FIG.) such as database servers, web servers, firewalls, security software, and the like. The use of these various hardware and software components is well known to those skilled in the art.

Given the relative advances in the state-of-the-art computer systems available today, it is anticipated that functions of data server 130 may be provided by many standard, readily available data servers. This may also include the deployment of multiple inter-connected and redundant data servers 130 to enhance the availability and reliability of the functions provided by data server 130. Depending on the desired size and relative power required for data server 130, storage area network (SAN) technology may also be deployed in certain preferred embodiments of the present invention. Additionally, various biometric and identification verification devices for identifying users and controlling access as well as creating and verifying digital signatures (i.e., electronic signature processing) may also be included.

Desktop computer 170 may be any type of computer system known to those skilled in the art that is capable of being configured for use with computer-based system 100 as described herein. It should be noted that no specific operating system or hardware platform is excluded and it is anticipated that many different hardware and software platforms may be configured to create computer 170. As previously explained in conjunction with data server 130, various hardware components and software components (not shown this FIG.) known to those skilled in the art may be used in conjunction with computer 170. It should be noted that in the most preferred embodiments of the present invention, desktop computer 170 is linked (via wired or wireless connection) to its own LAN or WAN and has access to one or more additional data servers (not shown this FIG.).

In addition as shown in FIG. 1, a telephone 160 may be used in conjunction with computer 170 to allow audio messages and alerts to be communicated to telephone 160. In this application, telephone 160 has been communicatively coupled to or otherwise interfaced with the standard telephone communication infrastructure associated with one or more users of computer-based system 100. Similarly, audio messages and various other communications and alerts may be communicated to mobile communication device 190 or other personal electronic device. In some embodiments of the present invention, telephone 160 may be a telephone at a temporary residence (e.g., hotel or motel) where an event attendee is lodged for the duration of the event. This will allow the event organizers and managers to communicate with the event attendee even if the event attendee is not at home.

Similarly, laptop computer 180 may be any type of relatively lightweight portable computer system known to those skilled in the art that is capable of being configured for use with computer-based system 100 as described herein. This includes tablet computers (e.g., iPad®), pen-based computers and the like. Laptop computer 180 may also be configured to allow the transmission and reception of audio signals, messages, communications, and various types of alerts via server 130 and network 120.

Additionally, netbooks, tablets, handheld and palmtop devices are also specifically included within the description of devices that may be deployed as a laptop computer 180. It should be noted that no specific operating system or hardware platform is excluded and it is anticipated that many different hardware and software platforms may be configured to create laptop computer 180. As previously explained in conjunction with data server 130, various hardware and software components (not shown this FIG.) known to those skilled in the art may be used in conjunction with laptop computer 180. It should also be noted that in the most preferred embodiments of the present invention, laptop computer 180 is linked to its own LAN or WAN and has access to its own data server (not shown this FIG.).

In general, the communication between devices associated with data server 130 will be data associated with the creation and transmission of messages from a message originator to a message recipient. The users of desktop computer 170 and/or laptop computer 180 may be event organizers or sponsors, as well as vendors, exhibitors, and in some cases, event participants. Additionally, various related entities such as local and regional chapters, unions, professional organizations, commercial enterprises, municipalities, and their employers and agents may also have access to one or more databases located on data server 130 via desktop computer 170 and/or laptop computer 180 to enable broader and more robust participation by the event participants.

It should be noted that while FIG. 1 shows only a single desktop computer 170 and a single laptop computer 180, it is anticipated that the most preferred embodiments of the present invention will comprise dozens or even hundreds of computers 170 and laptop computers 180. Each of these computers 170 and 180 will be configured to access data server 130 in an appropriately secure way so as to accomplish the specific objectives of the user of the desktop computer 170 or laptop computer 180.

For example, the service provider that controls the databases stored on data server 130 may utilize desktop computer 170 or laptop computer 180 or mobile communication device 190 to access data server 130 and create, update or otherwise modify a given database. An operator, located in a remote location, may use desktop computer 170 or laptop computer 180 to access data server 130 to retrieve information about the participants or persons and the various messages being created, sent, and accessed by the users of computer-based system 100.

In the most preferred embodiments of the present invention, multiple desktop computers 170 and multiple laptop computers 180 will all be configured to communicate simultaneously with data server 130 and with each other via network 120. In addition, the most preferred embodiments of the present invention include a Software As A Service ("SAAS") or Application Service Provider (ASP) environment where data server 130 may be operated as a clearinghouse in a hosted operation. In this fashion, multiple desktop computers 170 and laptop computers 180 will have access to data server 130 and the databases stored thereon via a global computer network such as Internet 195. Data server 130 is further described below in conjunction with FIG. 2 below.

An optional printer and an optional fax machine (not shown this FIG.) may also be deployed for various hard copy data output requirements and may be considered to be any standard peripheral devices used for transmitting or outputting paper-based documents, tickets, schedules, maps, notes, reports, etc. in conjunction with the various requests and transactions processed by computer-based system 100 (e.g., reports, communications, statistical analyses, automated letters, etc.) Finally, it should be noted that the optional printer and the optional fax machine are merely representative of the many types of peripherals that may be utilized in conjunction with computer-based system 100. It is anticipated that other similar peripheral devices will be deployed in the various preferred embodiment of the present invention and no such device is excluded by its omission in FIG. 1.

Mobile communication device 190 is representative of any type of cellular, wi-fi or Internet enabled mobile device or smartphone that may be communicatively coupled to computer-based system 100. This includes, for example, personal digital assistants ("PDAs"), Windows® mobile phone devices, Android® OS devices, Palm® OS devices, Pocket PC® devices, the Apple® iPod Touch®, the Apple® iPhone® and other various types of smartphones and portable communication devices. Those skilled in the art will recognize these various devices and others that are suitable for deployment as mobile communication device 190. While somewhat less powerful than computers 170 and 180, mobile communication device 190 may also be configured to wirelessly communicate with data server 130 via network 120 to send and retrieve tracking and messaging services related information to and from data server 130. In the most preferred embodiments of the present invention, the owner or user of mobile communication device 190 will communicate with server 130 to store, retrieve, and update event related data stored on server 130. Similarly, event sponsors and organizers will be able to access and transmit information stored on server 130 to users of mobile communication devices 190 to more efficiently and effectively manage their events and communicate with event attendees, vendors, exhibitors, etc.

Given the standard functionality for devices that may be deployed as mobile communication device 190, this communication be provided by a cell phone signal or wireless Internet connection (e.g. "wi-fi" or "wi-max") or a Bluetooth® connection. One example of the use for mobile communication device 190 in the context of computer-based system 100 would to send and receive communications, messages or alerts to an event attendee, notifying them of event activities and related information.

Those skilled in the art will recognize that FIG. 1 depicts a fairly standard "client/server" type communication arrangement where data server 130 is considered to be a server and computers 170 and 180 are considered to be clients of data server 130. Additionally, those skilled in the art will recognize that the functionality of data server 130 may be deployed on either of computers systems 170 and 180 in a more traditional "stand-alone" environment. In either case, the methods of the present invention are designed to minimize the amount of data that needs to be transferred from a database to the user of computer-based system 100.

Figure 2:
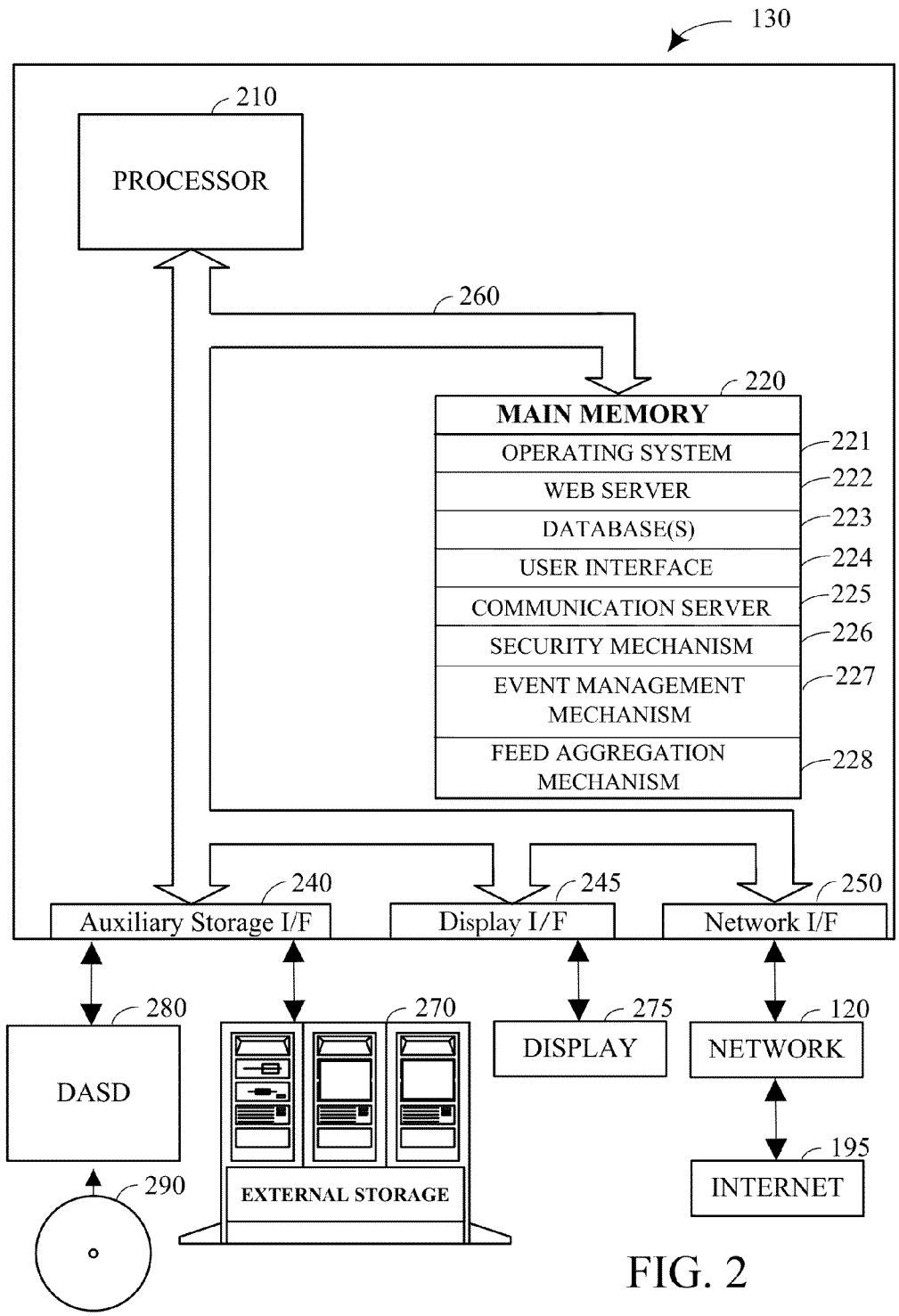
FIG. 2 is a block diagram of a server used for implementing a computer-based system for enhanced communication and event management in accordance with a preferred exemplary embodiment of the present invention.

Referring now to FIG. 2, data server 130 of FIG. 1 in accordance with a preferred embodiment of the present invention represents one of many commercially available computer systems such as a Linux®-based computer system, an IBM® compatible computer system, or a Macintosh® computer system. However, those skilled in the art will appreciate that the methods and system of the present invention apply equally to any computer system, regardless of the specific operating system and regardless of whether the computer system is a more traditional "mainframe" computer, a complicated multi-user computing device or a single user device such as a personal computer or workstation.

Data server 130 suitably comprises at least one Central Processing Unit (CPU) or processor 210, an auxiliary storage interface 240, a display interface 245, and a network interface 250, all of which are interconnected via a system bus 260. Note that various modifications, additions, or deletions may be made to data server 130 illustrated in FIG. 2 within the scope of the present invention such as the addition of cache memory or other peripheral devices. FIG. 2 is not intended to be exhaustive, but is presented to simply illustrate some of the more salient features of data server 130.

Processor 210 performs computation and control functions of data server 130, and most preferably comprises a suitable central processing unit (CPU). Processor 210 may comprise a single integrated circuit, such as a microprocessor, or may comprise any suitable number of integrated circuit devices and/or circuit boards working in cooperation to accomplish the functions of a processor or CPU. Processor 210 is configured to execute one or more software programs contained within main memory 220. Although data server 130 depicted in FIG. 2 contains only a single main processor 210 and a single system bus 260, it should be understood that the present invention applies equally to computer systems having multiple processors and multiple system buses. Similarly, although system bus 260 of the preferred embodiment is a typical hardwired, multi-drop bus, any connection means that supports bi-directional communication in a computer-related environment could be used.

Auxiliary storage interface 240 allows data server 130 to store and retrieve information from auxiliary storage devices, such as external storage mechanism 270, magnetic disk drives (e.g., hard disks or floppy diskettes) or optical storage devices (e.g., CD-ROM). One suitable storage device is a direct access storage device (DASD) 280. As shown in FIG. 2, DASD 280 may be a DVD or CD-ROM drive that may read programs and data from a DVD or CD disk 290.

Display interface 245 is used to directly connect one or more displays 275 to data server 130. Display 275, which may be non-intelligent displays (e.g., "dumb") terminals or fully programmable workstations, are used to provide system administrators and users the ability to communicate with data server 130. Note, however, that while display interface 245 is provided to support communication with one or more displays 275, computer data server 130 does not necessarily require a display 275, because all needed interaction with users and other processes may occur via network 120. Additionally, in certain preferred embodiments, data server 130 may have an integrated display 275.

Network interface 250 is used to connect data server 130 to network 120 and computer-based system 100, including computer 170 and computer 180 of FIG. 1. Network interface 250 broadly represents any suitable way to interconnect electronic devices, regardless of whether the network comprises present day analog and/or digital techniques or via some networking mechanism of the future. Network interface 250 preferably includes a combination of hardware and software that allows communications on network 120.

Software provided in conjunction network interface 250 preferably includes a communication manager that manages communication with other computer systems or other network devices via network 120 using a suitable network protocol. Many different network protocols can be used to implement a network. These protocols are specialized computer programs that allow computers to communicate across a network. TCP/IP (Transmission Control Protocol/Internet Protocol) is just one example of a suitable network protocol that may be used by the communication manager contained within network interface 250.

It is important to note that while the present invention has been (and will continue to be) described in the context of a fully functional computer system with certain application software, those skilled in the art will appreciate that the various software mechanisms of the present invention are capable of being distributed as a program product in conjunction with an article of manufacture comprising software stored on a computer readable storage medium in a variety of forms, and that the various preferred embodiments of the present invention applies equally regardless of the particular type or storage medium used to actually carry out the distribution. Examples of computer readable storage media include: non-transitory recordable type media such as DVD and CD ROMS disks (e.g., disk 290), and transmission type media such as digital and analog communication links, including wireless communication links.

Main memory 220 suitably contains an operating system 221, a web server 222, one or more databases 223, a user interface 224, a communication server 225, a security mechanism 226, an event management mechanism 227, and a feed aggregation mechanism 228. The term "memory" as used herein refers to any storage location in the virtual memory space of data server 130.

It should be understood that main memory 220 might not necessarily contain all parts of all components shown. For example, portions of operating system 221 may be loaded into an instruction cache (not shown) for processor 210 to execute, while other files may well be stored on magnetic or optical disk storage devices (not shown). In addition, although database 223 is shown to reside in the same memory location as operating system 221, it is to be understood that main memory 220 may consist of multiple disparate memory locations. It should also be noted that any and all of the individual software mechanisms or components shown in main memory 220 might be combined in various forms and distributed as a stand-alone program product. Finally, it should be noted that additional software components, not shown in this figure, might also be included.

Operating system 221 includes the software that is used to operate and control data server 130. In general, processor 210 typically executes operating system 221. Operating system 221 may be a single program or, alternatively, a collection of multiple programs that act in concert to perform the functions of an operating system. Any operating system now known to those skilled in the art or later developed may be considered for inclusion with the various preferred embodiments of the present invention.

Web server 222 may be any web server application currently known or later developed for communicating with web clients over a network such as the Internet. Examples of suitable web servers 222 include Apache web servers, Linux web servers, and the like. Additionally, other vendors have developed or will develop web servers that will be suitable for use with the various preferred embodiments of the present invention. Finally, while depicted as a single device, in certain preferred embodiments of the present invention web server 222 may be implemented as a cluster of multiple web servers, with separate and possibly redundant hardware and software systems. This configuration provides additional robustness for system uptime and reliability purposes. Regardless of the specific form of implementation, Web server 222 provides access, including a user interface, to allow individuals and entities to interact with system 100 via graphical user interface 224, including communications sent via network 120 of FIG. 1.

Database 223 is representative of any suitable database known to those skilled in the art. In the most preferred embodiments of the present invention, database 223 is a Structured Query Language (SQL) compatible database file capable of storing information relative to various items that may be of interest to the users of computer-based system 100 of FIG. 1. In the most preferred embodiments of the present invention, database 223 will comprise a plurality of records, including user profiles (e.g., demographics, preferences, etc.), event profiles (e.g., information about various trade shows, conferences, etc.), and other information that may be useful to an organization or individual that wants to provide messages for consumption by one or more message recipients, in conjunction with a preferred embodiment of computer-based system 100 of FIG. 1. Database 223 will also be used to store messages and aggregated communication feeds for delivery by communication server 225.

Graphical user interface 224 is a software component that provides the users of computer-based system 100 of FIG. 1 a means for interacting with the various components of computer-based system 100. In the most preferred embodiments of the present invention, graphical user interface 224 is a web browser based interface, accessible to the users of computer-based system 100 via any standard web browser from any computer that is connected to the Internet. Additional details on graphical user interface 224 are presented below. Additionally, at least one preferred embodiment of the present invention comprises a graphical user interface deployed on mobile communication device 190. In this embodiment, a graphical user interface may be offered via a native operating system "app" customized for mobile communication device 190 or via a web browser based interface deployed on mobile communication device 190 that provides via a connection to data server 130.

In at least one preferred embodiment of the present invention, database 223 of FIG. 2 will include a plurality of database records containing information about multiple schools and students (e.g., school location, student names, grades, dates and times of attendance, etc.) as well as information about teachers and parents (e.g., names and addresses, contact information, employment information, family information, etc.), and entries which are defined as specific situation/circumstances for various performance and event applications (e.g., club, sports, or other extracurricular participation involving a student or group of students) as well as information providing for tracking, analyzing and reporting message metrics for messages created and sent by the users of computer-based system 100.

In addition, the parameters and requirements for accessing and distributing various messages may also be stored and maintained in database 223. This includes detailed information about each user or group of users, including user preferences, permissions, and particularly the login or authentication credentials for each user's social media messaging platform accounts, etc. In this fashion, a user with access to database 223 will be provided with the capability of accessing multiple messages sent a variety of disparate sources in a single social media messaging platform.

Those skilled in the art will recognize that other types of information for other types of data that may be used in other applications (e.g., historical, informational, technical, etc.) may be stored and retrieved as well. While database 223 is shown to be residing in main memory 220, it should be noted that database 223 might also be physically stored in a location other than main memory 220. For example, database 223 may be stored on external storage device 270 or DASD 280 and coupled to data server 130 via auxiliary storage I/F 240. Additionally, while shown as a single database 223, those skilled in the art will recognize the database 223 may actually comprise a series of related databases, logically linked together. Depending on the specific application and design parameters, database 223 may take many different forms when implemented.

The most preferred embodiments of computer-based system 100 of FIG. 1 will typically include a communication server 225 in main memory 220. Communication server 225 may also be a distributed network of servers with multiple computers performing different functions and located in different locations around the world. Communication server 225 is an automated programmable system that is capable of generating one or more forms of messages or message events and will be configured to send the user's login or authentication credentials to the API server for one or more social media messaging platforms to enable the transmission of messages, including aggregated communication feeds, to the user's social media messaging account.

For example, communication server 225 may be configured to send electronic messages to a user's Facebook® account, using the credentials previously stored in database 223 by the user. Communication server 225 may also be configured to generate hard copy messages (e.g., mail merge letters, greeting cards, memos, etc.) that are then sent via standard U.S. Postal Service or some type of commercial message delivery service.

However, in the most preferred embodiments of the present invention, communication server 225 will be configured to deliver messages and aggregated communication feeds to the message recipient's social media messaging platforms based on each message recipient preferences. Each message recipient, as an authorized user of computer-based system 100, will have an account and their account information will be stored in database 223 of FIG. 2. It should be noted that the output from communication server 225 might be determined based on preferences maintained in conjunction with each message recipient's account.

Message recipients may specify their messages selection and content delivery preferences via user interface 224. For example, if a message recipient prefers to receive a customized message via email, then communication server 225 will transmit the customized message to the message recipient via email. Alternatively, a blind person may request their customized message in an audio format. By using various text to speech conversion technologies, their customized message will be converted to an audio signal and delivered via telephone 160 of FIG. 1 or as an audio stream delivered via an application on smartphone 190 of FIG. 1 or as an audio file attached to an email. Additionally, each message recipient will be able to specify which social media messaging platform or platforms they wish to authorize to receive communications from message originators.

Communication server 225 can also send push notifications to third party servers, such as the Apple® Push Notification Service or Google® Cloud Messaging for Android®, which then deliver push notifications to smart phones using server-push technology in which a communication between a communication server and a user is initiated by the communication server rather than the user.

Messages may also be translated so that message recipients can view the message in a language other than the default language. Communication server 225 retrieves the language setting of the mobile device through an HTTP request header and uses the language of the language setting as the target language, or if the message recipient has stored a language preference in database 223. If so, then communication server 225 uses the language, which the message recipient has identified as the target language for message delivery.

Additionally, communication server 225 may be configured to generate a facsimile message by utilizing a fax server and a facsimile modem (not shown this FIG.) that is deployed in conjunction with data server 130 of FIG. 2. Communication server 225 is also capable of being configured and used to send and receive various electronic status messages (e.g. audio and video alerts) and updates to data server 130 and between computers 170, 180, and/or mobile communication device 190 of FIG. 1, as may be necessary to enhance the overall process of completing activities related to the provision of enhanced communication and event management services as described herein.

In addition, most preferred embodiments of the present invention would include a security and/or encryption mechanism 226 for verifying access to the data and information contained in and transmitted to and from data server 130. Security mechanism 226 may be incorporated into operating system 221 and/or web server 222. Additionally, security mechanism 226 may also provide encryption capabilities for other components of computer-based system for providing enhanced communication and event management 100 of FIG. 1, thereby enhancing the robustness of computer-based system for providing enhanced communication and event management 100 of FIG. 1. Security mechanism 226 is most preferably configured to protect the integrity and security of the information transmitted via network 120 of FIG. 1.

Further, depending on the type and quantity of information stored in database 223 and accessed by graphical user interface 224, security mechanism 226 may provide different levels of security and/or encryption for different computer systems 170 and 180 of FIG. 1 and the information stored in database 223. The level and type of security measures applied by security mechanism 226 may be determined by the identity of the message recipient and/or the nature of a given request and/or response. In some preferred embodiments of the present invention, security mechanism 226 may be contained in or implemented in conjunction with certain hardware components (not shown this FIG.) such as hardware-based firewalls, switches, dongles, and the like.

Event management mechanism 227 is a software program or mechanism that uses the information stored in database(s) 223 to facilitate the management of one or more events including trade shows, conventions, seminars, and the like. Event management mechanism 227 will access the data contained in database(s) 223 and use the data to communication between event organizers and participants, facilitate calendaring and scheduling, etc. In the most preferred embodiments of the present invention, event management mechanism 227 is included in a larger software application that can be used to create a web portal for organizations that wish to manage events and related activities. Additional information about event management mechanism 227 is presented below in conjunction with FIG. 3.

Feed aggregation mechanism 228 is a software program or mechanism that uses the information stored in database(s) 223 to identify, collect and aggregate disparate communication feeds or portions of disparate communication feeds into a single, customized communication feed that has been tailored to a specific individual's or group's preferences or needs. Feed aggregation mechanism 228 will access the data contained in database(s) 223 and use the data to create a customized communication feed aggregated from all available communication feeds for each individual or group.

In the most preferred embodiments of the present invention, feed aggregation mechanism 228 comprises one or more algorithms that are configured to identify and assemble the most appropriate and/or desirable communication feeds and then deliver the customized communication feed to the intended audience. This may include organizational affiliation, geographic location, demographic information, school affiliation, as well as other feed consumer-specific details. School affiliation can be which schools the feed consumer works at or volunteers at, or which school the feed consumer's children attend. Additional information about feed aggregation mechanism 228 is presented below in conjunction with FIG. 4 and FIG. 5.

In the most preferred embodiments of the present invention, the various components of computer-based system 100 of FIG. 1 are able to communicate using multiple communications protocols and systems (e.g., Voice over IP or "VoIP", Plain Old Telephone Service or "POTS", etc.). Those skilled in the art will recognize that the communication protocols used herein may be readily adapted and configured to allow for the rapid and efficient transmission and receipt of data by and between the various components of system 100 of FIG. 1. This would also include the ability to control and customize the input and output of system 100 of FIG. 1 for integration with other systems. While a specific exemplary embodiment of a suitable server 130 has been provided above, those skilled in the art will recognize that many other suitable computers (with more or fewer features) may be substituted for the specific example provided herein within departing from the spirit and scope of the present invention.

Figure 3:
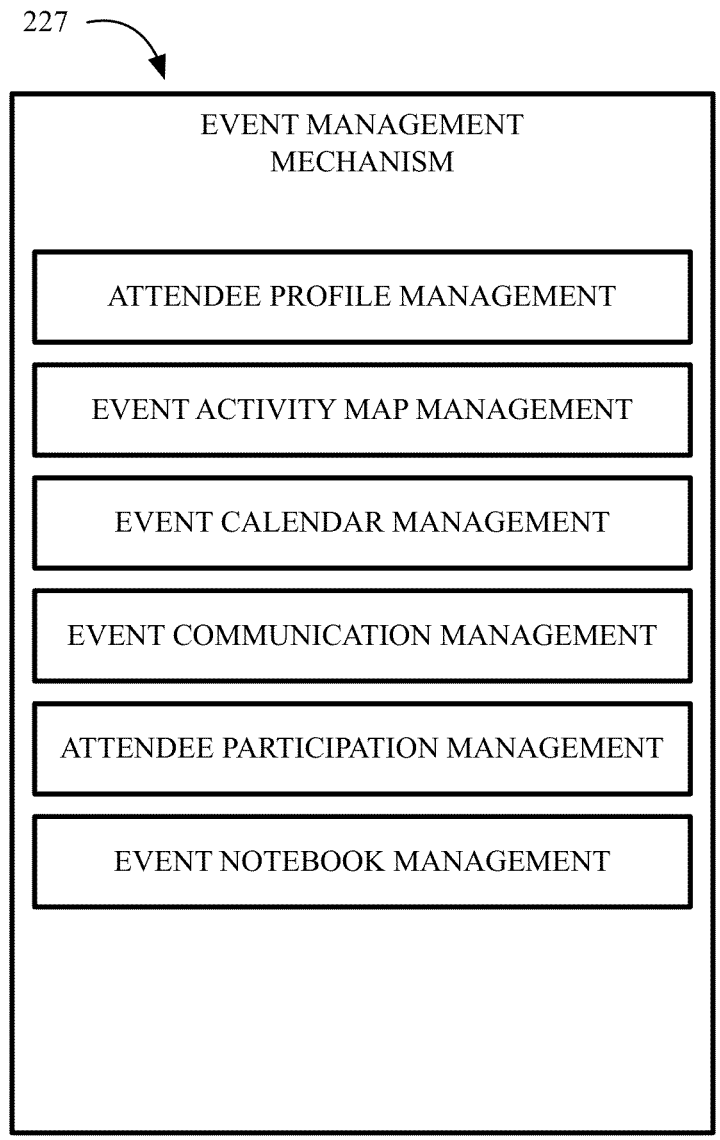
FIG. 3 is a block diagram illustrating the functions of an event management mechanism for enhanced communication and event management in accordance with a preferred exemplary embodiment of the present invention.

Referring now to FIG. 2 and FIG. 3, one or more event organizer and/or event participant will interact with system 100 of FIG. 1 via user interface 224 to access database(s) 223 and to update, delete, modify or extract information for use in event management. User interface 224 may be a web browser user interface accessed any standard web browser on desktop computer 170, laptop computer 180 or a mobile web browser on mobile communication device 190. Alternatively, event organizers and/or event participants may access database(s) 223 using a native application or "app" on mobile communication device 190. In any case, by accessing user interface 224, event organizers and/or event participants can input and modify the data contained in database(s) 223.

Referring now to FIG. 3, the various functions of event management mechanism 227 are further explained. As shown in FIG. 3, event management mechanism 227 will generally be configured to interact with event sponsors, managers, vendors, exhibitors, and attendees to manages a wide variety of tasks and activities including attendee profile management, event activity map management, event calendar management, event communication management, attendee participation management, and event notebook management. The various functions offered by event management mechanism 227 may be configured via desktop computer 170 or laptop computer 180 via user interface 224 of FIG. 2. Alternatively, an event organizer or participant may access event management mechanism 227 through an app interface accessed via mobile communication device 190 of FIG. 1. Each of the functions for event management mechanism 227 is described in conjunction with one or more of the figures below.

Figure 4:
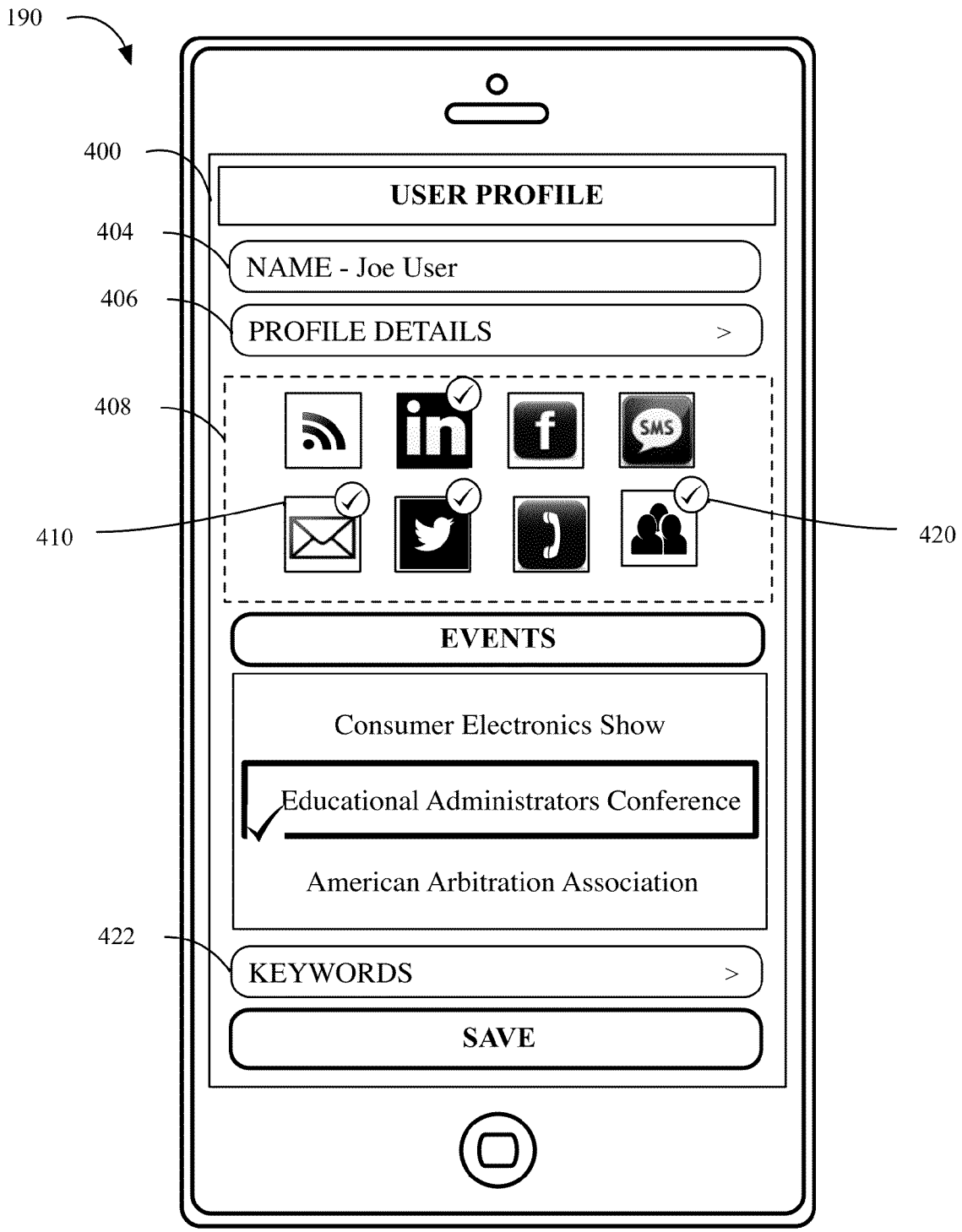
FIG. 4 is a schematic diagram of a user interface for accessing certain functions of an enhanced communication and event management in accordance with a preferred exemplary embodiment of the present invention.

Referring now to FIG. 4, a user interface 400 for accessing the attendee profile management functions of event management mechanism 227 is displayed. In order to ensure that each attendee receives the most benefit from their event attendance, event management mechanism 227 can use information extracted from database 223 of FIG. 2 to provide a customized experience for each event attendee. For example, prior to the event, each event attendee can access database 223 and provide a user profile that will include as much or as little information as the event attendee desires to include.

As shown in FIG. 4, the event attendee can select store and maintain multiple user profiles for multiple events. Each user profile can have different settings since each event attendee's goals and objectives for attending each event may be different. For example, the event attendee can enter in the preferred name 404 for use at the selected event. Similarly, by selecting the user profile update option 406, the event attendee can enter relevant employment, demographic, information, etc. for the selected profile. Additionally, the event attendee will have the option of entering authentication credentials for a plurality of social media messaging platforms 408, by clicking or otherwise selecting an icon 410. By entering and saving the event attendees authentication credentials, event management mechanism 227 will be able to use the social media platform APIs to send and receive communications on behalf of the event attendee. Badge 420 is displayed on each relevant social media icon 410 to indicate which social media platforms have been updated with the event attendee's authentication credentials.

One of the most important elements of the user profile for the event attendee is the ability to associate one or more keywords with their user profile for each event. By selecting keyword interface element 422, a list of keywords will be displayed. The list of keywords may be generated by the event organizers or sponsors, by the vendors or exhibitors, or by the event attendee. The list of keywords may include industry keywords (e.g., school discipline, music, sports, etc.) or vendor and exhibitor names as well as speaker/presenter names, topics of event seminars and key speakers, etc. In any case, by associating one or more keywords with their user profile for the event, the event attendee will be able to receive more customized event activity information.

As shown in FIG. 4, the event attendee is setting their user profile for the Educational Administrator Conference and once saved, the selected user profile parameters and preferences for that event will be activated and control the behavior of event management mechanism 227 for the selected event. The event attendee can repeat this process for each of the events that the event attendee will be attending. The user profile for each event will allow the user to enter and store information regarding their specific goals and objectives for the event. Additionally, by entering key words into their user profile, event management mechanism 227 will be able to more efficiently tailor the event management to match the event attendee's preferences.

Figure 5:
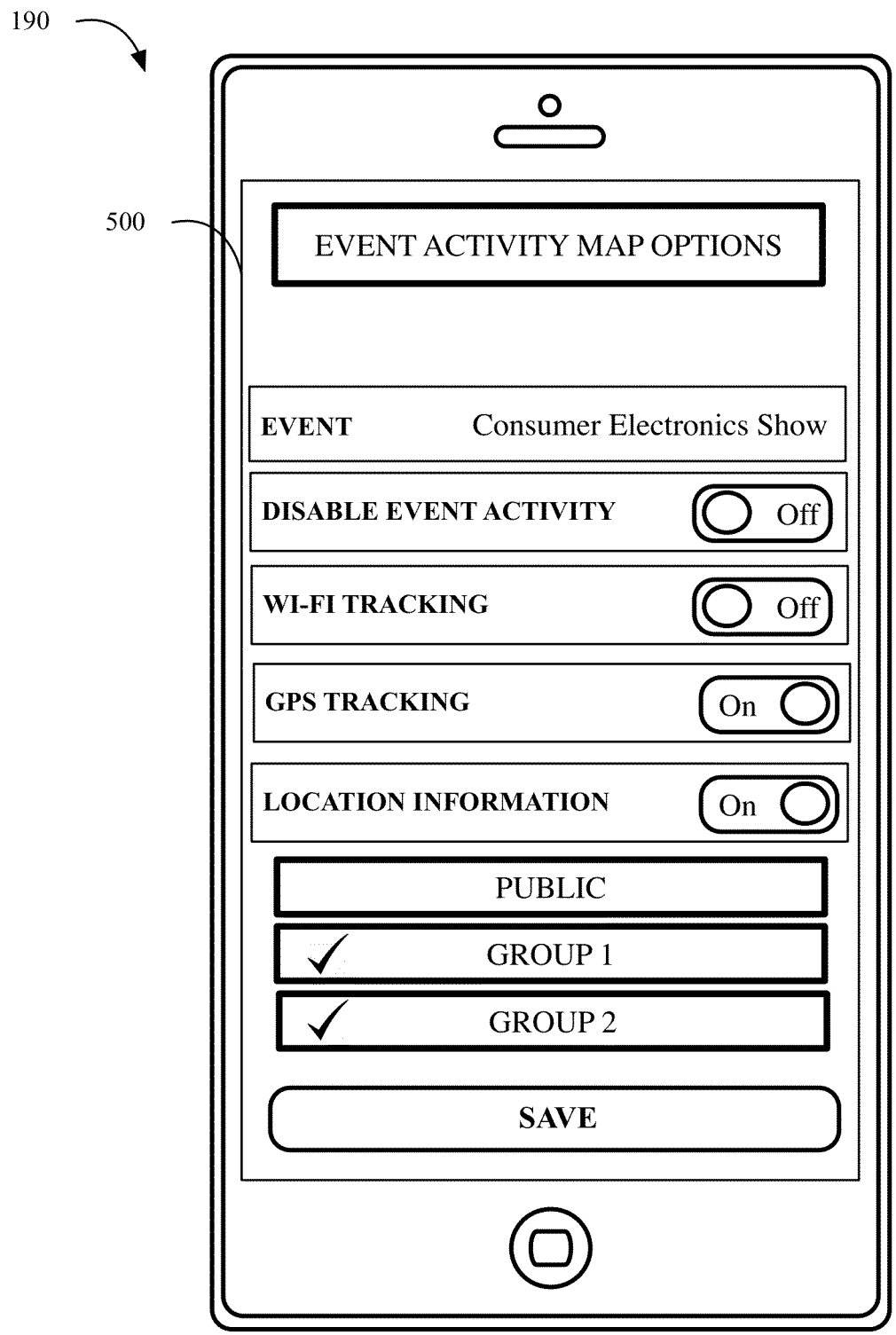
FIG. 5 is a schematic diagram of a user interface for accessing certain activity map functions of an enhanced communication and event management in accordance with a preferred exemplary embodiment of the present invention.

Referring now to FIG. 5, a user interface 500 for accessing the event activity map management functions of event management mechanism 227 is displayed. Each event attendee will have the option to participate in the event activity map generation process by setting their user profile parameters and preferences via user interface 500. In order to entice event attendees to participate, many event sponsors, vendors, and exhibitors will offer prizes, rewards, and other participation inducements to event attendees. Additional information about increasing event attendee participation is presented below in conjunction with FIG. 8.

As shown in FIG. 5, the event attendee can identify and set the parameters for participation or non-participation in the event activity mapping process. For each event (e.g., the Consumer Electronics Show in FIG. 5), the event attendee can disable all tracking and reporting for purposes of event activity mapping. Alternatively, the event attendee can selectively enable or disable various tracking methodologies and whether to make the location information about event attendees' movements at the event public or private. The event attendee may choose to share location information with one or more groups, so that friends and colleagues may more easily locate the event attendee. As with previous user profile settings and preferences, the event attendee can establish and save different levels of tracking and reporting for each event. The tracking and reporting information for each event attendee will be aggregated and used by the event organizers to provide one or more event activity maps.

In general, most event attendees use events such as trade shows and conventions as a vehicle to connect with industry professionals and exchange ideas while being introduced to new technologies, products, and services. However, as previously explained, in many cases an event attendee may not be aware of the most pertinent activities, presentations, etc. for a variety of reasons. By using the tracking and monitoring functions of event management mechanism 227, event organizers can provide additional opportunities to learn about important event activities to the event attendees.

For example, the conference organizers may have added a new seminar or speaker to the agenda after the start of a multi-day event. Similarly, a particular vendor or exhibitor may not be well known and their product or service, while potentially of great interest to the event attendee, may go unnoticed and undiscovered. The larger the event, the larger the venue, and the more event attendees at the event, the more likely it is that one or more event attendees will miss out on some potentially valuable opportunities to benefit from valuable information presented at the event including seminars as well as the opportunity to connect with vendors and exhibitors of interest.

The event activity map management functions of event management mechanism 227 afford the event attendee the opportunity to discover the most relevant activities, based on a number of empirical factors and aggregated event attendee behavior and movements. For example, event management mechanism 227 can display a scale map of the event venue on the event attendee's mobile communication device 290. By overlaying a series of graphical icons on the event venue map, the event attendee can make decisions about which activities will be most interesting and beneficial to the event attendee.

Preliminarily, the GPS location of the various event venues (e.g., vendor booths and displays, speaker venues, auditoriums, etc.) are associated with the event venue map so as to provide GPS coordinates for locating various physical locations as well as providing directions and creating "optimal visit" schedules for event attendees. Each event attendee with a properly configured mobile device 290 will be able to decide if they want to allow their individual event activity to be aggregated for the purpose of generating event activity maps.

As event attendees grant various levels of permission (e.g., provide position tracking for event attendee only, provide position tracking for designated friends or colleagues, provide position tracking for all events and locations, etc.) the position location of each event attendee will be tracked. Event attendees may "check in" at an activity by scanning a QR code or bar code located at an event venue such as a booth when prompted by a "push" notification or other method.

Alternatively, the event attendee may configure their mobile device 290 to provide GPS or geocoding information to system 100.

In this case, if the event attendee has enabled tracking, when the event attendee is located within a preconfigured proximity of a specific event venue (e.g., geo-fencing location tracking) the event attendee's mobile device 290 will generate a notification to system 100 and system 100 will record the notification as a data point for one or more event activity maps. Each event attendee will be able to establish the boundaries for tracking information so as to protect the privacy of the event attendee's movements at their comfort level. In the most preferred embodiments of the present invention, the location and movement tracking functions use aggregated data only and no movement activity for any event attendee is stored except in the event attendee's personal user profile. Additionally, a movement database can be created for each of the event attendees based on their movements through the event venue.

Figure 5A:
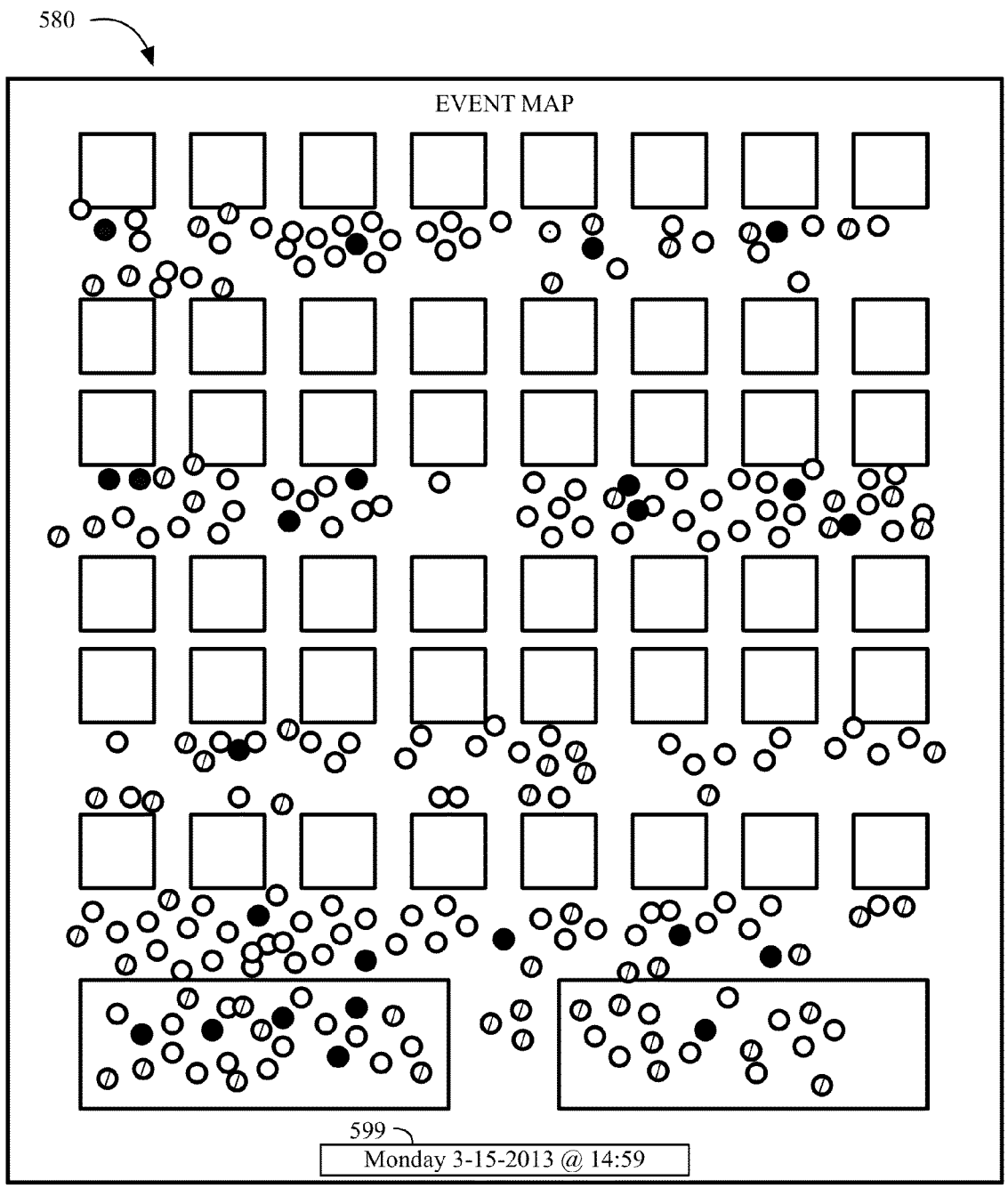
FIG. 5A is an event activity map generated by an enhanced communication and event management in accordance with a preferred exemplary embodiment of the present invention.

Referring now to FIG. 5A, an event activity map 580 based on foot traffic has been generated by event management mechanism 227. Based on the GPS location information supplied by the mobile communication devices for each event attendee, the location of each event attendee can be plotted on a map of one or more venues at the event. In this case, map 580 is a map of the exhibition hall where vendors and exhibitors have booths and meeting rooms. Event management mechanism 227 will display a series of graphical icons to represent "cluster groups" showing the location of the event attendees as they move about the venue.

Different graphical icons are used to represent different numbers of event attendees where the number of event attendees would prohibit the use of a single graphical icon to represent each event attendee. In the case of event activity map 580, a white dot may represent 10 event attendees, the black dots may represent 50 event attendees, and the striped dots may represent 100 event attendees. In this fashion, the event attendee can get a visual cue regarding the most popular booths based on the location of the graphical icons representing the cluster groups.

Additionally, each event activity map, including event activity map 580, may optionally display a date and time stamp 599 to indicate the time when the event activity map being displayed was generated. Each event attendee can select to view map 580 in real time to see the location of all attendees being tracked by event management mechanism 227.

By referencing map 580, an event attendee can quickly and easily spot which booths are generating the most foot traffic at any point in time. This will allow the event attendee to make decisions about where to go or not to go, based on foot traffic. Additionally, the event attendee viewing event activity map 580 may alter the time and date to display event activity map 580 at other points in time to see trends in booth traffic based on foot traffic. Finally, event management mechanism 227 can also generate an "optimal path" for the event attendee and create a booth visitation schedule based on foot traffic (e.g., the most popular booth as determined by the number of visits to each booth will be ranked higher and prioritized on the booth visitation schedule). This will allow the event attendee to prioritize the booths in manner that would be more productive than randomly wandering up and down the aisles. This is especially important for large events where the event attendee simply won't have the time to visit every vendor or exhibitor at the event.

Figure 5B:
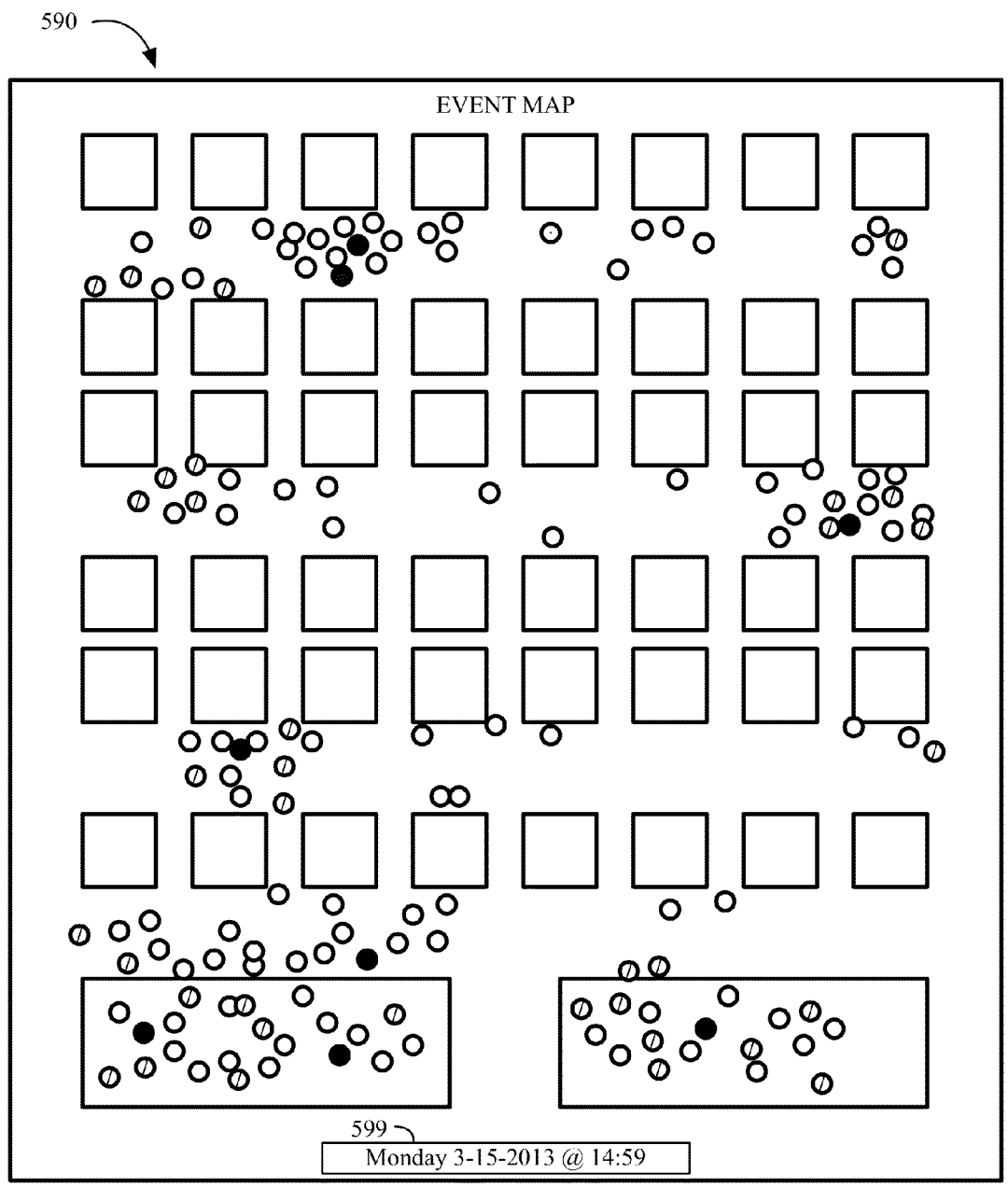
FIG. 5B is an event activity map generated by an enhanced communication and event management in accordance with a preferred exemplary embodiment of the present invention.

Referring now to FIG. 5B, an event activity map 590 based on social media activity has been generated by event management mechanism 227. In this case, instead of displaying graphical icons representing cluster groups based on foot traffic, the icons represent the level of social media activity generated by each event attendee that is directed towards a specific vendor or exhibitor in the exhibition hall. For example, if an event attendee is using Twitter®, and sends out a tweet with a hash tag that is related to one of the exhibitors or vendors in the exhibition hall, then that tweet will be tracked and tallied by event management mechanism 227. The number of tweets that include the same hash tag will accumulated and the cluster groups will be positioned on event activity map 590 to show which booths are generating the most social media "buzz." A similar process can be followed for Facebook® posts, LinkedIn® posts, etc. Further, since each user profile will categorize an event attendee by their function at the event (e.g., organizer, sponsor, vendor, customer, etc.) it will be possible to "drill down" into the social media buzz to see which audience is generating the buzz. For example, an event attendee may wish to screen out vendor tweets, posts, and related social media messaging to focus on what regular event attendees are saying about various event activities and vendors. By selecting the appropriate filters, event activity map 590 can be modified to display the selected social media commentary and activity for the desired group or groups only.

Additionally, the event attendee viewing event activity map 590 may alter the time and date to display event activity map 590 at other points in time to see trends in booth traffic based on social media activity. Finally, event management mechanism 227 can also generate an "optimal path" for the event attendee and create a booth visitation schedule based on social media activity (e.g., the most popular booth as determined by the amount of social media "buzz" will be ranked higher and prioritized on the booth visitation schedule). This will allow the event attendee to prioritize the booths in manner that would be more productive than randomly wandering up and down the aisles. This is especially important for large events where the event attendee simply won't have the time to visit every vendor or exhibitor at the event.

Figure 5C:
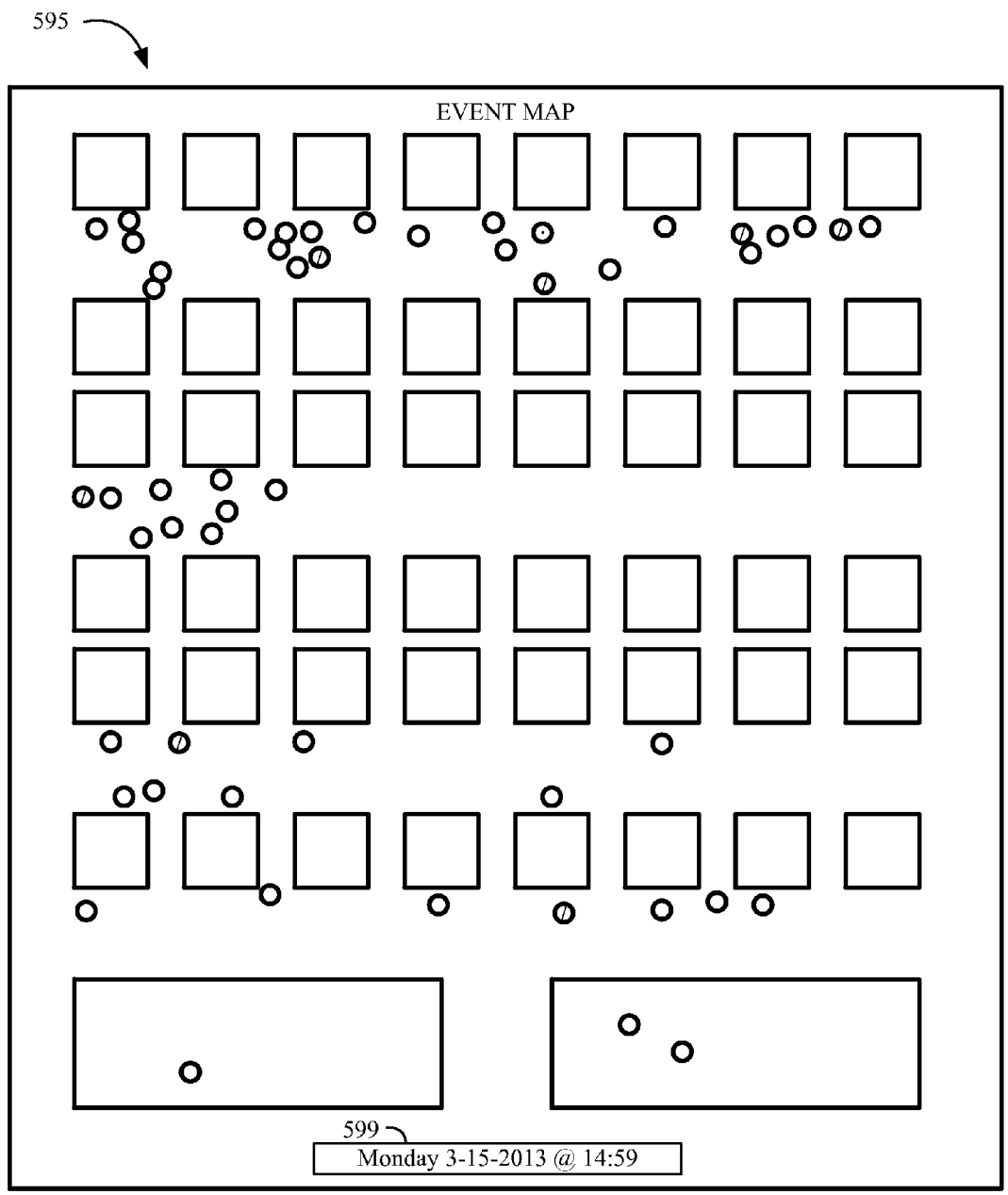
FIG. 5C is an event activity map generated by an enhanced communication and event management in accordance with a preferred exemplary embodiment of the present invention.

Referring now to FIG. 5C, an event activity map 595 based on event attendee profile affinity has been generated by event management mechanism 227. For event activity map 595, event management mechanism 227 has accessed the user profile for a particular event attendee and cross-matched the preference information in the event attendee's user profile against the user profiles of other event attendees to identify other event attendees with similar interests and preferences. In this fashion, event activity map 595 displays booth and event activity locations where like-minded event attendees are congregating and spending their time. This may help the event attendee viewing event activity map 595 decide which booths would be worth visiting since other event attendees with similar profiles are also visiting those booths.

Additionally, by accessing the user profile for a specific event attendee, event management mechanism 227 can determine whether not an event attendee is a vendor or a customer and track the event attendee accordingly. For example, if a vendor is at or near their own booth in the exhibition hall, their movements should not be counted and used in the calculation of the event activity maps. However, one the vendor strays beyond the geo-fenced coordinates of their booth, then they become an event attendee are their movements and time spent can be included in the numbers used to generate the event activity map. The sensitivity of the movement of the event attendee relative to their own booth can be a variable established by the event sponsor and geo-fencing can be used to ensure that "false positives" are not included in the numbers used to generate activity maps.

Additionally, the event attendee viewing event activity map 595 may alter the time and date to display event activity map 595 at other points in time to see trends in booth traffic based on event attendee profile affinity. Finally, event management mechanism 227 can also generate an "optimal path" for the event attendee and create a booth visitation schedule based on event attendee profile affinity (e.g., the most popular booth as determined by visits made by event attendees with similar profiles will be ranked higher and prioritized on the booth visitation schedule). This will allow the event attendee to prioritize the booths in manner that would be more productive than randomly wandering up and down the aisles. This is especially important for large events where the event attendee simply won't have the time to visit every vendor or exhibitor at the event.

Figure 5D:
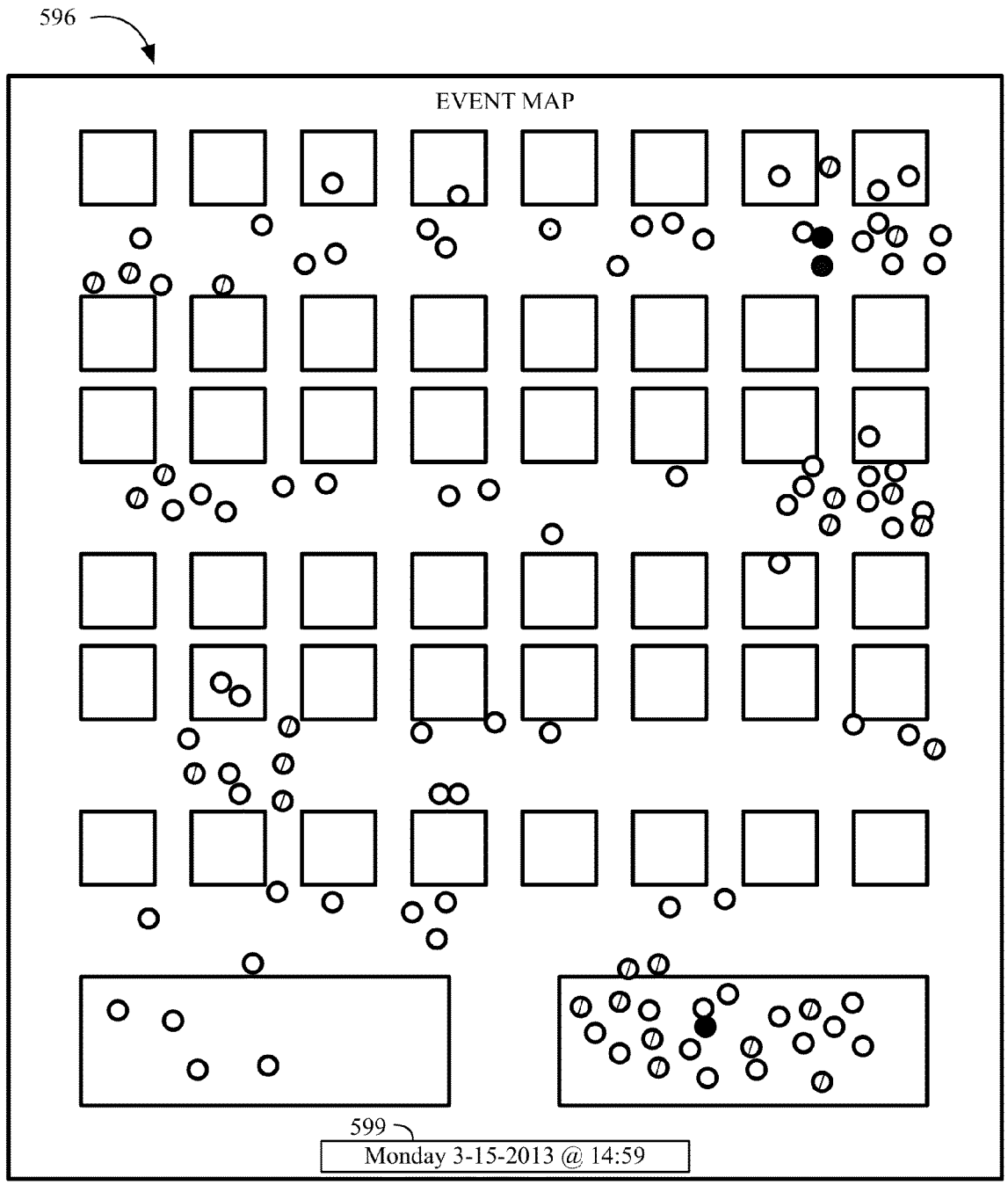
FIG. 5D is an event activity map generated by an enhanced communication and event management in accordance with a preferred exemplary embodiment of the present invention.

Referring now to FIG. 5D, an event activity map 596 based on event attendee attendance time has been generated by event management mechanism 227. For event activity map 596, event management mechanism 227 has calculated the average amount of time spent by event attendees at each booth in the exhibition hall. Based on the number of event attendees that visited a booth and the amount of time spent at the booth (based on a pre-determined proximity to the booth, such as 5 feet or closer), cluster groups can be overlaid on the map of the exhibition hall. In this fashion, event activity map 596 displays booth locations where event attendees are congregating and spending the greatest amount of time. This may help the event attendee viewing event activity map 596 decide which booths would be worth visiting since other event attendees have spent a significant amount of time visiting those booths. In this case, the graphical icons for the cluster groups do not represent people but represent the amount of time event attendees are spending at the venue. Additionally, an elapsed time profile for each event attendee can be created to show how much time each of the event attendees spent at each event activity over the course of the event.

Additionally, the event attendee viewing event activity map 596 may alter the time and date to display event activity map 596 at other points in time to see trends in booth traffic based on event attendee attendance time. Finally, event management mechanism 227 can also generate an "optimal path" for the event attendee and create a booth visitation schedule based on a number of factors, including event attendee attendance time (e.g., the most popular booth as determined by the average amount of time spent at the booth by event attendees will be ranked higher and prioritized on the booth visitation schedule). This will allow the event attendee to prioritize the booths in manner that would be more productive than randomly wandering up and down the aisles. This is especially important for large events where the event attendee simply won't have the time to visit every vendor or exhibitor at the event.

While several different event activity maps have been depicted as examples in FIG. 5A, FIG. 5B, FIG. 5C, and FIG. 5D, those skilled in the art will recognize that these are only a small sample of the type of event activity maps that could be generated. Event activity maps based on other characteristics could be generated as well. For example, event activity maps based on booth square footage, the value of "swag" or "freebies" being offered by exhibitors and vendors, vendor longevity at the same industry event over multiple years, size of the vendor company (by employee, by revenue, etc.), as well as optimal paths for traversing the event venue based on the same factors as well.

For example, if an event attendee has completed a survey that highlights the event attendee's interest in golf, event management mechanism 227 could offer a suggested event path that would lead the event attendee to the vendor booths where golf related products and services are being offered. Similarly, it would be possible to direct an event attendee along a path where the event attendee is most likely to have networking possibilities based on the preferences set in the event attendee's user profile. Similarly, vendors could list the number of free items that they are offering to event attendees for visiting their booths and an event activity map showing the scarcity and popularity of items could be displayed, in an inventory fashion. As the number and the value of the free items available at a particular vendor booth decrease over time, event attendees may manually choose a path that will have them visit other booths with a better inventor or the vendor may track the drop in visitors and "replenish" the inventory with fresh prizes or rewards. Alternatively, the event attendee could direct event management mechanism 227 to select an alternative path based on the size and value of the vendor's inventory.

It would also be possible to generate an event activity map based on vendor inventory. Each vendor can affix barcodes, RFID tags or some other identification device to the vendor inventory that is maintained by the vendor at the vendor booth. Period updates to the inventory for each vendor and for the event on a macro scale can be accomplished manually by vendor entries or automatically by RFID readers, etc. This will allow the event attendees to monitor vendor inventory throughout the event and know what items are available and what items are out of stock.

Each of the event activity maps may be displayed on a large screen located at the venue as well as on the screen of each event attendee's mobile device 290. Further, instead of using dots, alternative graphical elements, including colors, could be used in event activity maps to indicate the level of activity and interest for different event activities. For example, by using red, orange and yellow dots to indicate event activities or venues with greater activity, and using blue and green to represent event activities or venues with lesser activity, a "heat" map could be generated. This provides a visual guide for the event attendee so that the most important event activities are highlighted for review.

Additionally, event management mechanism 227 may create and display event activity maps that are a hybrid of two or more event activity maps where multiple cluster groupings are overlaid on the event activity map. For example, an event activity map that displayed cluster groupings based on time spent at a booth (event activity map 596) coupled with event attendee profile affinity (event activity map 595) may be useful in creating an optimized booth visitation schedule and map. Additionally, although the example of an exhibition hall has been used, a similar approach could be used to identify which classes or seminars are most likely to be of interest to an event attendee based on similar algorithms and methods.

Event management mechanism 227 is also configured to differentiate between various devices owned by an event attendee. For example, each mobile communication device 190 has at least one unique identifier associated with it and this information can be used to enhance the reliability of the event attendee data gathered and used to generate event activity maps. For example, if an attendee has both an iPad® and an iPhone® at an event, counting the movements of both mobile devices on the same event attendee may lead to "double counting" and skew the statistics used to generate the dynamic event activity maps. However, event management mechanism 227 is configured to count both devices a single device if their movements are "lock step" with each other and track both devices separately if the two mobile devices are moving in different directions. Additionally, if one mobile device is stationary for an extended period of time while the other mobile device is "mobile" then event management mechanism 227 will track and use the data from the mobile device.

Event attendees can also access vendor location data to determine where specific vendors are located. The event attendees can view vendor booth locations on an interactive map and determine whether or not the booth is being "manned" at any given time. This will allow the event attendee to avoid visiting a booth when a vendor is not there to answer questions or make presentations.

Finally, each event attendee can choose to have their personal movement and tracking data stored in their user profile so that they can evaluate where they spent the most time during or after the event. By correlating this information with the identification of the event activity associated with the time spent at the activity (e.g., seminar attendance, visiting vendor booths, networking, etc.), the event attendee will be able to have a journal of events that can be incorporated into their event notebook and, if desired, shared with others.

Figure 6:
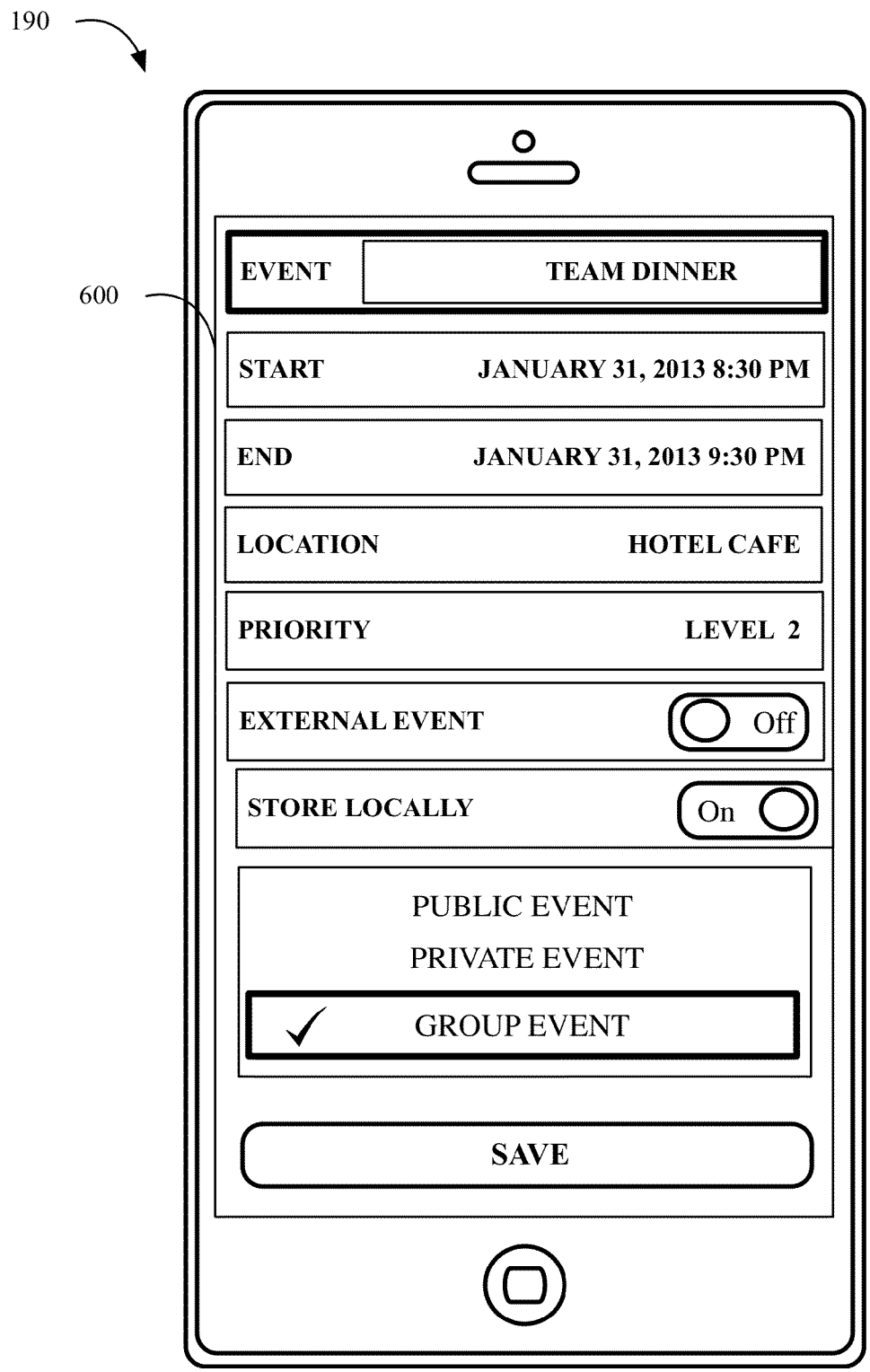
FIG. 6 is a schematic diagram of a user interface for accessing certain calendaring functions of an enhanced communication and event management in accordance with a preferred exemplary embodiment of the present invention.

Referring now to FIG. 6, a user interface 600 for accessing at least a portion of the event calendar management functions of event management mechanism 227 is depicted. As shown in FIG. 6, an event attendee can add various event activities to one or more calendars by creating and saving an event activity entry. These events would be event attendee specific activities that would be added to the event attendee's personal calendar. The event attendee can name each activity and provide details on the date of the activity, the start and stop time, the location, the priority level, etc. The event attendee can also choose to make the event activities as private, public, or group events.

In the case of public events, anyone with access to the event calendar will be able to view the each event attendee's public calendar activities by selecting the event attendee from a list of event attendees. This is particularly useful for coordinating schedules for a large number of people. The event attendee can also mark an event activity as a private event, which means the event activity will not be visible to any other event attendee. Finally, the event attendee can mark an event activity as a group event and then select one or more groups. The members of the group will be able to view all of the event activities that have been labeled as group event activities. This feature is useful for a group of event attendees so that they can plan and coordinate their activities.

Figure 6A:
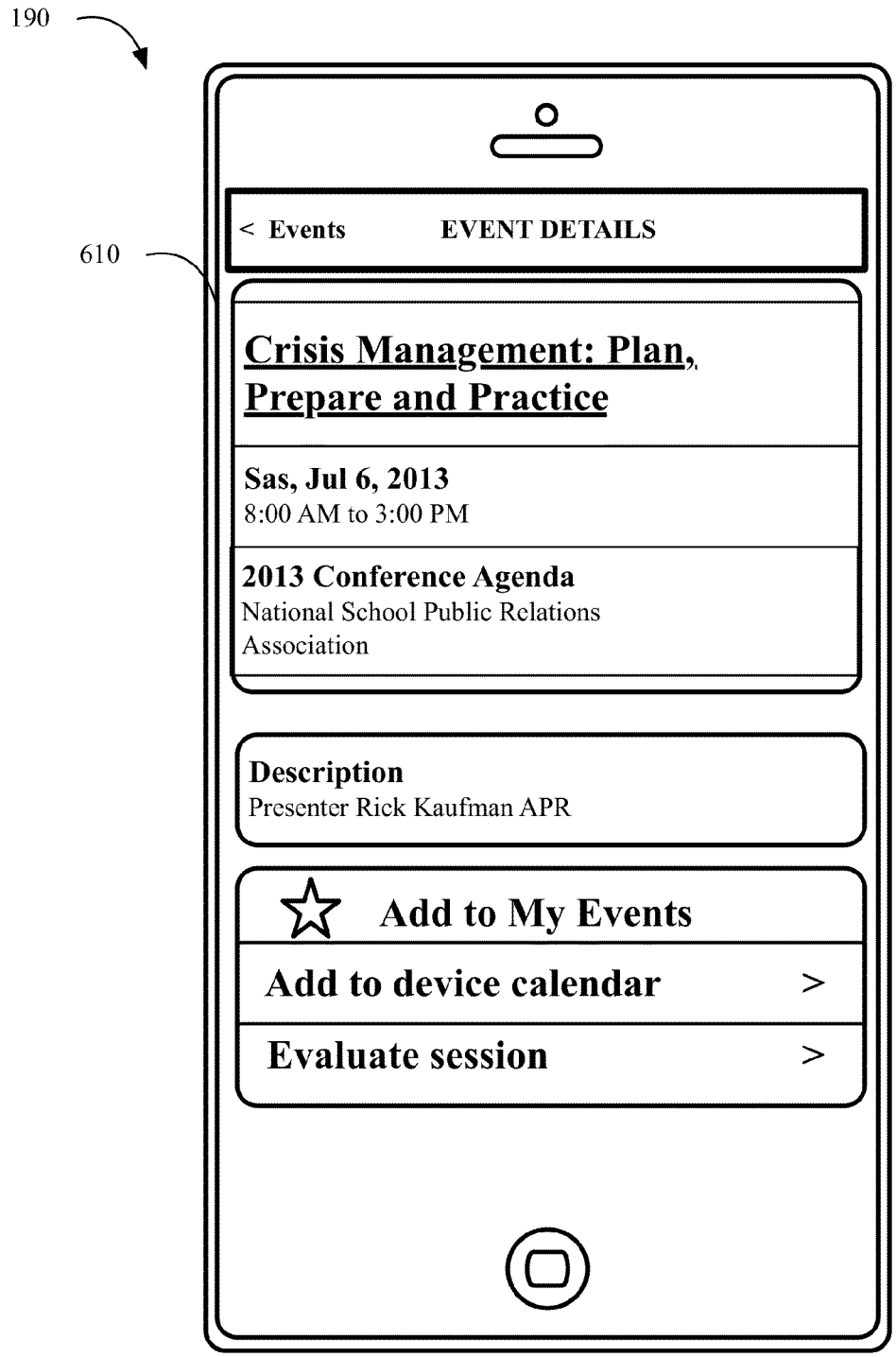
FIG. 6A is a schematic diagram of a user interface for accessing certain calendaring functions of an enhanced communication and event management in accordance with a preferred exemplary embodiment of the present invention.

Referring now to FIG. 6A, a user interface 610 for accessing at least a portion of the event calendar management functions of event management mechanism 227 is depicted. As shown in FIG. 6A, an event attendee can add various event activities by selecting pre-configured activities from a master calendar of event activities as established by the event organizer or sponsor. Event attendees can browse the event schedule and then register for event activities, add event activities to their personal event calendar, and also add event activities to the calendar stored on their mobile communication device 190.

The strategic use of surveys can enhance the event experience for event attendees. For example, prior to attending the event, each event attendee will have the opportunity to respond to one or more surveys regarding the upcoming event. By answering the surveys, event management mechanism 227 will be able to tailor the event experience to most closely match the goals of each event attendee. Similarly, when an event attendee leaves a pre-identified room or venue, event management mechanism 227 may be configured to send the event attendee a relevant survey that would prompt the event attendee to evaluate or rate the event activity. For example, event management mechanism 227 knows that according to the event attendee's calendar that the event attendee is scheduled to attend a certain event activity (e.g., a talk on Islam held at a certain place and time during the period of the conference). When the event attendee nears the exit door or has actually left the room (as detected by GPS position, geo-fencing, etc.), and provided that the time frame for the talk on Islam coincides with the location of the event attendee, then event management mechanism 227 sends the event attendee a relevant survey. The surveys may be static surveys or dynamic surveys so that if an event attendee gives an overly negative or overly positive rating, event management mechanism 227 may be configured to send an open-ended follow up question to solicit additional input from the event attendee.

Since event management mechanism 227 is configured to collect and store a variety of data from multiple event attendees, it is possible to identify and contact event attendees for specific purposes such as surveys. The data can be aggregated for statistical analysis and reporting, or it can be anoymized for general consumption while protecting individual privacy interest. The demographic information on the event attendees can be aggregated and presented to event sponsors, vendors, and event attendees in real time. This information can be updated over the course of the event to include additional statistical data on where which segment of the event attendees spent their time. For example, an event may attract an audience with 60% of the event attendees being engineers and 40% of the event attendees being accountants. Other demographic information (sex, age, home town, etc.) may also be aggregated and used for data segmentation and analysis. This information can be aggregated and provided to event sponsors, event attendees and vendors. If a speaker is preparing remarks for a plenary session, the speaker will know in advance the general demographic of the prospective audience. The speaker can also tap into the aggregated user profile information determine what topics will be most interesting to the projected audience and the speaker can tailor their remarks to match the audience preferences.

Alternatively, the data may be segmented to other purposes. For example, if the event sponsor wants to access a certain demographic of event attendees for purposing of evaluating their response to the event, then event management mechanism 227 will attempt to entice users from that demographic to answer the survey. One incentive would be changing the point value of the specific survey to provide enhanced rewards, bonuses, or participation points to the desired demographic (e.g., female engineers, event attendees under 30 years of age, etc.).

Alternatively, if event management mechanism 227 detects that one or more users have given a particularly high rating or low rating for an event activity, it will generate a follow up question to another user who was also present at the same event activity. For example, if an event attendee answered a survey and reported that the "event lighting was terrible" then event management mechanism 227 would dynamically update the survey questions (by selecting from a pre-determined series of survey questions designed for this purpose) for a different event attendee so that a statistically significant confirmation and analysis could be used to determine if the lighting was substandard. The system could also track whether an event attendee is actually trying to thoughtfully respond to the survey questions or are "trying to game the survey" and, based on the survey responses of other event attendees, event management mechanism 227 could determine the likelihood that a given event attendee is just "breezing through the questions."

For example, event management mechanism 227 could pose the following series of questions—"Did the session start on time?" If five event attendees all answered "yes" and the sixth event attendee answered "no," then event management mechanism 227 could identify that response as a "questionable response." If the system noticed a pattern of questionable responses from a single event attendee about one or more event activities, then event management mechanism 227 could discount or eliminate the responses as being biases. In addition or in the alternative, event management mechanism 227 may generate an alert for the event attendee that their responses don't seem to be accurate and invite the event attendee to review and revise their responses, if necessary. This will allow event management mechanism 227 to prevent any event attendee from receiving awards, bonuses, points, or other recognition if the event attendee is not actually following the rules for event activities.

By creating, selecting, and storing details for each event, event management mechanism 227 of system 100 may also be used in various related calendaring applications, including creating one or more event calendars for various events. For example, as an event attendee identifies and adds events to their calendar, event management mechanism 227 can create an optimized schedule of events for the event attendee. With an optimized schedule of events, an optimized path, showing the event attendee where to go for each event and the time for each event, can be automatically generated for each event attendee. When conflicts arise, event management mechanism 227 can alert the event attendee and rearrange the optimized activity calendar based on priorities established by the event attendee. If a conflict occurs, and a selected activity has multiple calendar options (e.g., the same seminar is offered at two or more different times), then t event management mechanism 227 can rearrange the schedule to eliminate the conflict and automatically update the activity calendar.

Additionally, an organization (e.g. school district, business, professional association, etc.) may wish to post calendar events to a centralized location (e.g., a group calendar), and make the group calendar events accessible via a URL to allow their constituents to access the calendar from multiple devices and locations. The calendar may contain important information about activities at an event that the organization's constituents will be attending. Each calendar will have a generated ID and a unique URL so that the app on a message recipient's mobile device 190 can only display the calendar if it knows the URL. In other words, a message could be sent to an event attendee with a unique URL containing a nonobvious identifier for the message recipient such as "dssfafsf22324ffsadf" instead of "John Smith" to identify the calendar. This makes it more difficult for an unauthorized viewer to guess the URL for the calendar. Even if an unauthorized person was able to guess the URL for a private calendar, the private calendar may not contain information about the owner of the calendar because the information displayed would be tied to the nonobvious identifier associated with the intended message recipient.

Similarly, an event attendee may choose to make their calendar visible to other users. For example, while attending a professional conference or convention, an event attendee may send a message to other event attendees displaying the unique schedule/agenda of the event attendee while attending the conference. The event attendee can view their own private calendar and receive messages from the conference sponsors to get directions and even location information. A directory of attendees could be accessed that shows all of the superintendents who will participate and their biographies. The message originator could select which individuals would have permission to review their calendar and send a message to the selected individuals to let them know when a new event activity has been added to the calendar.

Figure 7:
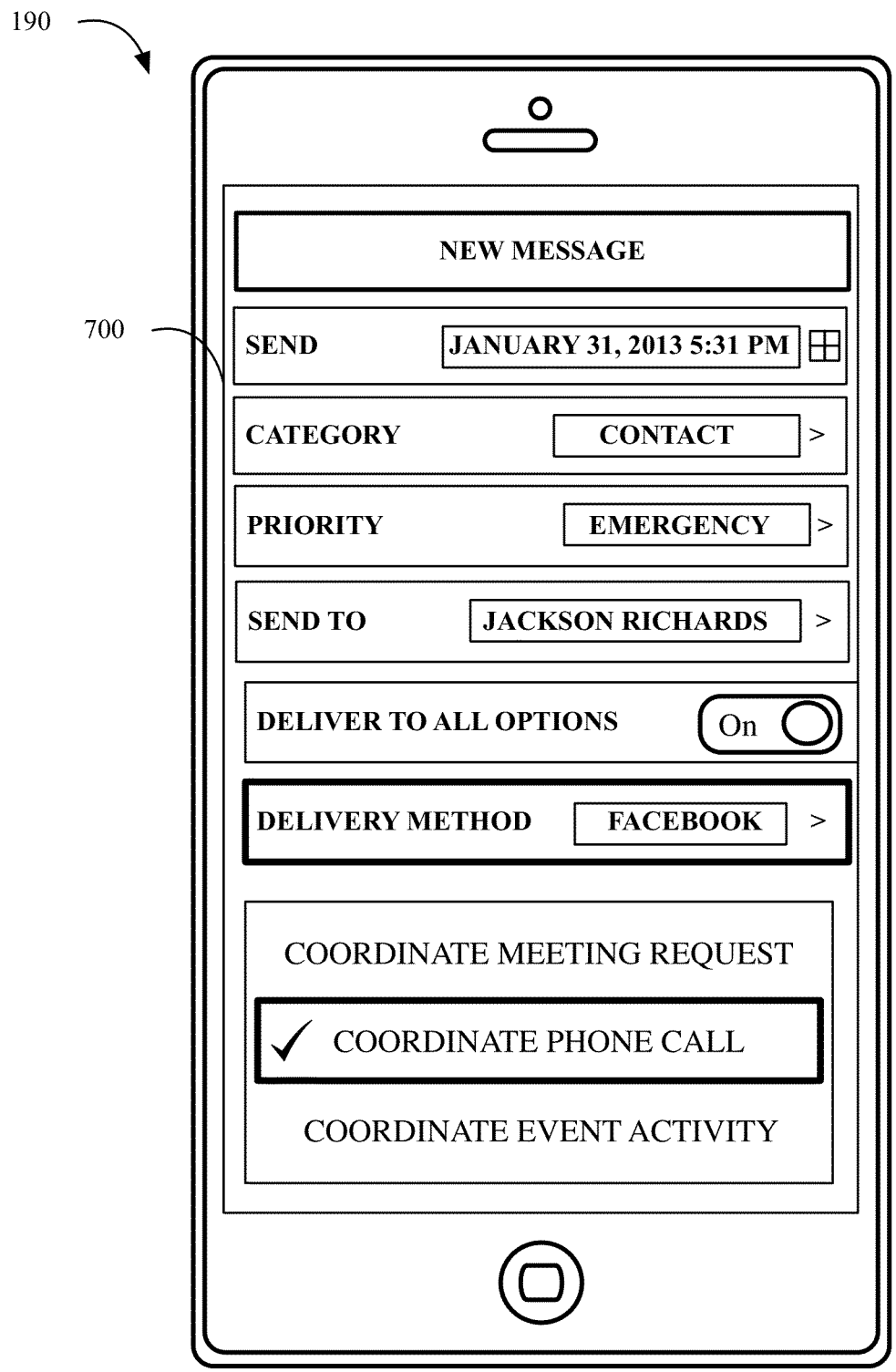
FIG. 7 is a schematic diagram of a user interface for accessing certain messaging functions of an enhanced communication and event management in accordance with a preferred exemplary embodiment of the present invention.

Referring now to FIG. 7, a user interface 700 for accessing the event communication management functions of event management mechanism 227 is displayed. In the most preferred embodiments of the present invention, event management mechanism 227 acts as an intermediation mechanism, providing for the controlled flow of messages from one event attendee (message originator) to one or more event attendees (message recipient) without exposing any of the social media account access information for the message originator and without the message originator having the social media account access information for the message recipient.

For example, as shown in FIG. 7, the event attendee (the message originator) can elect to send a new message to any other event attendee who has registered their contact information with the event sponsors or coordinators (e.g., at the time of event registration or check-in), or at some other time using event management mechanism 227. The event attendee can schedule the date and time for message delivery, select a category of message (e.g., contact, alert, location, etc.) and set a priority. The event attendee can also select the identity of the person who is to receive the message (the message recipient). User interface 700 will typically be configured to provide a drop down scrollable list or other type of interface, showing the name of each potential message recipient. Similarly, an event attendee can communicate with vendors and transfer their contact information to the vendor so that the vendor can provide the event attendee with additional information at a later time, either during the event or after the event has concluded.

In addition, the message originator can specify which message delivery platform(s) should be used to deliver the new message to the selected message recipient(s). In this case, the message originator has activated the "all options" feature to ensure that the emergency meeting is delivered to as many options as the message recipient has configured so as to maximize the probability of successful delivery.

In this case, the message originator has requested that event management mechanism 227 coordinate a phone call with the message recipient. Event management mechanism 227, via the calendar management function discussed previously, will check the calendar of the message originator and the message recipient and, based on their seminar schedule, other scheduled meetings, etc., attempt to find a time slot that is open for both of them. If an available time slot is found, then event management mechanism 227 will schedule the phone call on both calendars and send an alert to the message recipient and the message originator to let them know that the call has been scheduled. In a similar fashion, event management mechanism 227 could coordinate an "in person" meeting, mutual attendance at event activities, etc. In the case of a meeting at a physical location, event management mechanism 227 could also use the physical location of the message originator and the message recipient, in conjunction with the calendar schedule to pick both an appropriate time and an appropriate place for the meeting so as to minimize the distance traveled by the participants.

If an intended message recipient has registered their authentication credentials and authorized social media messaging platforms to receive messages from a message originator via a social media messaging platform, event management mechanism 227 will route messages generated by communication server 225 from a message originator to a message recipient via one or more social media messaging platforms. In this fashion, a first event attendee has the ability to send Facebook® messages to a second event attendee without having any knowledge of the second attendee's Facebook® account information.

Event attendees can choose one or all of the available communication options for communication and exchanging information with fellow event attendees. This includes email, tweets, text messages, etc. to exchange information with one or more event attendees, sponsors, or participants. Additionally, data transfer method such as the mobile application "BUMP" may be used to exchange data between mobile communication devices 190. Further, since the user profile information for event attendees will be stored in database 223, event attendees with similar likes and interests can be paired up by event management mechanism 227. For example, if an event attendee would like to meet new people while attending the event, they can specify their preferences in their user profile. Event management mechanism 227 will then locate other event attendees with similar preferences and interests who have also expressed a desire to meet new event attendees and connect the event attendees.

In an alternative preferred embodiment of the present invention, a message originator may elect to provide messages that can be viewed or accessed by third parties not directly associated with the message originator's organization. For example, a message originator from one school district may authorize other school district personnel to view, share and otherwise use the news feed for the message originator's school district.

Figure 8:
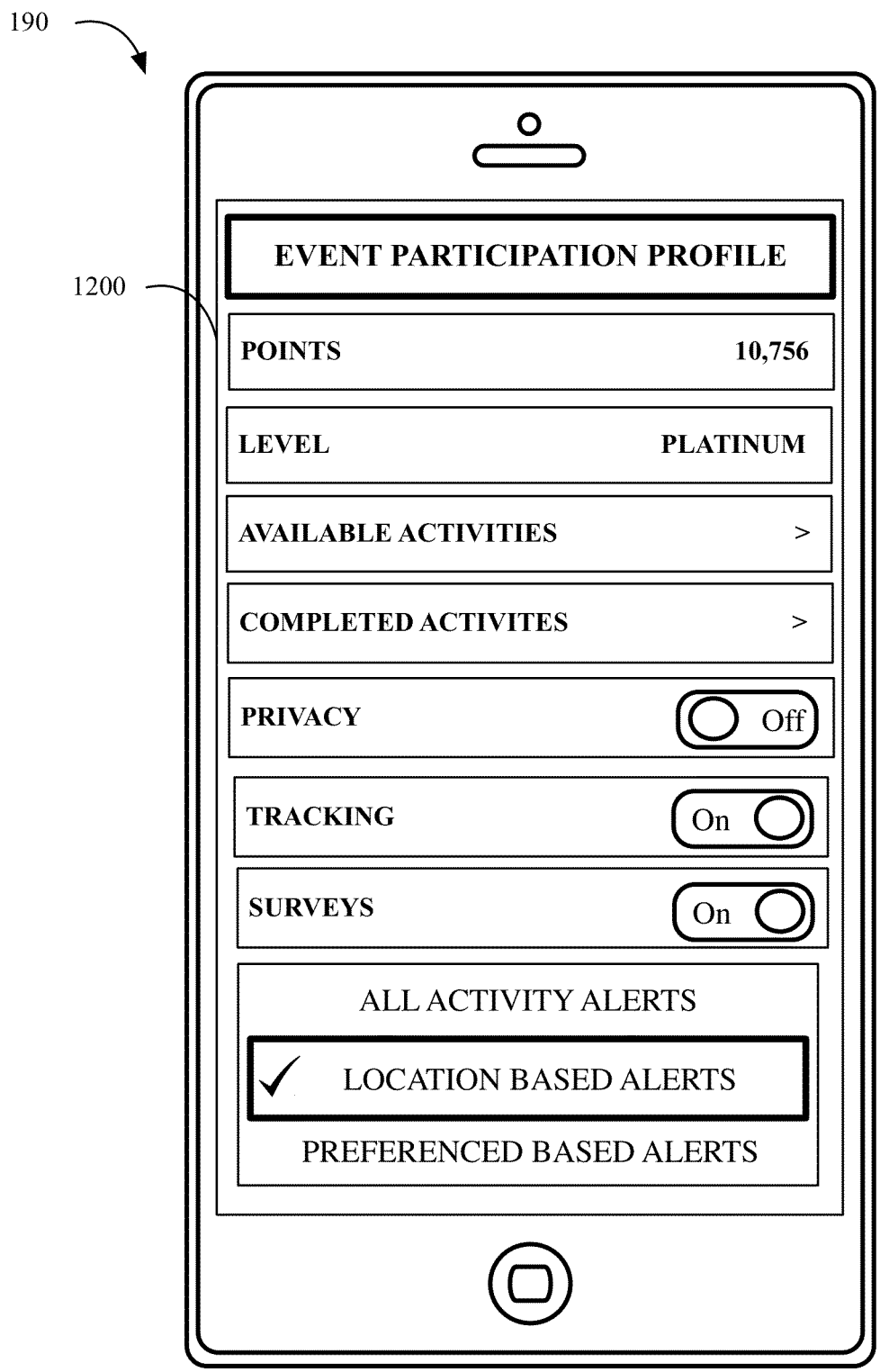
FIG. 8 is a schematic diagram of a user interface for accessing certain event participation functions of an enhanced communication and event management in accordance with a preferred exemplary embodiment of the present invention.

Referring now to FIG. 8, a user interface 800 for accessing the attendee participation profile management functions of event management mechanism 227 is depicted. Since one of the most important parts of many events, at least for vendors, event sponsors and event organizers, is to increase the level of participation and engagement of event attendees, event management mechanism 227 provides a number of tools for achieving this goal. For example, the enhanced communication tools, event activity maps, event notebooks, and other features and functions offered by event management mechanism 227 can be used to increase and enhance event attendee participation.

For example, a "gamification" process can be employed by vendors, event sponsors and event organizers to directly incentivize each event attendee with a series of selected activities designed to attract that event attendee to complete the desired event activities. A "booth chase" that has been customized for each event attendee based on the keywords and interests identified in the user profile can be used to select those vendor booths that are most likely to be of interest to the event attendee. By specifying a number of points or rewards available to the event attendee, it is possible to provide a high level of incentive to induce the event attendee to visit each of the booths in the booth chase.

Additionally, each event attendee's booth chase may be customized based on the user profile of other attendees, physical handicaps, etc. For example, event management mechanism 227 could suggest a booth chase for a group of like minded individuals or event attendees from the same company to complete together.

At each booth, the event attendee can "check in" by scanning a QR code or a bar code. In another preferred embodiment, the event attendee can take a photo of the booth or event location using the built-in camera on mobile communication device 190 and transmit the image event management mechanism 227. Event management mechanism 227 can use image recognition software to verify the location and use that information to check the event attendee in at the corresponding physical location. Alternatively, using near field communication, GPS, or some other location mechanism, event management mechanism 227 can automatically recognize the event attendee and check them in at each booth when they arrive. Similarly, points or rewards can be awarded at various booths or seminars when each event attendee completes an activity at the booth or seminar (e.g., fills out a survey, picks up a product sample, registers with a vendor to receive additional information, etc.).

In at least one preferred embodiment of the present invention, the sponsors or vendors can "bid" for booth chase placement. For example, the more valuable the incentive provided by a vendor or sponsor, the more often they will appear in event attendees booth chase. In at least one preferred embodiment of the present invention, a vendor will pay money to be a "platinum" sponsor and the prizes offered to event attendees are tiered so that event attendees get better rewards and prizes for visiting the "platinum" sponsors.

Further, instead of establishing a pre-programmed booth chase, event management mechanism 227 could sense the location of the event attendee and send an alert or message to their mobile communication device 190 to alert them of the possible bonus or rewards that are associated with the booths around the event attendee at any given time. If the event attendee checks in at the vendor booth, they may be presented with one or more social media connection options. For example, the event attendee may be presented with an option to "like" the vendor on Facebook® or generate a tweet for Twitter® and receive some type of reward or bonus, including a discount on the vendor's products or services. Additionally, since the event attendee will have previously stored their contact information in database 223, they can transfer their contact information to the vendor, if desired, with a simple click or other activity.

Based on the event attendees preferences, they can "adjust" the parameters of the booth chase activity so that as the event attendee completes event activities such as checking in, tweeting about a vendor, recommending booths and vendors, and visiting venues the event attendee will be awarded a score or points and become eligible for better prizes or, at some point, may be allowed to select one or more prizes from a group of available prizes or rewards. However, if the event attendee does not wish to participate, they can simply select the "privacy" option and disable the tracking features of event management mechanism 227. In this fashion, event attendees can decide whether or not the event participation features are of interest to them and gauge the level of event activity participation that is most appropriate.

The amount of vendor interaction and the number of event activity notices and alerts delivered to each event attendee can be controlled by the event attendee. The event attendee can select to receive event activity participation alerts based on location or preferences or a combination of both. Alternatively, the event attendee may wish to participate at a high level and receive all possible event activity alerts from all sources. Additionally, the event attendee may choose to opt out of surveys by adjusting their choices using user interface 800 as shown in FIG. 8. User interface 800 can be accessed by the event attendee to view their points, status, level, etc. as the event progresses so that they will always have the most relevant information regarding their participation in event activities.

In addition to basic rewards and prizes, the event attendees with high participation scores may be awarded preferential treatment for attendance at prestige or "invitation only"

events and newly scheduled sessions as well as special access (e.g., better seats or first in line) priority and entrance to special events. Additionally, event attendees who have been attending the same event for multiple years can be provided with priority registration for the same or similar events in future years. Further, in at least one preferred embodiment of the present invention event management mechanism 227 will activate additional or premium features based on the level of participation and interaction displayed by the event attendee while at the event.

These various rewards and bonuses are designed to incentivize event attendees to fill survey and other forms on their mobile communication device 190 and provide the information to the vendor or sponsor for marketing and research purpose. Since database 223 contains the contact and demographic information for each attendee, then the desired information can be quickly and easily transmitted.

In addition to providing incentives to event attendees, the event sponsor or organizer may be incentivized by vendors as well. For example, a vendor may offer the event sponsor a reward for every event attendee that shares his or her contact information with a vendor as a result of attending the event. For example, a vendor may offer a percentage of any future sales which vendor makes to the attendee during a specified period of time. Alternatively, an event attendee may be offered a discount on vendor products and services while at the event and, when the event attendee executes on the discount offer, the vendor is reminded that they promised to provide a discount to the attendee and then event sponsor will be notified that it will receive a percentage of the revenue generated by the vendor on that transaction.

Another feature that will appeal to many vendors and event attendees will be based on geo-location and game playing. For example, a vendor may offer event attendees access to a demo app (or vendor app) that can be used whenever the event attendee is within a pre-configured distance of the vendor's booth or only for a specific amount of time after obtaining a password or QR token from the vendor's booth. If the app has value to the event attendees, they will be enticed to spend more time in or near the vendor's booth. The vendor app can be selectively enabled or disabled based on a number or pre-determined factors, including a geo-fenced perimeter (e.g., the vendor app is only enabled within a certain distance of a selected physical location), a time window (e.g., the vendor app is only enabled from a start time to an end time), and a pre-determined amount of interaction with a vendor at the sponsored booth (e.g., the vendor app is only enabled after an event attendee has spent a certain amount of time at the vendor booth).

In another preferred embodiment, whenever the event attendee is within a pre-determined geo-fenced radius of the vendor booth, the event management mechanism 227 is configured to sends a request to the event attendee inviting the event attendee to download the vendor's demo app. The vendor can choose to provide access to the demo app for a predetermined period of time or an indefinite period of time. The demo app may offer full functionality while the event attendee is near the vendor booth and limited functionality in other locations. The demo app may be a separate app offered by a vendor or the demo app may be integrated into the software offered by the event sponsor for the event attendees to use on their mobile communication devices 190.

Many vendors will use the demo app approach in a "freemium" model and offer a limited model of the app and try to "upsell" the event attendee to acquire the full version, perhaps offering a discounted "show special" pricing model. The event sponsor or organizer may provide an opportunity for vendors to include the vendor's app in a model where the vendor's app is promoted by the event sponsor. The password or access code for the vendor's app and the code for the vendor's app will be provided to event attendees via event management mechanism 227 and the features of the vendor's app will be incorporated into the functionality of system 100 by using an application program interface ("API") model. Alternatively, event management mechanism 227 can run a simulation of the vendor's app. Alternatively, the various maps used for the event will display the venue layout, including vendor booth layout, the vendor's assignments to the booths, and the geo-coordinates of the booths. This information can be used by the vendor to determine the geo-coordinates of the vendor's booth so that the vendor can create their geo-fence for the vendor app. In some embodiments, the event organizer provides software code to the vendor which includes the geo-coordinates of the vendor's booth and instructions so that the vendor's app will only be active within a certain radius of the geo-coordinates for the vendor's booth. Vendors at the event may use their vendor app to add functionality to the demo app for event attendees and include additional levels, features, or removal of geo-fencing restrictions as they see fit. Other implementations would provide for revenue generation based on the length of messages sent by vendors to event attendees during game play. Longer messages would cost the vendor more money and shorter messages would be less expensive.

Vendors can also create a searchable product inventory or list that uses geocoding and RFID tags or similar means of identification. With this functionality in place, event attendees can use the geocoding functions to locate products at the event that are of greatest interest to the event attendee. This functionality can also be integrated into one or more games, so that event attendees are awarded points for examining certain vendor products.

Another method of inducing increased event attendee exposure to vendor messaging is the opportunity for vendors to sponsor commercial games for event attendees. For example, a vendor could play a game on their mobile communication device 190 with the sponsoring vendor picking up the license fee from the game publisher. Whenever the event attendee completes a level or certain portion of the game, or after a pre-determined amount of time has elapse, an advertisement associated with the vendor will be displayed to the event attendee. Similarly, if the event attendee achieves a certain score while playing the game, the event attendee may win a prize that could be retrieved from the sponsoring vendor who has paid a fee to be a prize redemption location since more event attendees will be attracted to the locations where prizes and rewards are being distributed. Alternatively, the game can display a "coupon" that can be redeemed at the sponsoring vendor's booth. This will drive interaction between event attendees and vendors. Each vendor will have the option of becoming a sponsor for specific prizes and rewards, including prizes and rewards that are distributed based on user preferences and user profiles for event attendees.

In certain preferred embodiments of the present invention, event management mechanism 227 will employ one or more algorithms to drive event attendee prize activities. For example, the vendor booth where a prize is to be retrieved or redeemed may be determined dynamically based on the physical location of the event attendee at the time the prize or reward is earned. In this fashion, multiple vendors could sign up to fund and sponsor an activity but only the vendor that is closest to the event attendee that wins the prize would provide the prize to the event attendee. Prizes and rewards may be physical tangible items or "e-rewards" such as electronic coupons and the like.

Game play can be restricted by geo-location, by time period, and by other means to control the game playing environment. For example, certain games may only be played in certain locations and at certain times (e.g., lunch time or break time). A trivia game may be activated as part of a speaker presentation and a audience polling app may be activated during a seminar to solicit event attendee responses to seminar questions and surveys.

Figure 9:
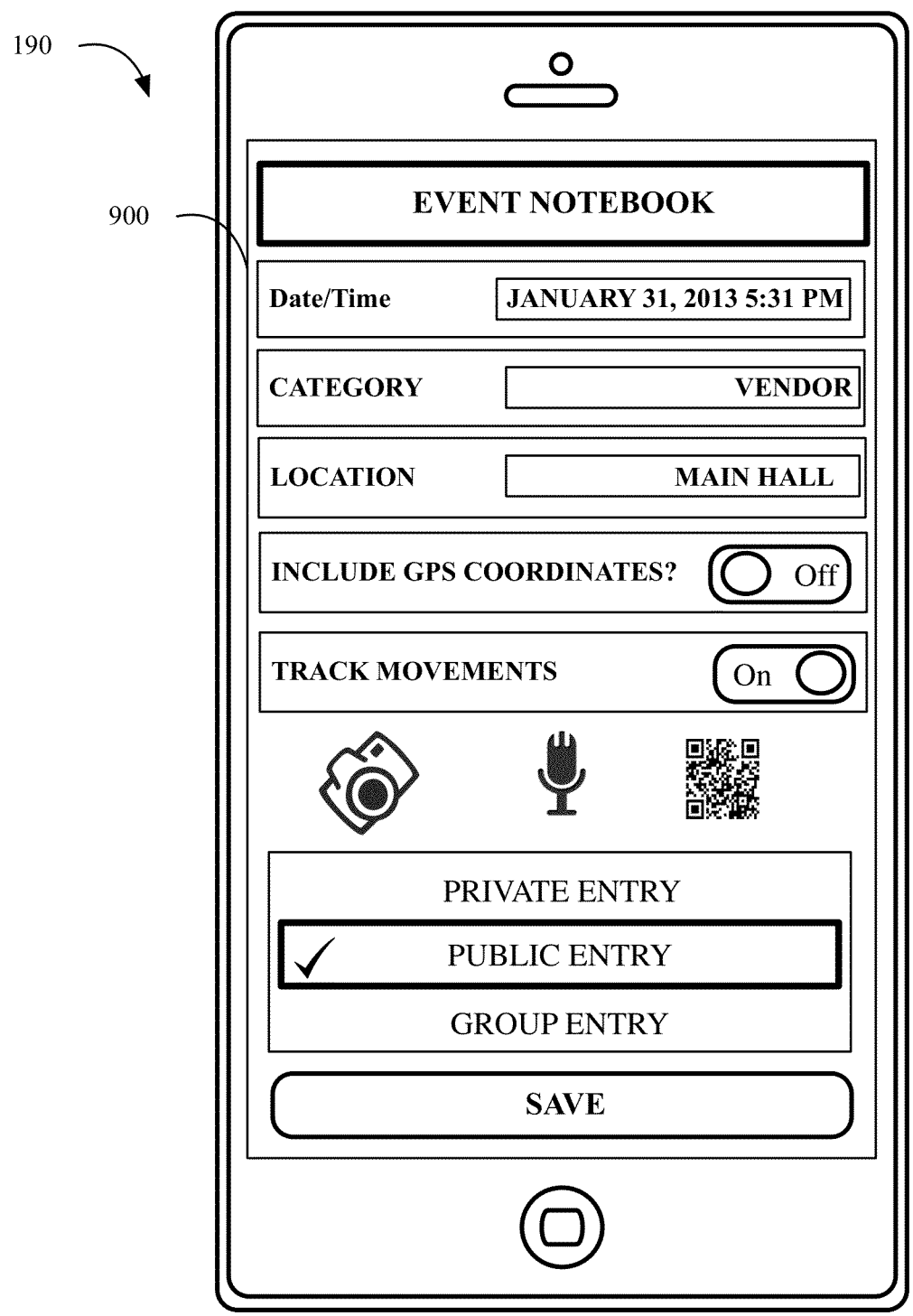
FIG. 9 is a schematic diagram of a user interface for accessing certain event notebook functions of an enhanced communication and event management in accordance with a preferred exemplary embodiment of the present invention.

Referring now to FIG. 9, a user interface 900 for accessing the event notebook management functions of event management mechanism 227 is displayed. Event management mechanism 227 provides each event attendee with options for gathering and organizing conference materials that the event attendee "collects" during the event and will store the materials in a digital "notebook" based on the event attendee's event activity. At the end of each day, event management mechanism 227 could review the event activities in the event notebook and make recommendations for event activities on subsequent days. Once the event attendee has left the event, event management mechanism 227 could also use the contents of the event notebook to recommend event activities for the next event to be held.

The event attendee can automatically capture the date/time for the entry to be added, a category, and a location. The entry can also include the GPS coordinates of the event location and the movements of the event attendee and include a photo, a voice entry, and a QR code as part of the entry. The event attendee can add personalized notes to remind them of what activities they liked, follow up reminders, etc. Handouts for a given seminar or speech may be made available electronically and downloaded in the event notebook for later reference. This will allow the event attendees to attend seminars without worrying about carrying around bags and binders for storing papers.

This material can be displayed by date, location, materials gathered, and then coordinate with the activity in the form of a digital document or report that may be shared with other event attendees, co-workers, supervisors, etc. The event attendee will be able to select what digital notebook content will be shared from their notebook by marking each event item added to their the notebook with a privacy tag (e.g., private entry, public entry, group entry). For example, an event attendee may visit a vendor booth and find the material to be extremely valuable. The event attendee may take a photograph, make an audio entry, or scan a QR or bar code. By scanning a bar code or QR code at the booth, the URL or information associated with that vendor's booth will be stored in the event attendee's digital event notebook.

The event attendee can mark each event item entered into their digital event notebook as a public entry, a private entry, or a group entry. A private entry will be accessible only to the event attendee that added the item to their digital event notebook. A public entry will be added to the digital event notebook and will be accessible by all other event attendees, sponsors, vendors, etc. A group entry will be available to the designated group or groups selected by the event attendee (e.g., co-worker group, friend group, etc.). In this fashion, the contents of each event attendee's digital event notebook may be shared with the desired audience.

Similarly, with the process in place, the group entries reports from all employees for a given company, department or supervisor can have their event notebook entries aggregated into a single event notebook that could be made available to their managers. The event notebook entries could be "scrubbed" to remove duplicate entries and sorted based on time, location, category, etc. These various entries could be displayed on an event activity map as well. The identity of the event notebook entry author could be displayed or concealed, depending on the preferences of the event attendees and/or their supervisors. This provides a way to share important event activities with a broad audience, including those who may not have attended the event.

As part of providing enhanced communication and event management, the various implementations of the present invention are also provided as a computer system configured to allow for customizable communication options in a multi-user, multi-organizational environment, including in the event management environment. The system focuses on providing significant customization of the communications methodology, delivery, and relevance by focusing on security, feed consumer preferences, and flexibility. User interface 224 will allow the feed consumer to specify which communication feeds are most relevant to the feed consumer according to the feed consumer's needs and desires. Additional embodiments provide for automated or enhanced communication selection by using variables such as place, time, feed consumer affiliation, etc. to prioritize and adapt communication streams or feeds for a specific person or organization. While useful for many environments, the most preferred embodiments of the present invention are adapted for use in conjunction with communications for events and educational environment to provide school administrators, teachers, parents, and students with enhanced customizable communication capabilities.

Those skilled in the art will recognize that with all of the information gathered by event management mechanism 227, the event organizers or sponsors will be able to mine the data in database 223 to extract a great deal of information that can be used to enhance and improve the event for event attendees. For example, a dynamic conference schedule can be adopted and deployed for multi-day events. If a particular series of programs is not well attended one the first day and if event attendees are leaving certain events or seminars early, the event organizers can cancel or reschedule event activities s or shift a scheduled event to a smaller venue. Event attendees leaving early may also be indicative of a lack of adequate seating so the event organizer can determine whether or not to add chairs or open up another section of the event activity.

In addition, if an event attendee leaves an event activity prior to the scheduled conclusion of the event activity, a survey may be sent to the event attendee to ascertain why the event attendee left early. This will also help the event sponsors create a more dynamic and responsive event as they gather data about event attendee preferences in real time. If a large number of event attendees are arriving late to an event activity, it may be the result of "word of mouth" from other event attendees encouraging attendance at the event activity. The event organizer can also monitor overall attendance at any given event activity and determine when an event activity is "oversubscribed."

Similarly, at the end of each day or at the end of the event, the event organizers can determine which event activities were most popular, which event activities had the most event attendees in attendance and/or leave early, etc. All of this information may be presented in a "dashboard" with the ability to expand or contract the various pieces of information. A more robust feature set may be included in a desktop or laptop application and a more limited version may be available for mobile communication devices 190. This would allow the event organizers to wander around the event venue and gather real time information on the event and the event activities.

Certain preferred embodiments of the present invention are specifically designed to provide a user-configurable platform for integration of communication sources or "feeds" from multiple disparate sources, including schools, community groups, commercial enterprises, social media networks, municipalities, etc. Specifically, the present invention provides for flexible and customizable configuration of messages and communication streams or feeds that allow for more effective and efficient communication between individuals and organizations.

For purposes of this disclosure, a "communication feed" is any type of communication or message generated by a person or entity that is meant for consumption by another person or entity. This definition includes standard media broadcast signals, RSS feeds, Twitter® "tweets," Facebook® and other social media posts, SMS text messages, pre-recorded audio and video streams, etc. In the most preferred embodiments of the present invention, at least one educational communication feed, generated by a school or school district will be provided. The educational communication feed may be directed towards a parent and will generally contain information about the parent's child and school. The communication feeds described herein are most preferably streamed to a mobile phone or other portable communication device.

This may include school activity information and information about the child's class or about activities for students at the same grade level as the child. In other preferred embodiments, the communication feed may be a personalized communication feed, containing both public information and confidential or private information that would not be shared with any other person or group. This type of communication feed is also known as a "personalized feed", which contains confidential information about an individual, such as a parent, and/or an individual's affiliate, such as a parent's child; examples of confidential information of a personal feed are: student performance metrics such as test scores, attendance history, other student-related measurements, an individual's utility bill, notification that the city received an individual's payment for the individual's water bill, changes to an individual's trash day, notification that an individual's street needs to be immediately evacuated, a response by the city's maintenance crew to an individual's request for service, and a warning that an individual's fence's color violates an city ordinance. In some preferred embodiments, a personal educational feed is provided, which is a personal feed that is aggregated with an educational communication feed.

It should be noted that as used herein, any given "communication feed", also known as a "feed", may be a feed from a single source or it may be an aggregated feed from multiple sources. For example, a "football feed" may be aggregated from a series of other feeds with each football team in a given area providing a feed. A consumer of the information feeds may select individual football team feeds or the aggregated "football feed," depending on their preferences. In this fashion, an aggregated feed may comprise multiple aggregated feeds from a plurality of sources as well as feeds from a single source and no such feed is excluded.

In yet another preferred embodiment of the present invention, an organization communication feed may be generated by a commercial business enterprise, a trade union, a fraternal organization, or a state or local governmental agency or municipality and include information of importance to their communities and constituencies. In some preferred embodiments, a private organization communication feed may be generated which contains information from a personal feed which is aggregated with a organization communication feed. Additionally, other types of communication feeds may be generated by news agencies, sports teams, entertainment venues, etc. All of these communications feeds may be made available via various technologies.

The term "external feed" will generally refer to content initially provided by a source other than database 223 of FIG. 2 such as an independent news organization providing news articles pertaining to a specific topic. For example, ESPN may have an RSS feed containing articles about "NFL football." This would be an external feed and the information for accessing the feed could be stored in database 223 without necessarily storing the content associated with the external feed in database 223.

The term "locally stored feed" will generally refer to a feed stored in database 223 of FIG. 2. This may include one or more feeds aggregated from multiple external feeds, where the content has also been downloaded and stored in database 223. For example, the ESPN® NFL® football RSS feed may be aggregated with the NBC® NFL® football RSS feed and the NCAA® football RSS feed to create an aggregated "football" feed, which can be selected by and delivered to one or more consumers of the football feed. Database 223 will typically contain multiple locally stored feeds.

The term "personal feed" will generally refer to an aggregated feed for an individual user, also known as a "consumer," or "feed consumer" that has been configured for their own consumption. A personal communication feed might contain feed consumer selected locally stored communication feeds and/or external communication feeds. For example, a consumer's personal feed may include a football communication feed, a basketball communication feed, and a local news communication feed. While the public content in a personal communication feed may be shared with other consumers of other communication feeds, a personal communication feed may also include confidential or proprietary information that is only made accessible to the consumer of that specific personal communication feed.

The term "Community Information App" (CIA) as used herein refers to computer software that runs on a device, such as a mobile device, and provides information about at least one organization to members of a community. In the most preferred embodiments, a feed consumer can download the mobile application version of the CIA from an online store such as the Apple® App Store or Google® Play marketplace. The CIA is part of computer-based system 100 and allows a feed consumer to interact with computer-based system 100 via the CIA. The CIA may contain various configuration and customization settings that allow the feed consumer to tailor the various communication feeds provided by computer-based system 100. In some preferred embodiments of the present invention, the consumer of the aggregated communication feeds provided by data server 130 is an event attendee and the aggregated communication feeds will be accessible and customizable via the graphical user interface provided in conjunction with mobile communication device 190 while the event attendee is attending an event as well as before and after the event.

In at least one preferred embodiment of the present invention, database 223 of FIG. 2 will typically include a plurality of database records containing information about multiple schools and students (e.g., school location, student names, grades, dates and times of attendance, etc.) as well as information about teachers and parents (e.g., names and addresses, contact information, employment information, family information, etc.), and entries which are defined as specific situation/circumstances for various performance and event applications (e.g., club, sports, or other extracurricular participation data for identifying relevant communication feeds for a student or group of students) as well as information providing for tracking, analyzing and reporting student metrics in a communication feed that could be provided to interested and authorized persons via the users of computer-based system 100 of FIG. 1.

In addition, even if the actual information used to create the communication feed is not stored in database 223, the parameters and requirements for accessing and distributing various communication feeds, provided by unaffiliated entities, may also be stored and maintained in database 223. This includes detailed information about each user or group of users, including user preferences, permissions, etc. In this fashion, a user with access to database 223 will be provided with the capability of accessing multiple communication feeds from a variety of disparate sources. For example, in some instances, database 223 may contain an address to an external feed and a topic/title for that feed. By storing the address and topic or title, the external feed can be accessed as necessary or desired. Aggregation of multiple external feeds may include downloading the content and storing a summary of the content, a link associated with the content, photos, etc. in database 223, depending on what is available in each content source.

In at least one preferred embodiment of the present invention, teachers and staff members can add relevant information to database 223 of FIG. 2 in order to enhance the accuracy of the recommended communication feeds for their school. For example, teachers may be able to create specialty feeds for their class or students. Coaches may be able to create specialty feed for their sport or team. This will allow for more highly customized aggregated communication feeds, based on the availability of the communication feeds. For example, an aggregated feed may contain content from a variety of external sources. A football coach can customize a feed to include multiple external feeds about "trick plays," "rule changes," and "modern safety equipment." This feed may be used as the coach's personal feed, or this may be a feed the coach makes available for subscription by his assistant coaches, players, parents, etc. This aggregated feed may be stored in database 223 as a local feed. In addition, multiple local feeds may be used to aggregate content from the same external feeds. Subscribers of local feeds with duplicate content will not cause duplicate content to be presented to the feed consumer. Similarly, the administration may want to link certain communication feeds together so the selection of one communication feed automatically triggers the inclusion of another, related communication feed. In this manner, the most valuable communication feeds can be more quickly and efficiently aggregated.

When a feed consumer accesses a feed, a calendar, a home page icon, custom links to websites which have been selected by the feed consumer from a library of available links that has been provided by a person other than the feed consumer (e.g., a feed curator), or other content items from various available communication feeds, the CIA determines whether the feed consumer has selected a target language other than the default language, and if so, then the CIA sends a request to the communication server 225 to query database 223 to determine if the requested content has already been translated and stored in database 223. If the response to the query is that the requested content has not been translated and stored in database 223, communication server 225 then sends a request to a translation service, such as the Google® Translate service or the Bing® Translator service.

In the most preferred embodiments of the present invention, a translation request is sent via HTTP. In the request, communication server 225 sends to the translation service the following information: the content, which is supposed to be translated, the source language, and the target language. In the most preferred embodiments, each entry is associated with an entry unique identifier and each language is associated with a unique language identifier. When communication server 225 receives the translated content from the translation service, then communication server 225 sends the translated content to the CIA so that the CIA can display the translated content to the feed consumer.

In at least one preferred embodiment of the present invention, communication server 225 also saves the translated content in database 223 by associating the translated content with a unique identifier and a corresponding language unique identifier so that communication server 225 can retrieve the translated content from database 223 in the future if a feed consumer's CIA requests a translation of content in target language, the content has already been translated, and the translation has been saved to database 223. Translations for different types of content can be stored and retrieved by using variations of the above-mentioned method; for example, the content of a calendar is associated with a calendar unique identifier and the content of an RSS feed is associated with a RSS feed unique identifier.

Some content items displayed by CIA, such as the titles of buttons, the titles of categories for an organization, or other elements of the user interface are translated by a human or a translation service such as Google Translate and the translated content is then stored within the CIA or on the feed consumer's mobile device. In some embodiments, the communication server periodically checks with the feed consumer's mobile device or the feed consumer's CIA's settings to determine the feed consumer's target language and then automatically provides the feed consumer's CIA with a translated version of the content which has been translated into the feed consumer's target language.

In the most preferred embodiments of the present invention, the source language is English. However, for certain applications the source language could be another language such as Spanish. Feed consumers who understood both Spanish and English might prefer to view an entry in the source language, such as English, if they believed the translation of the entry into a target language, such as Spanish, was suboptimal. In some embodiments, some of the entries or feeds display a button which can be pressed by the feed consumer to instruct the CIA to display the entry or feed in the source language.

When a feed consumer presses the button, the CIA locates and displays the entry or feed using the source language either by retrieving the content from the feed consumer's mobile device if the content has been stored on the mobile device or by instructing communication server 225 to retrieve the content of the entry or feed in the source language from communication server 225. In some embodiments, the button is configured so that the feed consumer can toggle back and forth between the source language and the target language by pressing the button. When the feed consumer presses the button, the CIA sends a request to communication server 225 for communication server 225 to: 1) send the CIA the content translated into the feed consumer's target language if the CIA on the feed consumer's device is displaying the content in the source language; or 2) send the CIA the content composed in the source language if the CIA on the feed consumer's device is displaying the content in the feed consumer's target language.

In some preferred embodiments of the present invention, computer-based system 100 performs ad hoc translation of the user interface while the feed consumer is attempting to use the CIA or during early uses of the CIA after the feed consumer has downloaded the CIA to mobile communication device 190 of FIG. 1, but in the most preferred embodiments, the CIA stores translations of the user interface within the CIA itself or on the mobile device on which the CIA has been installed.

In at least some preferred embodiments of the present invention, a user may be designated as a "curator" to "curate" one or more communication feeds for inclusion in an aggregated communication feed. In this context, a "curator" is an individual or organization that "curates" one or more communication feeds and who has been authorized or granted permission to select feeds for organizations and individual feed consumers, which have been organized for representation in a hierarchal model. A curated communication is designated as a trusted status for a communication feed provided to an organization or sub-organization such that communication server 225 will make the curated communication feed available to feed consumers who have been authorized to receive feeds from the organization or sub-organization. In the most preferred embodiments of the present invention, only a curator who has been given permission to curate for organizations at a specific level or at a specific level including sub-organizations will be shown a user interface for curating feeds and will be allowed to curate feeds. The identification and permissions associated with the communication feed curation activity will be managed and controlled by security mechanism 226 of FIG. 2.

In at least some preferred embodiments of the present invention, the curator is allowed to curate at least one upper level of the hierarchy and at least one lower level of the hierarchy but not a level of the hierarchy that is between the upper level and the lower level. When a curator or user clicks on a link for the top level such as a district link, the curator is shown a list of links for sub-organizations of the top-level organization, such as schools within a school district. In other preferred embodiments of the present invention, when a curator clicks on a link for a school, an additional layer of the hierarchy is displayed such as links for the teachers teaching at that school. When a curator clicks on the link for a teacher at a school, a user or a person other than the user are displayed a list of classes which are taught by that teacher or a list of feeds which may be published by that teacher. At any level of the hierarchy, multiple feeds may be available. For example, at the district level, a district may have a "band feed" for anyone who is interested in learning more about the district's band program and a "football feed" for anyone who is interested in learning about the different football teams in the school district.

Curators are most preferably assigned an organizational level. For example, in an educational application: Smith County School District, Area 1 through Area 3, School, Teacher, Class, Students/Parents are all different levels of the Smith County School District organization, with the top level being the Smith County School District. An example of the hierarchy for a consortium is as follows: a consortium is a top level organization, the sub-organization to a consortium is a school district; the sub-organization of a school district is a department; the sub-organization of a department is a teacher, the sub-organization of a teacher is a class.

In the example which is disclosed above, the curator for a consortium is the consortium head or the consortium head's delegate, such as the consortium head's administrative assistant; the curator for a district is the district superintendent, the district superintendent's administrative assistant, assistant superintendents, and the assistant superintendent's staff; the curator for a school is a principal and/or the principal's staff; the curator for a department is a department head; the curator for a teacher is a teacher; the curator for a class is also a teacher. In other preferred embodiments of the present invention, the levels of the organization in order of top level to lowest level are: City Mayor, City Manager/Police Chief/Fire Chief, City Manager's Staff/Police Chief's Staff/Fire Chief's Staff, Lower Level Staff/Police Officers/Fire Fighters, and Residents of the City. The hierarchical nature of an organization is such that the top-level organization is organized with other sub-organizations at sublevels below the top-level organization.

As described herein, a sub-organization may be an entity, such as a school, department or class, or a person, such as a teacher. System administrators may grant permission to individuals and groups of individuals to curate feeds for organizations in the hierarchy of the organization. A curator may be assigned permission to curate for an organization and its sub-organization. A curator can curate a feed for the organization at its level and any sub-organization to the organization. The user interface is customized depending on which level or levels of the hierarchy for which the a curator has been granted permission to curate so that after a curator has logged in to communication server 225, the curator's organization and any other organizations or individuals that are located on sublevels to the level of the administrator's organization are displayed.

Many online content sources that may be included in the communication feeds of the present invention have established protocols so that various methods can be used to programmatically access the online content source and receive information. For example, Twitter®, Facebook®, and Tumblr® have published specifications so that other websites and programs can subscribe to various feeds coming from the social media site. Types of social media sites or services that could be used with computer-based system 100 include Facebook® wall posts, Twitter® feeds, RSS feeds, Atom® feeds, YouTube® channels, calendars, and custom links that are provided with an API.

By using a configuration page, an administrator for computer-based system 100 can determine the default websites and communication feeds that will be displayed to the feed consumers. The configuration page can be accessed for configuration by authorized users at multiple levels, including both the district level and at the school level in an educational environment. For example, in one embodiment the information about which organization is being configured is displayed on the right hand side of the screen of the administrator interface. In some embodiments, certain hyperlinks in the user interface will be linked to the district level configuration of communication feeds. Alternatively, a link in the user interface may provide a description of schools in a particular region of a given school district, such as a city within the school district's boundaries.

When an administrator selects the link, such as by pressing on the link with their cursor, then computer-based system 100 displays the schools that belong to that region. In some embodiments, the schools that belong to that region can be divided by category, such as by "high school", "middle school", or "elementary school". In some preferred embodiments, computer-based system 100 displays an arrow icon to the left of the subheading "high school", "middle school", or "elementary school". When a user selects the arrow, then the schools that belong to the category are then displayed below the category, such as "Westdale High School."

In some preferred embodiments of the present invention, the heading for the schools in the city, such as "Westdale City Schools" and the subheadings for the schools of a specific type that fall within a region, such as "high school", are also located next to a group of icons. This group of icons may represent the different type of social media feeds, such as an icon representing the "Facebook® feed" or the RSS Feed, that have been validated for that school or group of schools. When an icon appears to the side of a category for a school, such as next to the Westdale Elementary School, then the administrator can know that the schools in that particular heading have already been configured with the type of social media that is represented by the icon.

In some preferred embodiments of the present invention, computer-based system 100 uses an API to request information from a website. User interface 224 of FIG. 2 comprises a configuration page for the system has a text box where an administrator can enter information about links or the actual link itself. In the most preferred embodiments of the present invention, there are multiple ways to search for link related information including: i) searching for an URL link; ii) searching for the last portion of an URL link; and iii) conducting a keyword search. For example, an administrator that had created a Facebook® wall named "Hector Scout's Facebook Wall" can type or paste into the box "Hector Scout's Facebook Wall" into the box. The user presses an "Add" button, and then computer-based system 100 sends a request to the Facebook® website for information about all Facebook® walls with that title. If the Facebook® website API finds the title of a Facebook® wall that matches the requested title, then the Facebook® website will usually send the requested information to computer-based system 100. Computer-based system 100 then receives the relevant information from the Facebook® website and stores that information in database 223 of FIG. 2 so that it can be included in any relevant communication feed.

In some embodiments computer-based system 100 receives at least one of the following: title of the social media site; subtitle; the location of the title of the social media, the date and time that computer-based system 100 received an update about the information that is stored about the social media site; and additional identification numbers. Some of the information, such as an identification number, can be used when computer-based system 100 lists entries or lists posts for a specific location, such as Hector Scout's Facebook wall. When computer-based system 100 has validated a link, computer-based system 100 may display the link using a different font and typeface, such as a blue underlined font. Computer-based system 100 may authenticate a link when computer-based system 100 receives information from a website that verifies that the requested site, such as Hector Scout's Facebook Wall, exists. In this case, the Twitter "handle" for a person named Hector Scout has been validated, and computer-based system 100 displays the validated Twitter handle in a blue font that is underlined.

Another type of social media feed that can be validated by computer-based system 100 is a calendar. Some calendars follow industry-standard formats such as iCal®, Google® Calendar's format, or the format of Outlook® calendars. Computer-based system 100 is configured to take XML or other calendar information, parse it for relevant data, extract the data, and then present that data in a native calendar format (e.g., native iPhone calendar format). The calendar is then more interactive then a PDF and actual events on the calendar. If the calendar is stored on a website in a non-native format, such as the PDF format, then computer-based system 100 will display the calendar in PDF format if a feed consumer selects the icon associated with the calendar link when using the user interface. Administrators of computer-based system 100 may enter in the URL, key word, or title associated with a specific calendar. After the feed consumer has pressed the "Add" button, then in some embodiments computer-based system 100 will send a request to the website that is listed in the URL; the request may contain a request for information from the website.

Computer-based system 100 then receives and stores responses from the website; if computer-based system 100 receives a notification that the website has validated the URL, the title of the calendar, or the keyword of the calendar, then computer-based system 100 may display the title of the calendar in a different font or format or both. Another type of social media feed that can be added to computer-based system 100 are "Custom Links", which includes any link to a site that sends and receives information. For example, in the above figure, computer-based system 100 displays a button entitled "New Link". When an administrator clicks on the "New Link" button, then computer-based system 100 displays a box that is entitled "Edit Link". The "Edit Link" box may have the heading "Title" which is followed by a text box. Administrators may enter the title of the new link into that text box. Below the "Title" heading and its associated text box may be located another text box with a title of "Links to".

Administrators may then paste or type into the text box a link that is associated with the title of "Links to" http links, such as http://cafeteria.com. Below that text box may also be buttons for saving or deleting the information that has been entered into the Edit Link box. Computer-based system 100 may also display in the Edit Link box another icon that is labeled "Choose an Icon" and is also labeled below the icon with the title such as "Cafeteria". If an administrator clicks on the "Choose an Icon" icon, then computer-based system 100 displays at least one icon to the administrator so that the administrator may select an icon to be displayed to feed consumers on the feed consumer's mobile devices.

For example, an administrator could select the icon with a chalkboard that has the word "Menu" written on the face of the chalkboard; by selecting that icon, the administrator instructs computer-based system 100 to associate that link with the Cafeteria link. Once an administrator has used computer-based system 100 to validate the link such as Cafeteria.com, then computer-based system 100 can display the icon that has been associated with Cafeteria.com within the community information mobile application on the mobile devices of feed consumers. Then, a feed consumer may select the Cafeteria icon on their mobile device, and the mobile application on the mobile device will then direct the feed consumer to the cafeteria.com website. At the cafeteria.com website, the feed consumer can enter in information or make purchases such as adding ten dollars to the lunch account balance for one of the feed consumer's students.

In some embodiments of the present invention, the feed consumer enters in a user name and password to the community information application that may be a mobile application for a mobile device or may be an application that is implemented by a web browser. Once the community information application has authenticated the feed consumer, then in some embodiments the feed consumer is also authenticated, that is, verified the login credentials of the feed consumer, at other linked website such as Cafeteria.com. The community information application sends the user name and password to computer-based system 100, computer-based system 100 verifies that the user name and password match the user name and password of the information of a feed consumer that has been stored in database 223 of FIG. 2, and if computer-based system 100 has authenticated the user's information then computer-based system 100 sends a message to the linked website, such as Cafeteria.com, that a feed consumer with a unique UDID has been authenticated and requests that the linked website allow the feed consumer to automatically login to the linked website if the linked website receives a request from computer-based system 100 (that has first received a request from the community information application on the user's mobile device).

The request may contain the feed consumer's user name for the linked website, the feed consumer's password for the linked website, and the feed consumer's UDID for automated authentication of the user. In some embodiments, the community information application does not activate the automatic authentication feature unless the feed consumer has activated the password feature on the user's mobile device. If the feed consumer has activated the password feature on the user's mobile device and someone other than the feed consumer obtains access to the user's mobile device, this other person cannot get past the password screen without entering the password and cannot access the community information application. Other industry standard validation methodologies known to those skilled in the art may also be employed.

After a user with administrative privileges has validated a link such as Hector Scout's Facebook® Wall, the administrator may then tag the link with a descriptor. In one embodiment if an administrator hovers the administrator's cursor over the name of the validated link, a box appears with a drop-down menu for the descriptor. The descriptor could be a previously configured general descriptor such as "News", "Sports", "Superintendent", or a custom descriptor. If an administrator opens up the page for a specific school and then enters and authenticates a news link, then the administrator will have the option of linking a descriptor with that specific feed, such as "Sports." In some preferred embodiments of the present invention, when a feed consumer accesses computer-based system 100 for the first time, computer-based system 100 will come with preconfigured settings or default settings that can be customized by the feed consumer.

For example, in some embodiments the default settings for the parent of a student will ensure that the parent is subscribed to the communication feeds that include the validated links for news from the school that is closest to the parent's living residence. If the administrator for a specific school has also associated the descriptor "News" with a validated link for that specific school, then computer-based system 100 will display that news communication feed until the consumer changes the settings for the consumer's communication feeds provided by computer-based system 100.

In at least some preferred embodiments of the present invention, the user accesses computer-based system 100 via user interface 224 of FIG. 2 and manually subscribes to receive feeds from specific organizations and then computer-based system 100 transmits the user's settings to communication server 225 and communication server 225 then transmits those feeds to the computer-based system 100. In the most preferred embodiments, computer-based system 100 has a security mechanism and once the user has logged in to computer-based system 100 through the security mechanism, computer-based system 100 then determines which organizations are affiliated with the user, such as the elementary school which the user's daughter attends is affiliated with the user as well as the high school in a neighboring school district at which the user is employed, and automatically includes feeds for the organization or organizations in the user's aggregated feed. In the most preferred embodiments, the feeds for a top-level organization are automatically selected for users of computer-based system 100.

In the hierarchical model for the relationship between parents, teachers, schools and the school district, each curator may be assigned a unique identifier that is specific for their level of the hierarchy. A curator may be allowed to add content to a plurality of communication feeds, including the personal feeds for those users in the curator's specified hierarchy. An example of a personal feed is a feed about Mary Smith from Mary Smith's English teacher that is sent to Doug Smith, who is Mary's father. In some embodiments, computer-based system 100 displays a personal communication feed containing a content item with at least one of the following identifiers: the name of the curator or a source indicia for the organization which is the source of the entry, including a graphical element (e.g., a logo or icon), a class name if the feed is a class, a time stamp for the date and time that the entry was sent, a message body containing content such as "Mary turned in all of her homework this week!" a picture of an event, an picture of the curator, a video, a link to an audio recording, the subject's name or an abbreviation representing the subject's name which in this case would be "Mary."

In other preferred embodiments, computer-based system 100 displays a message button at the bottom of the entry, and when the consumer presses on the message button computer-based system 100 displays an interface for the consumer to reply to the curator or a delegate of the curator by email, SMS text, phone message or other type of method. The consumer then enters a message and presses a send button, and computer-based system 100 routes the message through communication server back to the designated recipient. In some embodiments, when a feed consumer presses the reply button, the feed consumer is allowed to designate one or more recipients from a list of potential recipients. In the most preferred embodiments, a unique identifier for each potential recipient and contact information for each recipient, such as an email, are stored and are retrieved by database 223 and communication server 225 when sending reply messages from consumers to designated recipients.

Curators may login to computer-based system 100 via user interface 224 of FIG. 2 and their identity and authorized curation permissions will be authenticated by security mechanism 226. Once authenticated, the curator will have access to manage the organization's feeds and sub-organization's feeds for which the curator has been granted permission. Curators may instruct communication server 225 to show feeds to users or to hide feeds from users, edit titles, edit summaries, change the image associated with a communication feed entry, and set the priority or order for content within individual communication feeds or the order that communication feeds within an aggregated communication feed are presented to users.

For example, a curator may promote an event from a calendar to the top of a communication feed so that the promoted calendar event is the first item in the aggregated communication feed that is displayed to the consumers of the aggregated communication feed. By interacting with user interface 224, the curator may assign different priorities to each piece of content in a given communication feed and a different priority for each communication feed within an aggregated communication feed.

In some preferred embodiments of the present invention, a single content item is displayed within a screen of the CIA and the user selects a button, swipes the screen, or otherwise signals to the CIA to display the next entry. An entry that had been assigned a higher priority would be displayed in the CIA before an entry that had been given lower priority. In some embodiments of the present invention, the display of the multiples entries are shown on the screen such as four entries on the screen or six entries on the screen in different quadrants; the entry with the highest priority could be displayed in the upper left quadrant, the entry with the second highest priority could be displayed in the upper right quadrant, and so forth.

In some preferred embodiments of the present invention, when a user selects the feeds of different organizations or different individuals, computer-based system 100 then aggregates those feeds so that they are presented to the user in a single interface, such as a page which displays summaries of entries or pictures of entries within quadrants which are displayed by a mobile app. Names, abbreviations, initials, or logos can be superimposed on the tile, which may be a picture which represents the entry or the feed, to act as a source indicia for the source of the feed. For example, in some embodiments of the present invention, a school known as Washington School could publish a communication feed and one of the content items within the feed may be an entry about a recent science day activity. A picture of the science day may be displayed to the user as a "tile" or "quadrant" of the screen, and in the bottom corner of the picture could be superimposed the following words: "Wash. School," which acts a source indicia to the feed consumer so that the consumer can determine that the specific feed or entry was published by Washington School and not the school district.

In some preferred embodiments of the present invention, communication server 225 displays entries or feeds in the CIA using an algorithm which determines which entries or feeds are most frequently viewed by other users and then presents the most frequently viewed entries on the upper half of the screen of the user's mobile device. For example, in some embodiments, the CIA presents a picture of the entry or feed in a quadrant of the screen of the user's mobile device; when a user then selects that entry by tapping on the picture, computer-based system 100 then displays a second screen which contains a summary of the entry and also a button which is stated "View the Full Article."

When the user selects the "View the Full Article" button, computer-based system 100 then displays the entire article; computer-based system 100 in some embodiments receives information about when users select the view full article button or when the user taps on the picture of the article. This information is then aggregated for multiple users and used to determine which entries or feeds are most viewed by individuals in an organization. In some embodiments, a button labeled "View on Facebook®" is presented to the user on or near an entry or image of an entry, such as an image of a football game which is associated with an entry about a football game. In some embodiments, a full text of an entry or a summary of the entry may be displayed if the CIA determines that the screen has sufficient space to display the full text of the entry or the summary of the entry.

A "relevant feeds" button may be presented to the user, and when the user taps on the "relevant feeds" button communication server 225 may use an algorithm to select and present other feeds which the individual may be interested; the algorithm may use geo-location data, user preferences, user history for viewing entries, user preferences of others who are affiliated with the user on a social network, geo-location data for the user's work address, and feeds selected by a third-party feed aggregator. In other embodiments, the CIA determines which entries or feeds are associated with at least one picture and then displays the entries or feeds which are associated with at least one picture in a location which is more likely to be viewed by the user, such as the upper left hand corner of the screen of the user's mobile device, or temporally before entries or feeds which are not associated with at least one picture.

In some preferred embodiments, users open the CIA on a user device, and the CIA presents a community feed button and a personal feed button. When the user clicks on the community feed button, the CIA shows a community feed page; when the user clicks on the personal feed button, the CIA displays a security mechanism. The user is then allowed to use a login and password and data server 130 (or communication server 225) then authenticates the user by sending a request to data server 130. Once a user has been authenticated, in some embodiments the data server and/or communications server recognizes a unique identifier for the user's device and allows the user to access the personal feeds without logging in via the security mechanism if the user is using the CIA on the user's device, which is also known as an "auto login" feature. In some embodiments, the user selects an auto login feature before the auto login feature is activated. In other embodiments, the CIA displays a notification warning the user that it has selected the auto login feature, recommends that the user install a password in the event someone other than the user attempts to use the user's device, and states that confidential information will be easily accessible to any person who uses the device.

In at least one preferred embodiment of the present invention, unless the auto login feature has been disabled, once the user has been authenticated as a user who has account details in the database, the CIA requests personal feeds from communication server 225 of FIG. 2, communication server 225 requests personal feeds from data server 130, the CIA receives the private communication feeds from communication server 225, and the CIA displays the private communication feeds available to the user. Personal feeds are feeds which contain confidential information and/or information that is most relevant to a user or a user's affiliates; for example, once a user has clicked on the personal feed button, CIA may show an additional button which is labeled with the name of the user's daughter and may optionally display a picture of the user's daughter.

When a user clicks on the additional button, one or more private communication feeds containing confidential information and/or information relevant to the user's daughter may be displayed. Private communication feeds may include some or all the following types of information: attendance messages about a student, grade changes of a student, current course, test, homework, and quiz grades, upcoming homework assignments, cafeteria balances, entries and communication feeds by teachers of the student, entries and feeds by organizations affiliated with the student such as the high school's volleyball team, missing homework alerts, and emergency alerts such as an unexpected school closing. Personal feeds may be combined with other communication feeds in the form of an aggregated communication feed.

In some preferred embodiments of the present invention, the CIA displays a plurality of filters which are configured so that the user can instruct the CIA to limit the information displayed in the personal feed (or the community feed), such as only showing entries posted by teachers of a student, only displaying information for one student if the user is affiliated with more than one student, only showing attendance messages about students, and so forth. In some embodiments, the user may change the sort order for different type of entries in the personal feed; for example, a user may configure the CIA so that all sports entries are shown last. In some embodiments, different types of entries are highlighted using different borders, symbols, text, or colors in order to allow the user to quickly determine the type of an entry, such as whether an entry is a general news entry, a sports entry, or a music entry.

In at least some preferred embodiments of the present invention, once the user has been identified and authenticated, the user interface for the CIA displays a "settings button" and when a user presses the "settings button," the user is shown a settings page where the user can configure the CIA and the data server/and or the communication server to send alerts to the user when a student's grade drops below a certain threshold or raises above a certain threshold, when the data server determines a student has a missing assignment, or when the data server and/or communication server have determined that a user is absent.

Alerts can be: 1) notifications that are displayed within the app; 2) push notifications; or 3) other types of alerts such as phone calls, emails, or SMS text messages. The user can configure the types and mode of alerts that will be sent to the user by configuring the settings page of the CIA. Users can customize the CIA so that the alerts are displayed as entries belonging to one or more feeds in the CIA. Alternatively, users can customizes the CIA so that alerts are received as phone calls, emails, or text messages separate from the CIA.

It is anticipated that communication server 225 will be configured to generate and transmit various communication feeds that contain a plurality of audio files or "clips" where each audio message event may contain multiple discrete elements. For example, each communication feed may contain standardized pre-recorded audio clips; audio clips generated by an automated text-to-speech computer program, and contemporaneously recorded audio clips that are unique to a specific customized communication feed. In some preferred embodiments, communication server 225 is configured to generate and transmit various communication feeds that contain a plurality of video files. Additionally, dynamic audio clips, using elements extracted from database 223, that are associated with a specific individual, may also be included in a customized communication feed. For example, a generic introduction or greeting from the supervisor or teacher associated with a specific individual may be included, a facility identifier (e.g., school, factory, or office building location associated with the at least one individual), as well as the purpose for inclusion of the specific content in the communication feed (e.g. expression of concern, encouraging message, etc.).

Figure 10:
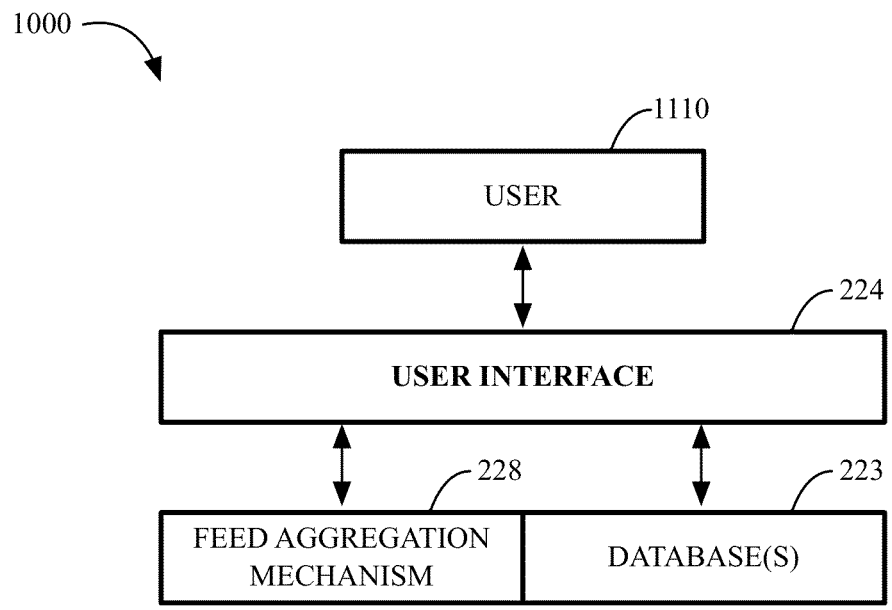
FIG. 10 is a block diagram illustrating the interaction of components of a computer-based system for enhanced communication and event management in accordance with a preferred exemplary embodiment of the present invention.

Referring now to FIG. 2 and FIG. 10, a user 1000 will interact with user interface 224. By accessing user interface 224, user 1000 can input and modify the data contained in database(s) 223. User 1000 can also interact with feed aggregation mechanism 228 to create a customized communication feed that will be received by the user. Specifically, user 1000 can input information about user 1000 such as demographic information, geographic information, preferences, religious, civic, and organizational affiliations. Additionally, by including employment information and personal relationship information, further enhancements to the customized communication feed can be provided to user 1000. In a typical educational environment, information about user 1000 can be used to automatically select one or more appropriate feeds for a parent, school and a specific pupil at a school. The automatically selected communication feed or feeds could then be further customized by user 1000. Additionally, user 1000 may be authorized to specify parameters for creating customized communication feeds for other feed consumers or groups of feed consumers (e.g. parents of students at a school or workers at an employer). This would, in effect, make them a "curator" for that communication feed.

Feed aggregation mechanism 228 will access the data contained in database(s) 223 and identify all possible communication feeds that are available to user 1000 and then programmatically and/or manually create a customized communication feed for the feed consumer, based on feed consumer preferences, demographics, physical location, affiliations, etc. Additionally, feed aggregation mechanism 228 may be configured to access the data contained in database(s) 223 and propose possible communication feeds or combinations of communication feeds to feed consumer 300 via user interface 224.

Figure 11:
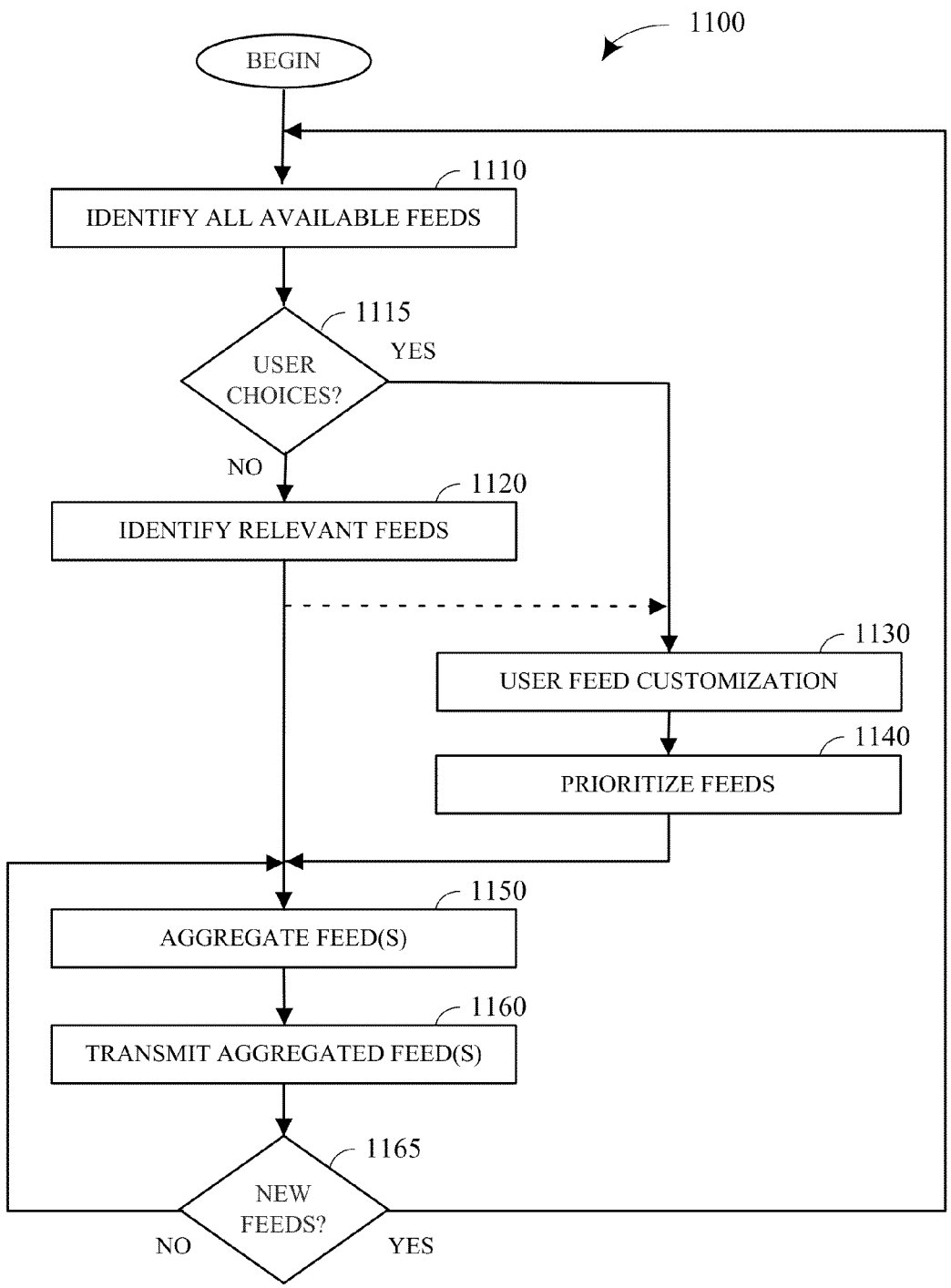
FIG. 11 is a flow chart of a method for implementing a computer-based system for enhanced communication and event management in accordance with a preferred exemplary embodiment of the present invention.

Referring now to FIG. 11, an overall process and method 1100 for creating customized communication feeds in accordance with a preferred embodiment of the present invention is shown. In the most preferred embodiments of the present invention, method 1100 is a computer-implemented method used in conjunction with the hardware and software described in conjunction with FIG. 1, FIG. 2, and FIG. 10.

As shown in FIG. 11, the first step is generally to identify all available communication feeds, regardless of their source, purpose or relevancy (e.g., feeds from persons and entities such as companies, municipalities, schools, etc.) (step 1110). It is anticipated that database 223 will contain information available on various feeds and that this information will be periodically updated. In the most preferred embodiments of the present invention, and where desirable, the communication feed content may be stored in database(s) 223 of FIG. 2 but it is more likely that the information needed to access the communication feeds will be stored instead. Additional information on the types of communication feed content and information that may be relevant for step 1110 is discussed below. It is anticipated that multiple external feeds may be aggregated and stored in database 223 as an internal feed that is accessible to feed consumers of system 100.

Next, computer-based system 100 will evaluate whether or not user customization is allowed for a given user (step 1115). This may be evaluated on a user-by-user basis. It is important to note that while a customized communication feed may be initially identified, the final selection of the component communication feeds that comprise the aggregated communication feeds may be performed on an automated basis or an "ad hoc" basis by the feed consumer. Additionally, as shown by the dotted line in FIG. 11, in at least some preferred embodiments of the present invention, an automated selection of potential communication feeds may be presented to the feed consumer and the feed consumer may then modify the collection of potential communication feeds to include more or less than the initially identified communication feeds.

If no user customization is allowed (step 1115="NO"), then computer-based system 100 will simply use the predetermined algorithm(s) to select the relevant feeds for the feed consumer (step 1120). The selection process will typically include the use of the feed consumer data contained in databases 223 of FIG. 2. This information may be situational, geographical, demographical, or automatically derived from user behavior over time. For example, at least some relevant communication feeds may be selected on the basis of the geographical location of the feed consumer. In the case of an educational environment, various school communication feeds may be initially identified as being provided to residents of the community where the feed consumer resided. Similarly, if a feed consumer has created one or more custom feeds containing sports information, additional related feeds may be included. As previously mentioned, the feed consumer may also have the option of further customizing the aggregated feed to include or exclude certain internal or external feed content.

The set of potential communication feeds may be further refined by evaluating additional data. For example, if the feed consumer has a child attending a local high school but not middle school or elementary school, computer-based system 100 may remove the communication feeds provided by the middle school or the elementary school from the aggregated communication feed. Similarly, if the high school provides communication feeds from multiple teachers, only the teachers that are teaching the feed consumer's student will be selected for inclusion in the aggregated communication feed. This provides for customization of the aggregated communication feed based on a teacher-student relationship.

Similarly, a specific communication feed may also be selected for inclusion in an aggregated communication feed based on other relationships including sibling relationships, friend relationships, homeroom for each student, similarity of class schedules, extra-curricular activities, etc. Similarly, a communication feed that is relevant to a group of feed consumers in a specific geographical location (e.g., neighborhood) may not be relevant all other feed consumers who live in a different geographical location, even if their children attend the same school. Once again, this distinction can be used to customize the specific content of a communication feed for each participant or consumer of a communication feed.

In at least one preferred embodiment of the present invention, a consumer of a communication feed will be identified by login credentials (e.g., a user ID and password) stored in database 223 of FIG. 2 and verified by security mechanism 226 of FIG. 2. Each consumer of a communication feed will have a user account with information relative to identifying that feed consumer and relevant communication feeds. For example, the feed consumer may be identified as a parent of several children and the communication feed for each child's school and each child's teacher(s) may be automatically included in the parent's aggregated communication feed based on the parent/child relationship, not necessarily a geographic location.

Alternatively, if individual user customization is permitted (step 1115="YES") then the feed consumer will be provided with the option of selecting the desired communication feed(s) from the universe of available communication feeds (step 1130). In this case, the feed consumer will be provided with the descriptive information about the available feeds from database 223 of FIG. 2. The feed consumer will then be provided with an opportunity to prioritize the selected feeds, if desired (step 1140). In some embodiments, feed consumers can prioritize the order in which different feeds are displayed in the CIA; in other embodiments, users other than the ultimate feed consumer of the communication feed can override the consumer's preferences. For example, in some preferred embodiments of the present invention, a consumer might attempt to configure the CIA so that they do not receive any alerts about High School A and the administrators at High School A can override the consumer's configuration thereby ensuring that the consumer's communication feed includes at least one feed from High School A. This would be considered a "mandatory" feed.

Once the desired communication feeds have been identified by computer-based system 100 and/or the feed consumer, the selected feeds will be aggregated (step 1150) and transmitted to the feed consumer via the selected methodology (step 1160). It should be noted that the delivery method could be selected by computer-based system 100 and/or the feed consumer, based on the feed consumer's account preference information contained in database 223 of FIG. 2 as well as the practical limitations of the feed consumer's device(s). If the feed consumer's device has a mobile app or web interface capability, the delivery method for the aggregated feed would be a scrollable news page. If mobile communication device 190 is capable of receiving email, the delivery method for the aggregated communication feed could be a list of content summaries with links to the full content. Over a feature phone, the delivery method for the aggregated feed could be text-to-speech translation summarizing the content. The delivery of the aggregated communication feed will continue until modified or otherwise terminated by computer-based system 100 or the feed consumer.

Next, computer-based system for enhanced communication and event management 100 of FIG. 1 can be configured to periodically check for changes in the available communication feeds (step 1165). This may be the inclusion of new communication feeds or the elimination of existing communication feeds. Additionally, the periodic check may include adding new content, deleting old or expired content, and updating existing content for all feeds. If changes have occurred (step 1165="YES") then computer-based system 100 will return to step 1110 and repeat the communication feed customization process once again. Otherwise (step 1165="NO"), computer-based system 100 will continue to deliver the customized feed to the feed consumer on the selected periodic basis (step 1160). In this manner, the feed consumer can receive the desired communication feeds at the desired intervals.

Figure 12:
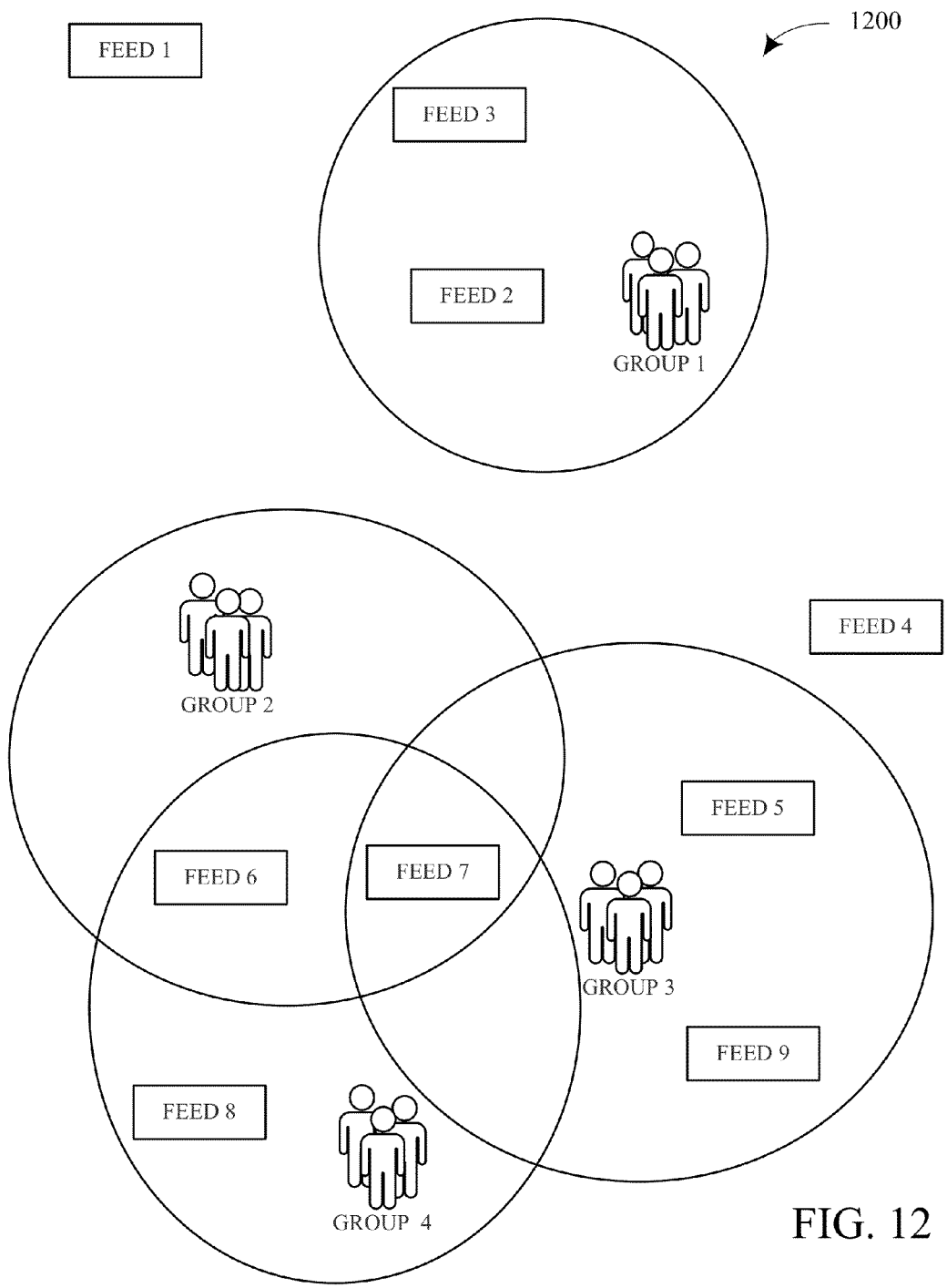
FIG. 12 is a block diagram for identifying one or more feeds for inclusion in an aggregated feed created by a computer-based system for enhanced communication and event management in accordance with a preferred exemplary embodiment of the present invention.

Referring now to FIG. 12, a schematic diagram 1200 representing the environment for creation of customized communication feeds is depicted. As shown in FIG. 12, various groups are eligible to access various communication feeds, based on a number of factors. It should be noted that each of the "groups," as depicted in FIG. 12, might represent a single individual or groups of individuals. The groups may represent groups selected based on geographic or geo-location data, physical proximity to the source of a communication feed, religious, personal or professional affinity or affiliation, employment affinity, demographic data, personal preference, other factors or any combination of these various factors.

As shown in FIG. 12, Group 1 has been provided with an aggregated communication feed comprising Feed 2 and Feed 3. Group 2 has been provided with an aggregated communication feed comprising Feed 6 and Feed 7. Group 3 has been provided with an aggregated communication feed comprising Feed 5, Feed 7 and Feed 9. Group 4 has been provided with an aggregated communication feed comprising Feed 6, Feed 7 and Feed 8. While Feed 1 and Feed 4 are available, none of the Groups have elected or been selected to include Feed 1 or Feed 4 in their aggregated communication feed because the content of those communication feeds is either irrelevant or of no interest to the various groups.

In an educational environment, Group 2, Group 3, and Group 4 all represent parents who have children attending schools in the same school district. Feed 5 may represent a communication feed provided by a local high school. Group 3 would represent the group of parents who have students attending the high school. Similarly, Feed 6 represents a communication feed emanating from the local middle school and Group 2 represents the parents of the students attending the middle school. Feed 8 represents a communication feed from the local elementary school and Group 4 represents the parents of the students attending the elementary school who have elected to receive the communication feed from the elementary school. Feed 7, available to participants in each of Group 2, Group, and Group 4, represents a communication feed provided by the school district or a communication feed provide by the local municipality.

The participants in Group 1 have elected to receive an aggregated communication feed comprising Feed 3 and Feed 4. These feeds may represent communication feeds provided by national news organizations, local news organizations, local sports teams, or local government entities, sports teams, government entities, etc. In the most preferred embodiments of the present invention, the number of available feeds and the number of feeds selected by the feed consumers will be practically unlimited and the actual content of the aggregated communication feed will be limited only by the ability of the feed consumers to effectively consume the aggregated communication feed. For the most preferred embodiments of the present invention, at least one of the feeds in the aggregated communication feed will be a communication feed provide by an educational institution.

Figure 13:
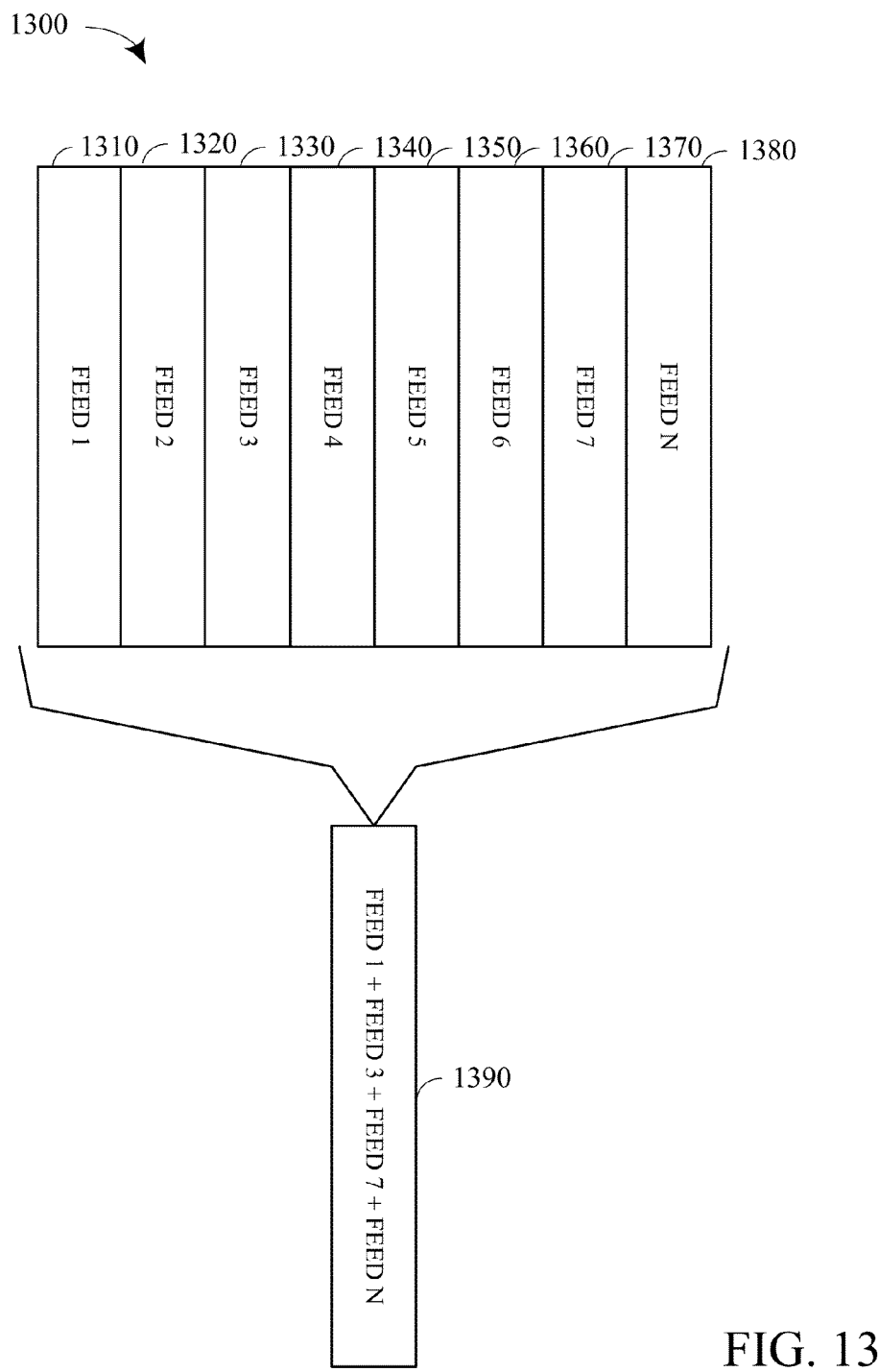
FIG. 13 is a schematic representation of an aggregated feed created by a computer-based system for enhanced communication and event management in accordance with a preferred exemplary embodiment of the present invention.

Referring now to FIG. 13, a block diagram 1300 for an aggregated communication feed 1390 is depicted. As shown in FIG. 13, aggregated communication feed 1390 comprise Feed 1, Feed 2, Feed 3, Feed 4, Feed 5, Feed 6, Feed 7, and Feed N. This highlights the flexibility of the overall process since the actual feeds that comprise aggregated communication feed 1390 may be selected and customized in an unlimited number of ways. In at least one preferred embodiment of the present invention, feed 1390 is a personal feed, defined from internal feeds and external feeds and contains one or more aggregated feeds. It may also contain system selected feeds as well as feeds selected by the feed consumer. The various feeds comprising aggregated feed 1390 may be presented to the feed consumer in chronological order, subject matter order, or some other order as identified in the feed consumer's account preferences.

Figure 14:
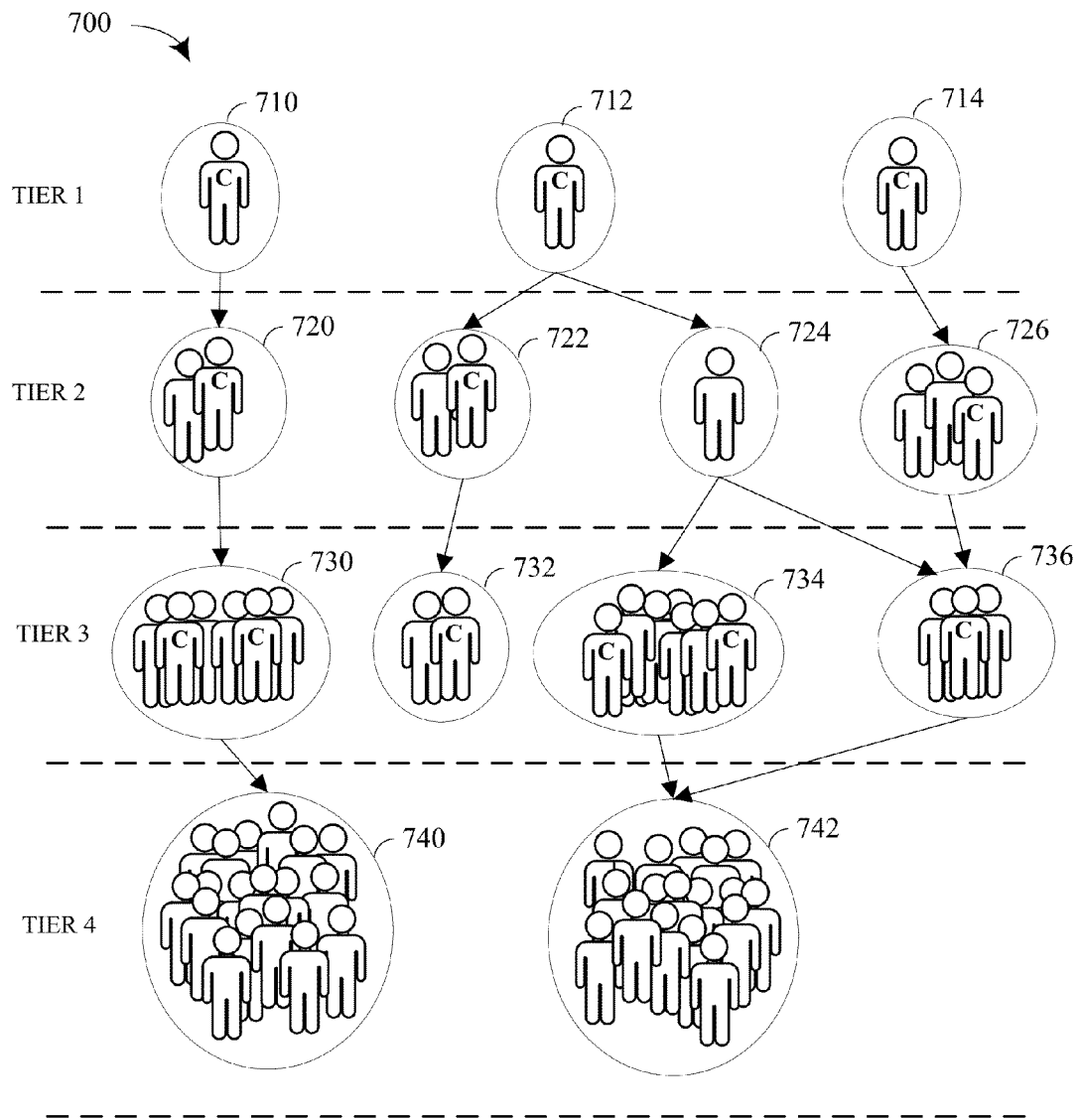
FIG. 14 is a schematic representation of a hierarchy for curated feeds created by a computer-based system for enhanced communication and event management in accordance with a preferred exemplary embodiment of the present invention.

Referring now to FIG. 14, a schematic representation of a hierarchy 1400 for creating and managing curated feeds in accordance with a preferred exemplary embodiment of the present invention is depicted. As previously explained, a "curated" feed is any communication feed that is created or edited by a curator prior to including the communication feed in an aggregated communication feed. As shown in FIG. 14, hierarchy 1400 includes four tiers. Those skilled in the art will recognize that the number of tiers is associated with the actual hierarchical structure being models and, in practice, may include fewer or more than 4 tiers. The arrows in FIG. 14 show the hierarchical relationship for the various curated feeds that may be created by a curator and also illustrate the groups that will receive a curated feed from the appropriate curator. A curator is authorized or designated to curate feeds for groups or individuals who are in the same level as the curator (the "curator level") and the levels that are beneath the curator (each a "curator sub-level") in the hierarchal organization structure model.

In at least one preferred embodiment of the present invention, each aggregated communication feed may comprise one or more "mandatory" curated communication feeds and/or one or more "discretionary" curated communication feeds. A "mandatory" curated communication feed is a communication feed that will be included in every aggregated communication feed presented to a consumer of the aggregated communication feed that created by the curator. The consumer of the aggregated communication feed may not alter the content of the aggregated communication feed to exclude the content items from a mandatory curated communication feed. A "discretionary" curated communication feed is a curated feed that will be initially included in the consumer's aggregated communication feed but that may be eliminated by the consumer of the aggregated communication feed, if the consumer chooses to eliminate the discretionary curated communication feed from the aggregated communication feed.

In FIG. 14, each curator is designated by the letter "C" and this designation carries with it the permission to create one or more curated feeds for the individual consumer of an aggregated feed or a group of consumers of an aggregated feed. At each level, a given person could be designated as a curator (via user interface 224 of FIG. 2) and the permission to create curated feeds would be governed by security mechanism 226 of FIG. 2.

Figure 15:
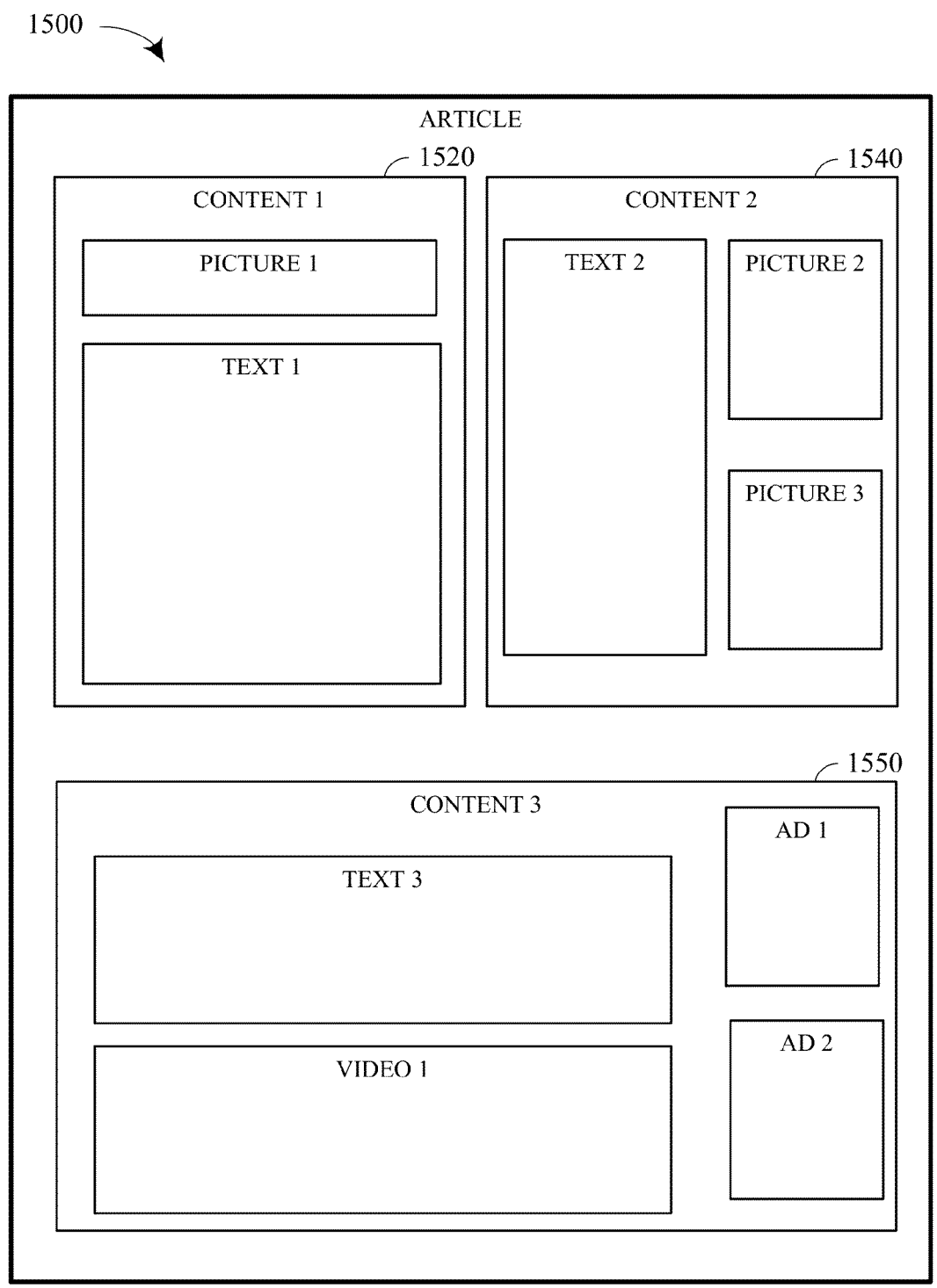
FIG. 15 is schematic representation of a content source used to create an edited communication feed in accordance with a preferred exemplary embodiment of the present invention.

Referring now to FIG. 15, a schematic representation of a content source 1500 used to create an edited communication feed in accordance with a preferred exemplary embodiment of the present invention. For purposes of this FIG., an "edited" communication feed is most preferably any communication stream or feed that has been automatically or programmatically altered from its original form. For example, the content from a website may be included in a communication feed as a content item. However, in certain circumstances, it may be desirable to omit or alter the original content. As shown in FIG. 15, content source 1500 represents a typical website that may comprise various content items 1520, 1540, and 1550, including text, pictures, video, advertisements, etc.

Based on the needs of the consumers of the communication feed to be created from content source 1500, one or more of the content items may be programmatically omitted from the communication feed. For example, in order to keep the size of the communication feed to a more manageable level, all picture content items (e.g., items tagged as .jpg, .png, etc.) may be automatically excluded from the communication feed.

Similarly, hypertext markup language ("HTML") headers, tags or other content identifiers may also be used to identify and specifically include and/or screen out unwanted content items, while including desired content items. Certain content items associated with feed consumer-selected identifiers and meta tags may be marked for inclusion or exclusion and those content items will be included or excluded in the resulting communication feed. Additionally, the actual size and shape of the content item may also be used to determine which content is properly included or excluded from a communication feed. For example, banner advertisements typically include graphical elements that are three or four times wider than they are tall. So, by using this knowledge, content items with a width to height ratio outside of certain parameters may be programmatically excluded. For example, any content item that has greater than a 3-1 width to height ratio may be programmatically excluded from the communication feed.

In at least one preferred embodiment of the present invention, computer-based system for enhanced communication and event management 100 of FIG. 1 "scrapes" content from various websites, including newspaper websites to create an edited communication feed. Those skilled in the art will recognize that publishers such as newspaper publishers often publish advertisements next to the articles. Consequently, providing a way to gather the relevant content without also capturing and introducing advertisements into the communication feed can be somewhat of a challenge. In order to overcome this difficulty, computer-based system for enhanced communication and event management 100 will be configured to programmatically use one or more of the following methods to provide only the relevant content: ignoring ads; verifying article image(s), and finding the text of the relevant article(s) on the webpage. The most preferred embodiments of the present invention will use all three methods to most efficiently harvest only the relevant information.

For example, computer-based system for enhanced communication and event management 100 will begin by searching keywords in the HTML content for the website and ignore any section of the HTML content that has a "class" with the following key words: 'combx', 'comment', 'cam', 'contact', 'foot', 'footer', 'footnote', 'header', 'instagram', 'inline-ad', 'masthead', 'media', 'meta', 'outbrain', 'promo', 'related', 'scroll', 'shoutbox', 'singleAd', 'sidebar', 'sponsor', 'shopping', 'tags', 'tool', 'widget', 'advertisement', 'subscribe', 'popular', 'ad_300', or 'ad'.

Similarly, certain website content may be programmatically identified for inclusion in the communication feed by computer-based system for enhanced communication and event management 100. For example, by searching keywords in the HTML content for the website and locating any section of the HTML content that has a "class" with the following key words: 'article', 'story', 'entry', 'hentry', 'content', 'art_', 'post-content', 'gallery', 'asset-body', 'mainContent', 'main', 'featured', meaningful content can be extracted for inclusion in the communication feed.

Computer-based system for enhanced communication and event management 100 may also be configured to programmatically ignore any graphic image or picture file that has a height to width ratio that is less than 1:4 (generally indicating a banner ad) and greater than 5:2 (generally indicating a column ad) and select content items for inclusion in an edited communication feed that are not advertisements, based on this programmatic editing. An edited communication feed may also contain manually selected and edited content items (e.g., selected and edited by a curator) as well as programmatically selected and edited content items.

Finally, computer-based system for enhanced communication and event management 100 will locate the picture file with the largest area that has a height to width ratio that is greater than 1:4 and less than 5:2 and transmit this file for inclusion in a communication feed and also find the text that is associated with that picture file. To find the associated text, computer-based system for enhanced communication and event management 100 will searches for "div classes" with the following "article" keywords: 'article', 'story', 'entry', 'hentry', 'content', 'art_', 'post-content'. If computer-based system for enhanced communication and event management 100 does not find a "class" with a relevant article keyword, then computer-based system for enhanced communication and event management 100 will locate the text box that has the largest area, is adjacent to the "picture file with the largest area", even if it does not have the desired keywords. Computer-based system for enhanced communication and event management 100 will then transmit this text for display in the communication feed adjacent to the picture file with the largest area that was downloaded.

Similarly, in the case of sending a communication feed that is targeted for delivery to a feature phone (e.g., not a smart phone) that is incapable of handling video files, the edited communication feed generated from content source 1500 may omit video 1 from the edited communication feed. It is also important to note that an edited communication feed may be a personal feed, a public feed, a mandatory feed, a discretionary feed, a curated feed, etc. It should also be noted than an aggregated feed may contain any combination of these feeds including, for example, a mandatory, curated, edited, personal feed coupled with a discretionary, public, communication feed.

This, and other automated editing of communication feeds to create edited feeds, including edited aggregated communication feeds, may be accomplished via user interface 224 of FIG. 2 or a graphical user interface accessible via mobile communication device 190 of FIG. 1. The person creating the aggregated feed can specify which content is included and which content is excluded from the communication feed derived from content source 1500. Based on the selected parameters, video segments, advertisements, etc. can all be automatically excluded.

Referring now to FIG. 16A-16E a schematic representation of a user interface for creating and accessing an aggregated feed created by a computer-based system for enhanced communication and event management in accordance with a preferred exemplary embodiment of the present invention is depicted.

Figure 16A:
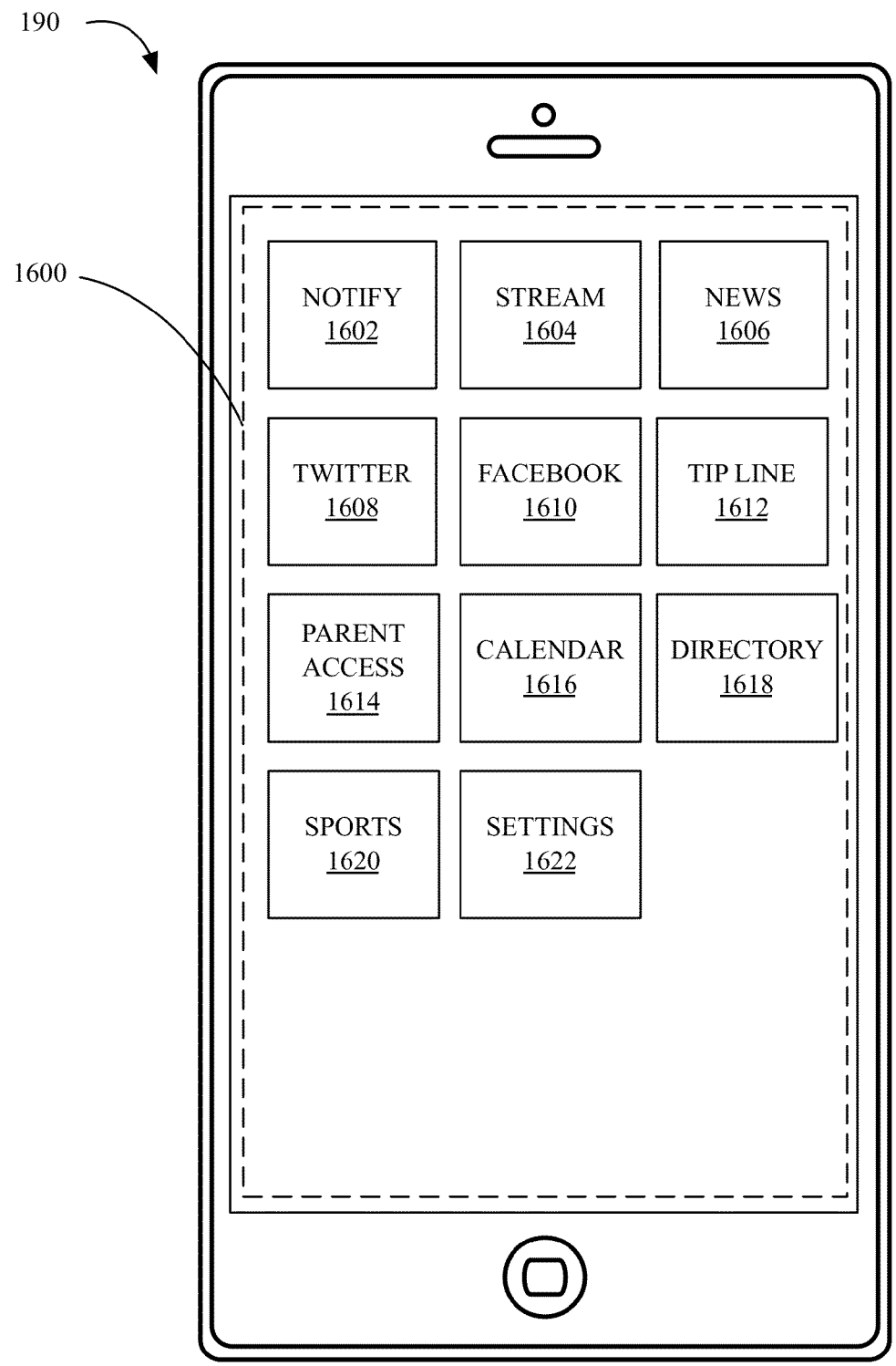
FIG. 16A is a schematic representation of a user interface for creating and accessing one or more communication feeds created by a computer-based system for enhanced communication and event management in accordance with a preferred exemplary embodiment of the present invention.

As shown in FIG. 16A, a graphical user interface 1600 is provided via smartphone 190 for accessing and customizing one or more communication feeds via a smartphone "app." User interface 1600 provides a plurality of icons that are used to access and/or customize a plurality of communication feeds for consumption of one or more feed consumer for a CIA. In this case, each icon provides access to one or more features. In this example, user interface 1600 is adapted for a typical educational environment and illustrates the types of communication feeds that would be relevant for a parent. It should be noted that where each icon represents a communication feed, the actual content of the communication feed associated with each icon is generally customizable, based on the identity of the parent and the child. Those skilled in the art will recognize that user interface 1600 is most preferably adapted for a touch screen device but may take other forms as well.

The icons shown in user interface 1600 are selected for inclusion, initially, as a result of the feed curation process or an automated process based on user identity and related factors. For example, the initial contents of the various communication feeds may be automatically configured by parameters such as the geographic location of the home where the parent and student live. Additional communication feeds may be configured based on the identity of the student, the identity of the teachers for the student, the courses that the student is enrolled in, the extra-curricular activities the student is involved in, the identity of the siblings of the student, the school and school district where the student is enrolled, etc. Further, the administration of the school or the school district may identify one or more communication feeds to be included in user interface 1600. During this curation process, as communication feeds are identified for inclusion, the appropriate icon will be added to user interface 1600. It is also important to note that the communication feeds may also be accessed, modified, deleted, etc. by the feed consumer via user interface 224 displayed on computer 170 or computer 180.

While these characteristics may be useful in the initial selection and configuration of the communication feeds, it is important to recognize that almost all communications feeds may be easily and effectively customized for each feed consumer. In the most preferred embodiments of the present invention, the communication feeds are not static feeds dictated by third parties, but may be customized by the feed consumer to more closely match their information needs and desires. In this case, additional icons, representing additional communication feeds, may be added by the feed consumer over a period of time.

For example, icon 1602 provides access to a communication feed that is specifically adapted to provide user notifications. The notification feed provides one or more alerts or other types of notifications that can be used to provide important information to a feed consumer on a prioritized basis. Typically, a "badge" or small icon may be temporarily superimposed over icon 1602 to let the feed consumer know that a new notification has been issued. If their child is late to school or missing from a class, the parent could receive a notification to let them know that there may be a problem. If the school issues a school-wide alert, all parents would see the alert included in their notifications communication feed but if a teacher issued a class-wide alert, only the parents with students enrolled in that teacher's class would see those alerts. Once the alert has been viewed by the feed consumer, the "badge" will be removed.

Icon 1604 provides the feed consumer with access to a "stream" or aggregated communication feed. Additional information about the stream is provided in conjunction with FIG. 16B-16E. Icon 1606 provides the feed consumer with access to one or more news related communication feeds. The news feeds may be provided by a single news source or multiple news sources in the form of an aggregated communication feed. The feed consumer can identify which communication feeds are to be included in the news communication feed provided by icon 1606. Once again, depending on feed consumer preferences, the content of the news communication feed may vary from feed consumer to feed consumer.

Icon 1608 provides the feed consumer with access to a Twitter® feed. The Twitter® feed may be a feed provided by an organization (e.g., school), a specific person (e.g., a teacher) or even an aggregated Twitter® feed from multiple sources.

Icon 1610 provides the feed consumer with access to a Facebook® feed. The Facebook® feed may be a feed provided by an organization (e.g., school), a specific person (e.g., a teacher) or even an aggregated Facebook® feed from multiple sources.

Icon 1612 provides the feed consumer with access to a "tip line" communication feed. This could include important tips provided by the school district, the principal, or a teacher providing student specific information or generic information for successful interaction between the school, the parent and the student.

Icon 1614 provides the feed consumer with access to specific information (e.g., information for the parent or guardian of a school student) that is adapted for the specific user of mobile communication device 190. For example, a private communication feed for a parent of a child may include an aggregated communication feed from each of the child's teachers highlighting the scores for any tests, quizzes, assignments, etc. posted by the teacher(s). This allows the parent to be constantly informed as the progress of their student. This aggregated communication feed may include curated feeds, mandatory feeds, etc.

Icon 1616 provides the feed consumer with access to a calendar containing important dates for various activities (e.g., school vacation days, performances, etc.). The calendar could be customized for each individual communication feed consumer. For example, based on the feed consumer profile data stored in database 223 of FIG. 2, appropriate calendar items can be automatically added to a calendar communication feed for the consumer of the calendar communication feed. If a consumer of the calendar communication feed has a child in a particular school or school district, calendar content items for the relevant school or school district may be automatically included in the calendar communication feed. Similarly, based on the geographic location of the consumer of the calendar communication feed, obtained from the feed consumer profile or via a GPS transponder contained in mobile communication device 190 of FIG. 1, relevant calendar content items for the calendar communication feed may be programmatically inserted into the calendar communication feed. In this manner, whenever the feed consumer logs in and accesses their communication feeds, the calendar communication feed will be populated with the most appropriate calendar content items.

Icon 1618 provides the feed consumer with access to a directory containing contact information that is relevant to the parent (e.g., contact information for the student's teacher(s)). The information in the directory is another type of communication feed that may be customized to include only the information relevant to the parent and to exclude contact information for teachers and administrators that do not have contact with their student(s). This will allow the feed consumer to more quickly and efficiently access and utilize the information that is most relevant to them. The information contained in the directory may be included or excluded based on a wide variety of factors.

For example, the parent of a child in a school may "opt-in" and allow their contact information to be presented in the directory so that other parents who have students in the same class as their child could contact them. Other parents may wish to keep their contact information private and would "opt-out" so that their information would not be included in the directory. Similarly, district and school personnel may or may not be listed in the directory, based on their affiliation and/or relationship with the student and/or parent. So, for the parents, the contact information for their students teachers, guidance counselor, principal, etc. would be contained in their directory while the contact name for other teachers and staff that are not connected to their student will be excluded. In this fashion, the contents of the directory will be customized for each feed consumer.

Icon 1620 provides the feed consumer with access to a sports related communication feed. In this example, the parent may have one or more students participating in school sponsored sporting activities. The communication feed could provide the parent with an aggregated communication feed for their student's sports, including information about practices, games, scores, video highlights, etc. The sports related communication feed could also provide information on league standings, and news articles from local newspapers, etc. The parent could customize the communication feed to include only those sports and related topics that pertained to their student. In this fashion, each parent may receive a different sports related communication feed.

Icon 1622 provides access to a "settings" or customization tool where the feed consumer can select one or more communication feeds for display by user interface 900. The feed consumer can search for new communication feeds and/or adjust any available options for existing communication feeds (e.g., delete a discretionary feed, for example). In this fashion, the feed consumer can readily adapt the contents of one or more communication feeds to meet their specific needs.

Figure 16B:
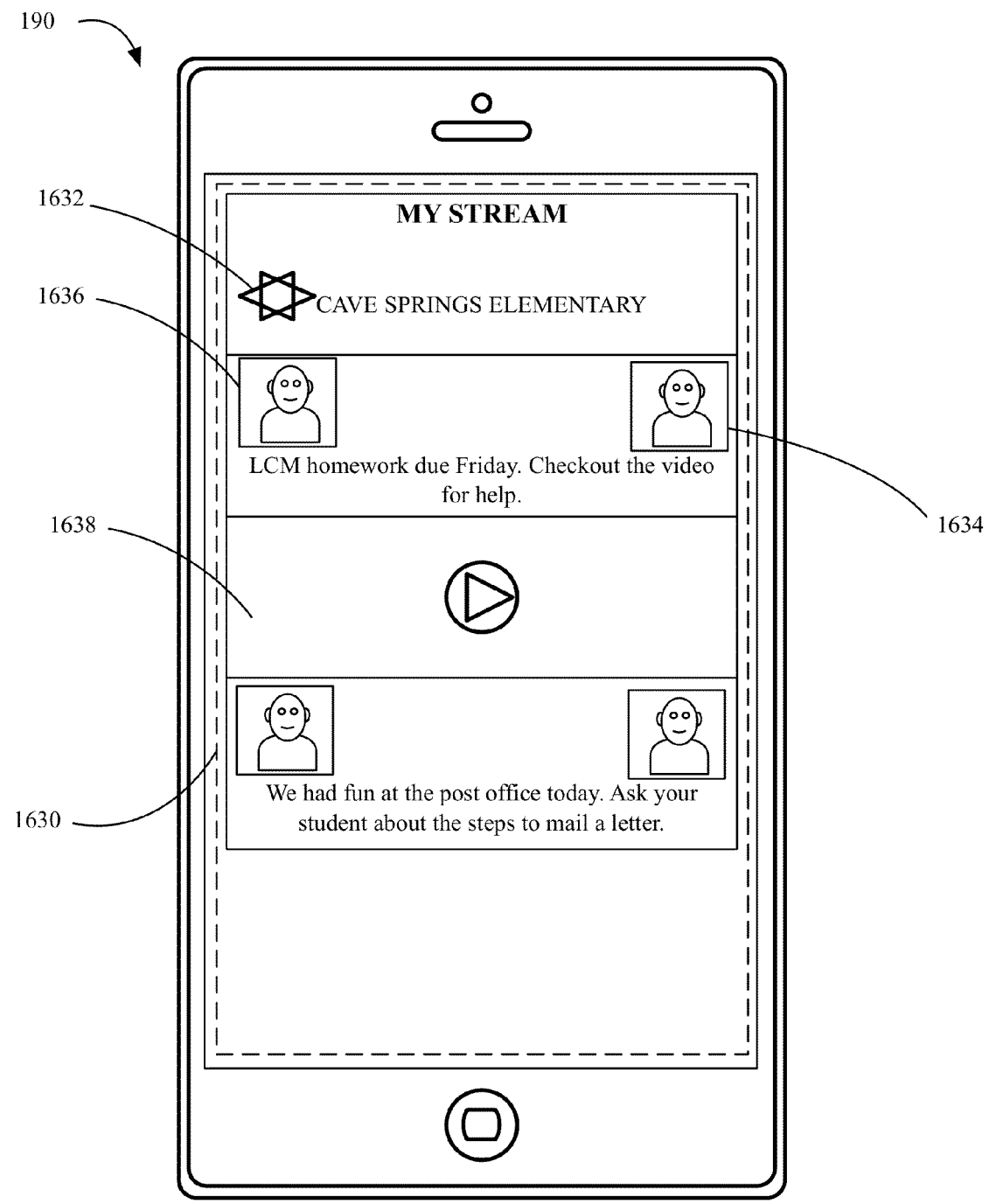
FIG. 16B is a schematic representation of a user interface for creating and accessing one or more communication feeds created by a computer-based system for enhanced communication and event management in accordance with a preferred exemplary embodiment of the present invention.
Figure 16C:
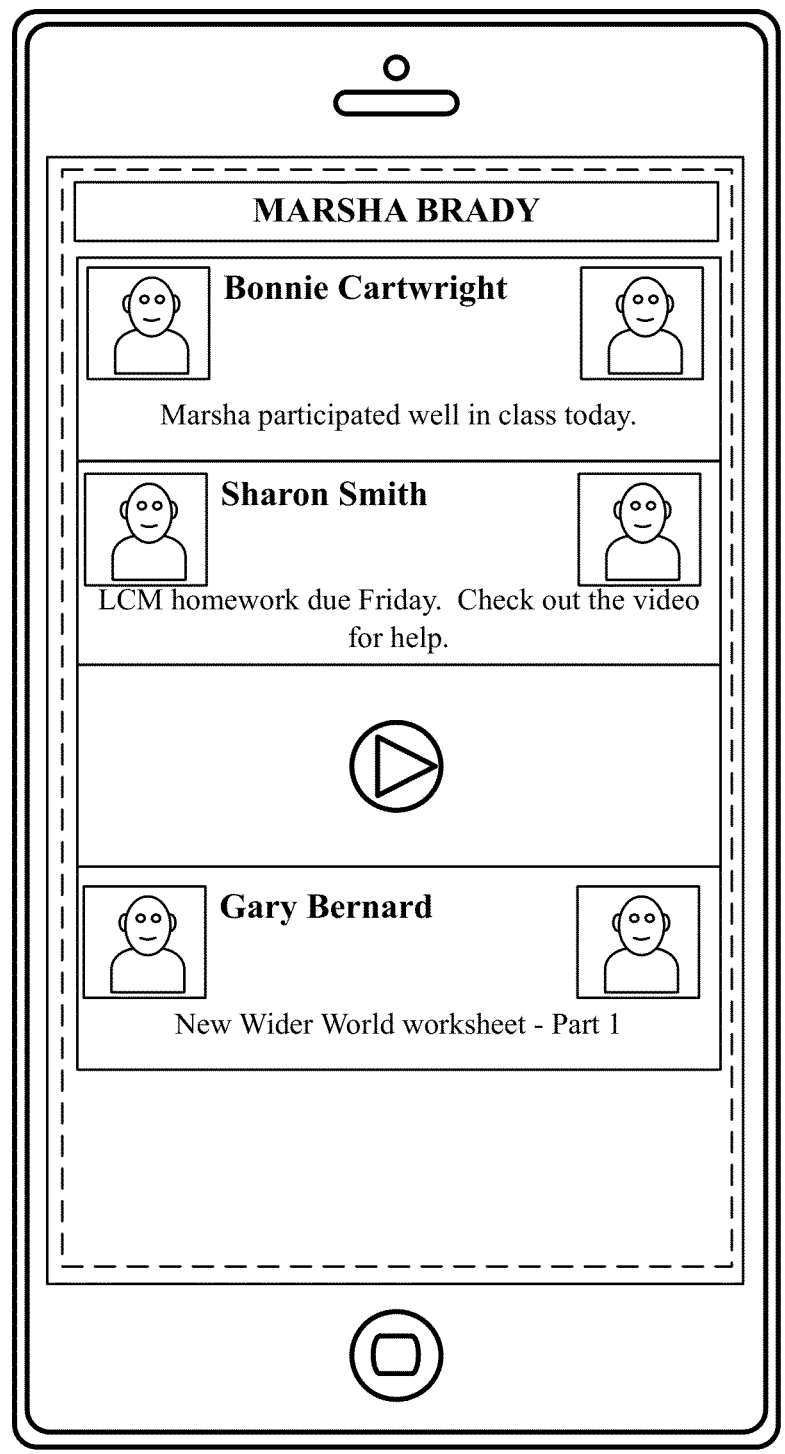
FIG. 16C is a schematic representation of a user interface for creating and accessing one or more communication feeds created by a computer-based system for enhanced communication and event management in accordance with a preferred exemplary embodiment of the present invention.
Figure 16D:
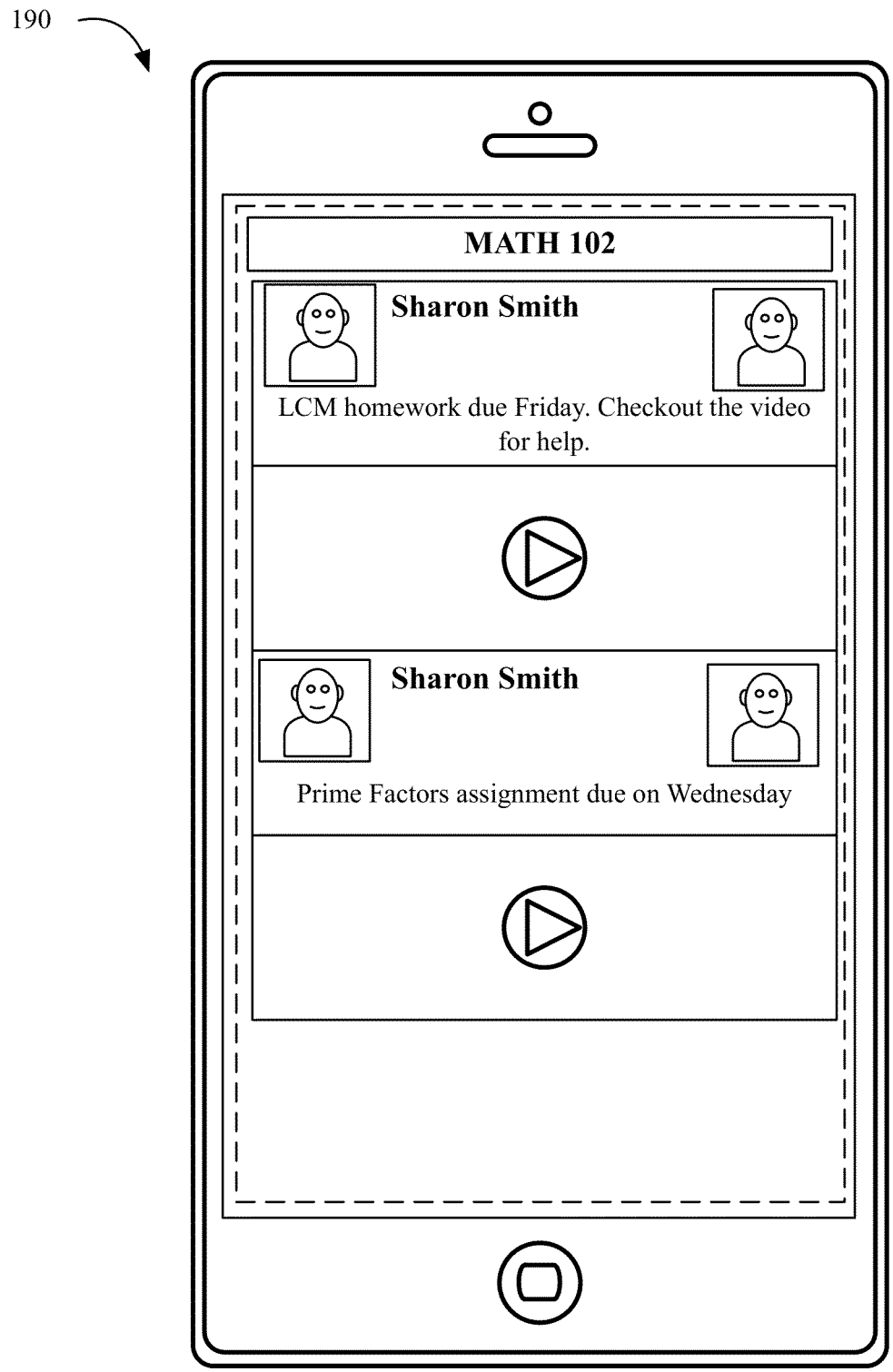
FIG. 16D is a schematic representation of a user interface for creating and accessing one or more communication feeds created by a computer-based system for enhanced communication and event management in accordance with a preferred exemplary embodiment of the present invention.
Figure 16E:
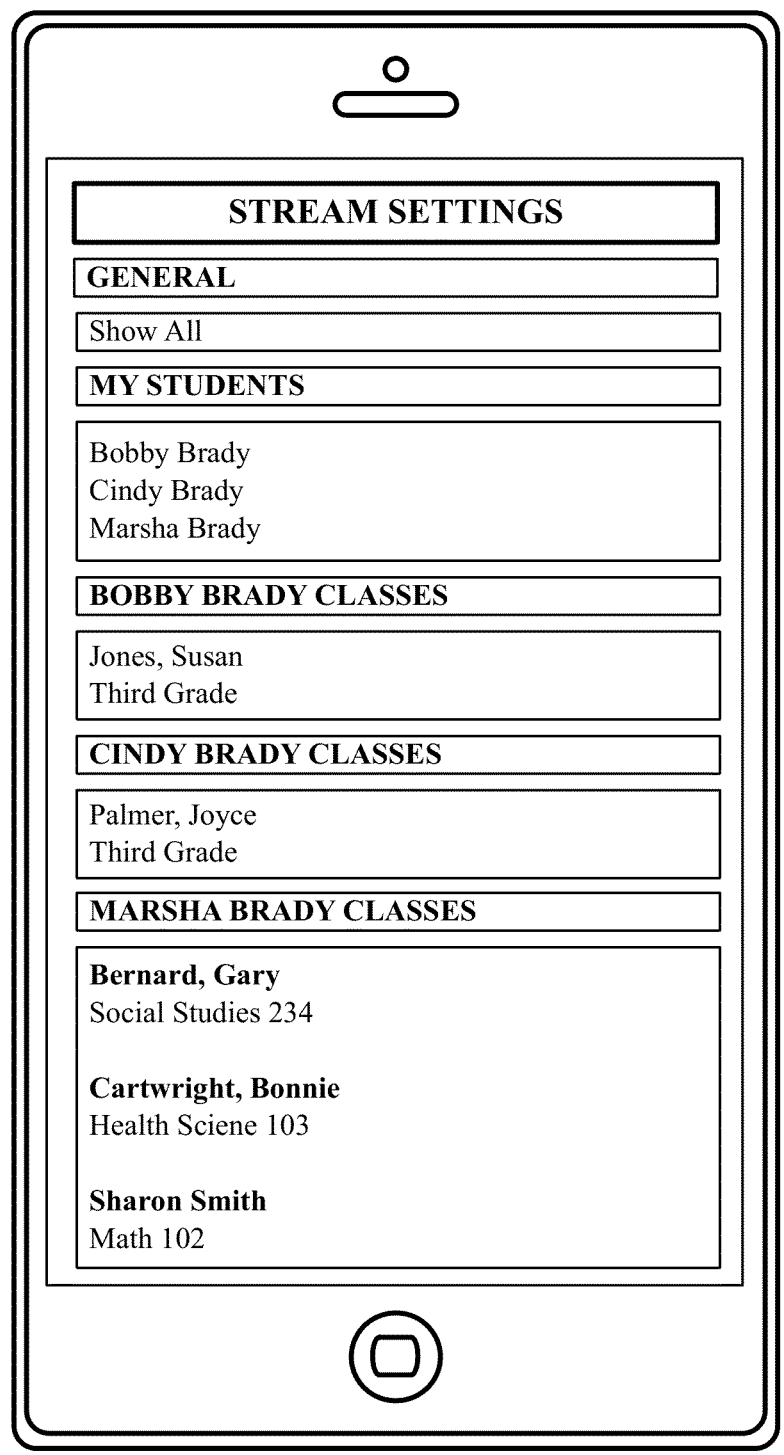
FIG. 16E is a schematic representation of a user interface for creating and accessing one or more communication feeds created by a computer-based system for enhanced communication and event management in accordance with a preferred exemplary embodiment of the present invention.

Referring now to FIG. 16B-16E, the user of mobile communication device 190 has selected icon 1604 of user interface 1600 to arrive at a customized communication feed 1630. As shown in FIG. 16B, communication feed 1630 is an aggregated communication feed comprising multiple communication feeds from a variety of sources. It should be noted that the identifying indicia included in the communication feed provide the feed consumer with a quick and intuitive way to assimilate the information provided in the communication feed. For example, a message from a teacher may include a teacher photo 1636 and student photo 1634 to connect the message with the teacher and the student. This is particularly helpful for parents who have multiple students in various classes and schools.

Similarly, one of the messages may also include identifying indicia 1632 to indicate the origin of the message that is, in this case, a message from the school district office. Video content 1638 is indicative of the various types of content items that may be included in aggregated communication feed 1630. It should be noted that aggregated communication feed 1630 might include any combination of curated feeds, mandatory feeds, discretionary feeds, etc. In the most preferred embodiments of the present invention, aggregated communication feed 1630 may include private as well as public feeds, with the content being specifically tailored for the consumer of aggregated communication feed 1630.

Figure 17:
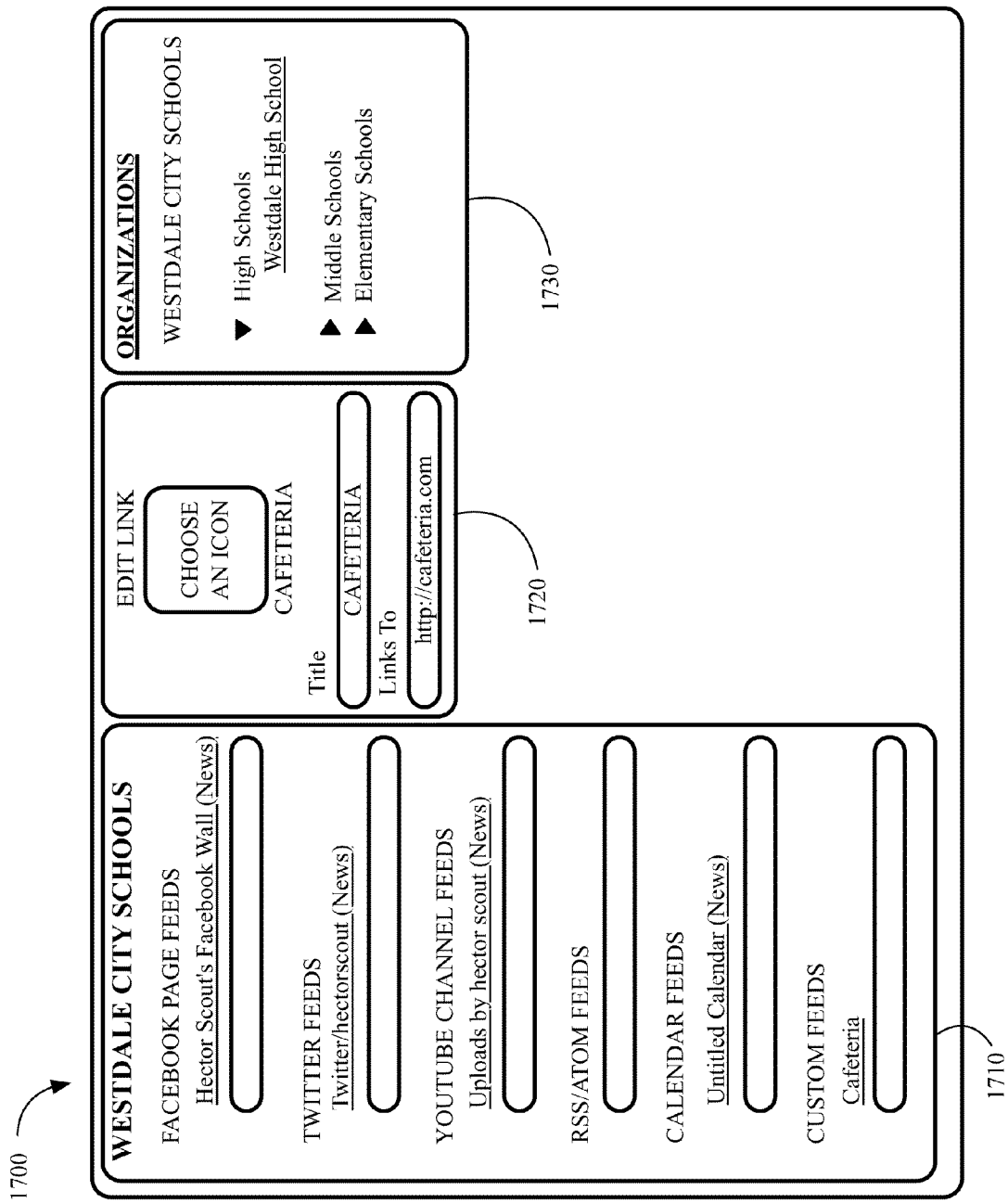
FIG. 17 is a schematic representation of a user interface for creating or modifying a curated communication feed in accordance with a preferred exemplary embodiment of the present invention.

Referring now to FIG. 17, a user interface 1700 for configuring a curated aggregated communication feed in accordance with a preferred exemplary embodiment of the present invention is depicted. User interface 1700 is most preferably included in graphical user interface 224 of FIG. 2. User interface 1700 of FIG. 17 depicts the curator interface as viewed by a communication feed curator at a school district level. As shown in FIG. 17, the curator may select a plurality of individual communication feeds for inclusion in the aggregated feed that will ultimately be offered to feed consumers of the aggregated communication feed offered by Westdale City Schools District (e.g., Westdale High School). It is anticipated that the school district will supply each school with an aggregated communication feed that can be consumed by the individuals associated with the school (e.g., principal, staff, parents, community members, etc.). Similarly, the user interface for creating and modifying one or more curated aggregated communication feeds may be adapted for other environments, such as a municipality or country government with various supervisory and management roles being modeled in a similar hierarchical fashion.

Communication feed listing 1710 shows each communication feed that has been selected for inclusion in the aggregated communication feed by the school district communication feed coordinator. For example, communication feed listing 1710 shows that a Facebook® communication feed titled Hector Scout's Facebook® Wall has been added to the list of communication feeds that will be included in the aggregated communication feed offered by the school district. Similarly, a Twitter® feed, Twitter/hectorscout has been included as has a Calendar communication feed.

In FIG. 17, the curator is adding a custom communication feed entitled "Cafeteria" to the aggregated communication feed. As shown in FIG. 17, the curator can specify the title, an icon, and a link for the communication feed. As previously explained, each new communication feed will be validated and/or authenticated by the system prior to being added to the aggregated communication feed.

Communication feed configuration interface element 1720 provides the district level communication feed curator with the ability to quickly and easily configure multiple communication feeds for the aggregated communication feed to be offered by the school district. Each communication feed can be validated and then included in communication feed listing 1010.

In this case, the district level communication feed curator can select any or all of the schools shown in the Organizations listing 1730. By selecting the desired school(s) and the configuring the desired communication feeds, the district level curator can create a curated communication feed tailored for the needs of each school in the school district.

Figure 18:
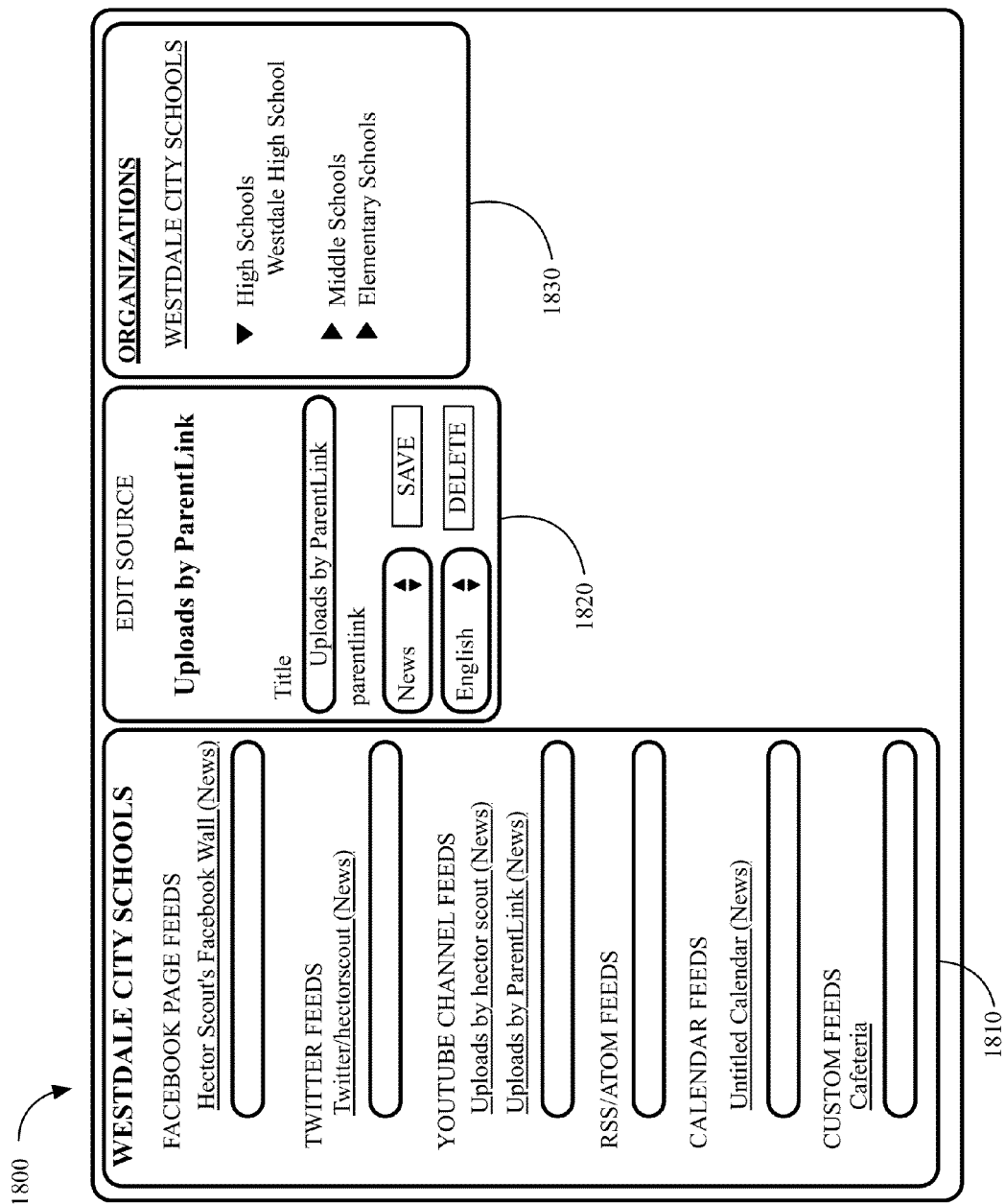
FIG. 18 is a schematic representation of a user interface for creating or modifying a curated communication feed in accordance with a preferred exemplary embodiment of the present invention.

Referring now to FIG. 18, additional aspects of user interface 1800 for configuring a curated aggregated communication feed in accordance with a preferred exemplary embodiment of the present invention are depicted. User interface 1800 of FIG. 18 now depicts the curator interface as viewed by a communication feed curator at a specific school within the school district. As shown in FIG. 18, communication feed listing 1810 will already contain the communication feeds that have been "inherited" from the curator at the school district level. Further, the communication feed curator for each school has the ability to include additional communication feeds 1820 to the aggregated communication feed that will ultimately be offered to feed consumers of the aggregated communication feed offered by Westdale High School.

In this case, the school communication feed curator has added a new YouTube® news communication feed entitled "parentlink" to the aggregated communication feed identifying a communication feed generated by a commercial entity. The curator can select a variety of parameters for the communication feed including, for example, the title, category, and language for the communication feed. Organization listing 1830 now shows the school level where the aggregated feed is being created. Once created, the aggregated communication feed may be offered to the feed consumers that are interested in receiving the aggregated communication feed from the school.

As will be appreciated by one skilled in the art, aspects of the computer-based system for enhanced communication and event management disclosed herein may be embodied as a system, method or computer program product. Accordingly, aspects of the computer-based system for enhanced communication and event management may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the computer-based system for enhanced communication and event management may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the computer-based system for enhanced communication and event management may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

From the foregoing description, it should be appreciated that computer-based system and method for enhanced communication and event management disclosed herein presents significant benefits that would be apparent to one skilled in the art. Furthermore, while multiple embodiments have been presented in the foregoing description, it should be appreciated that a vast number of variations in the embodiments exist. Lastly, it should be appreciated that these embodiments are preferred exemplary embodiments only and are not intended to limit the scope, applicability, or configuration of the invention in any way. Rather, the foregoing detailed description provides those skilled in the art with a convenient road map for implementing a preferred exemplary embodiment of the invention, it being understood that various changes may be made in the function and arrangement of elements described in the exemplary preferred embodiment without departing from the spirit and scope of the invention as set forth in the appended claims.

The invention claimed is:

1. A computer-based system for providing customized communication comprising:
   At least one processor;
   at least one memory coupled to the at least one processor;
   a database residing in the memory;
   a feed aggregation mechanism residing in the memory;
   an aggregated communication feed generated by the feed aggregation mechanism, the aggregated communication feed comprising:
      at least a first communication feed; and
      at least a second communication feed, the at least a second communication feed comprising a curated communication feed, the curated communication feed being selected for inclusion in the aggregated communication feed based on a decision made by a curator, wherein the curator belongs to a multi-level hierarchal organization, the multi-level hierarchal organization comprising at least a curator level and a curator sub-level and wherein the curator is authorized to include a plurality of communication feeds in the aggregated communication feed to at least one feed consumer;
   a communication feed based on a pre-selected criteria selected from a group consisting of: demographic data; geo-location data; organizational affiliation data; religious data; employment data; and school affiliation data;
   a programmatically selected communication feed based on a plurality of user preferences stored in a database;
   a programmatically selected communication feed based on a teacher student relationship; and
   an edited communication feed, the edited communication feed comprising:
      a first content item, the first content item comprising a first content item programmatically scraped from a website wherein at least one graphical element of the first content item scraped from the website was excluded based on a pre-determined predetermined height to width ratio that is less than 1:4 and greater than 5:2; and
      a second content item, the second content item comprising a second content item programmatically scraped from the website wherein the at least one element of the second content item scraped from the website was excluded based on an HTML tag.

2. The computer-based system of claim 1 wherein at least one source indicia is associated with at least one of the at least a first communication feed or the at least a second communication feed, wherein the at least one source indicia is displayed to the at least one feed consumer and wherein the at least one source indicia comprises:
   at least one identifier selected from the group comprising:
      a logo identifier representing an organization supplying the curated communication feed;
      an organization identifier identifying the organization supplying the curated communication feed;
      an identifier identifying the curator supplying the curated communication feed; and
      an abbreviation for the name of the organization supplying the curated communication feed.

3. The computer-based system of claim 1 wherein at least one of the at least a first communication feed and the at least a second communication feed is automatically selected for inclusion in the aggregated communication feed based on the inclusion of at least a third communication feed contained in the aggregated communication feed.

4. The computer-based system of claim 1 further comprising at least one communication feed included in the aggregated communication feed based on a decision made by the at least one feed consumer.

5. The computer-based system of claim 1 wherein the aggregated communication feed is delivered to the at least one feed consumer in a customized format to a user device based on at least one physical attribute of the user device.

6. The computer-based system of claim 1 feed wherein:
   at least one communication feed in the aggregated communication feed being provided to the at least one feed consumer based on a pre-selected criteria selected from a group consisting of: demographic data; geo-location data; organizational affiliation data; religious data; employment data; and school affiliation data;
   at least one pre-selected element in the aggregated communication feed selected from a group consisting of: a generic introduction from an individual listed in directory of individuals affiliated with the organization curating aggregated communication feed; a organization identified with the consumer of the aggregated communication feed; a message about the purpose of at least a portion of the content contained in the aggregated communication feed;
   a first communication feed selected from the plurality of available communication feeds selected and included in the aggregated communication feed based on a decision made by the at least one feed consumer of the aggregated feed; and
   a second communication feed selected from the plurality of communication feeds and included in the aggregated communication feed based on a decision made by the curator.

* * * * *